United States Patent
Suzuki

(10) Patent No.: US 7,502,078 B2
(45) Date of Patent: Mar. 10, 2009

(54) PROJECTION TYPE DISPLAY APPARATUS WITH MEANS FOR SUPPLYING AN AIR COOLING STREAM TO A GAP BETWEEN A LIGHT RECEIVING SURFACE OF A PRISM AND A THIRD SURFACE OF A CLOSED TRIANGULAR PRISMATIC HOUSING

(75) Inventor: Tetsuji Suzuki, Yokosuka (JP)

(73) Assignee: Victor Company of Japan, Limited, Yokohama (JP)

( * ) Notice: Subject to any disclaimer, the term of this patent is extended or adjusted under 35 U.S.C. 154(b) by 408 days.

(21) Appl. No.: 11/211,465

(22) Filed: Aug. 26, 2005

(65) Prior Publication Data
US 2006/0044515 A1    Mar. 2, 2006

(30) Foreign Application Priority Data
Jun. 17, 2005    (JP)    ............... P2005-178386

(51) Int. Cl.
*G02F 1/1335*    (2006.01)
(52) U.S. Cl. ............ 349/8; 349/5; 349/9; 349/96; 349/97
(58) Field of Classification Search ........ 349/5, 349/8, 9, 96, 97
See application file for complete search history.

(56) References Cited
U.S. PATENT DOCUMENTS
2004/0109143 A1 *    6/2004    Imahase et al. ............ 353/31
2004/0212748 A1 *    10/2004    Suzuki et al. ............ 349/8

FOREIGN PATENT DOCUMENTS
JP    2000-194073    7/2000
JP    2004-286767    10/2004

* cited by examiner

Primary Examiner—David Nelms
Assistant Examiner—John Heyman
(74) Attorney, Agent, or Firm—The Nath Law Group; Jerald L. Meyer; Derek Richmond

(57) ABSTRACT

A projection type display apparatus includes: a reflective polarizing plate for each color light which transmits each of R light, G light and B light having a P polarized component subjected to color separation by a color separation optical system therethrough, allows each transmitted light to enter a corresponding reflective liquid crystal panel for each color light, and reflects image light of each color having an S polarized component which has been subjected to light modulation in accordance with an image signal of each corresponding color light by the reflective liquid crystal panel for each color light; a transmission type polarizing plate for each color light which removes an unnecessary polarized component from the image light of each color reflected by the reflective polarizing plate for each color light; a color combination optical system which subjects the image light of each color transmitted through the transmission type polarizing plate for each color light to color combination; and a projection lens, wherein the transmission type polarizing plate for each color light is air-cooled by air-cooling means when the transmission type polarizing plate for each color light faces each incidence surface of the color combination optical system.

5 Claims, 28 Drawing Sheets

PROJECTION TYPE DISPLAY APPARATUS WITH MEANS FOR SUPPLYING AN AIR COOLING STREAM TO A GAP BETWEEN A LIGHT RECEIVING SURFACE OF A PRISM AND A THIRD SURFACE OF A CLOSED TRIANGULAR PRISMATIC HOUSING

BACKGROUND OF THE INVENTION

1. Field of the Invention

The present invention relates to a projection type display apparatus which comprises unnecessary polarized light removing means for each color light which removes an unnecessary polarized component with respect to image light of each color emitted from a reflective spatial light modulation element (a reflective liquid crystal panel) for each color light corresponding to each of R light, G right and B light, and also comprises air-cooling means for air-cooling the unnecessary polarized light removing means for each color light.

2. Description of the Related Art

Although a projection type display apparatus which magnifies and projects a color image has various kinds of structural conformations depending on arrangement relationships of optical constituent members, there are a transmission type which allows light to be transmitted through a spatial light modulation element (which will be referred to as a liquid crystal panel hereinafter) using a liquid crystal panel or the like and a reflection type which reflects light. In both of these types, white light emitted from a light source is divided based on each color into three primary color lights, i.e., R light (red light), G light (green light) and B light (blue light) by a color separation optical system, the three primary color lights are respectively led to liquid crystal panels for the R, G and B lights, the respective image lights of the R light, the G light and the B light subjected to light modulation in accordance with respective image signals for the R, G and B lights in the respective liquid crystal panels for the R, G and B lights are subjected to color combination by a color combination optical system, and color-combined image light acquired by the color combination optical system is magnified and projected onto a screen from a projection lens.

At this time, there has been proposed a projection type display apparatus having a configuration in which, when a quantity of the lights which enter a polarizer and a liquid crystal panel is increased in order to increase luminance of the projected color-combined image light in the projection type display apparatus, the polarizer and the liquid crystal panel generate heat, but the polarizer and the liquid crystal panel are cooled by supplying cooling air in substantially parallel with respective surfaces of the polarizer and the liquid crystal panel, thereby projecting the color-combined image light with higher luminance onto the screen (see, e.g., Japanese Patent Application Laid-open No. 2000-194073).

FIG. 1 is a structural view showing a conventional projection type display apparatus. FIG. 2 is a side view showing an arrangement of cooling fans in the conventional projection type display apparatus. FIG. 3 is a perspective view showing a state in which a polarizer and a liquid crystal panel are cooled in the conventional projection type display apparatus.

A projection type display apparatus 200 according to the prior art shown in FIG. 1 is disclosed in the above-described Japanese Patent Application Laid-open No. 2000-194073, and will be briefly described herein with reference to documents.

As shown in FIG. 1, in the conventional projection type display apparatus 200, a parallel light ray emitted from a non-polarized light source 202 provided in a casing 201 is turned to visible light by a UV/IR cut filter 203, and this visible light is transmitted through and reflected by a first color separation dichroic mirror 204. Further, one color light transmitted through the first color separation dichroic mirror 204 travels forward to reach a reflecting mirror 205, and is reflected by this reflecting mirror 205 to change its direction 90°, and enters a first liquid crystal panel assembly 210A.

On the other hand, two color lights reflected by the first color separation dichroic mirror 204 change their directions 90° here to reach a second color separation dichroic mirror 206, and are transmitted through and reflected by this second color separation dichroic mirror 206. Furthermore, one color light reflected by the second dichroic mirror 206 of the two color lights changes its direction 90° to enter a second liquid crystal panel assembly 210B, and the other color light transmitted through the second color separation dichroic mirror 206 travels forward to enter a third liquid crystal panel assembly 210C.

Here, the first to third liquid crystal panel assemblies 210A to 210C corresponding to RGB are respectively constituted as a transmission type in which a condenser lens 211, a polarizer 212, a liquid crystal panel 213 and a polarizer 214 are sequentially arranged.

Moreover, one color light transmitted through the first liquid crystal panel assembly 210A is transmitted through a first color combination dichroic mirror 207 to enter a second color combination dichroic mirror 209 and, on the other hand, one color light transmitted through the second liquid crystal panel assembly 210B is reflected by the first color combination dichroic mirror 207 to enter the second color combination dichroic mirror 209, and the other color light transmitted through the third liquid crystal panel assembly 210C is reflected by a reflecting mirror 208 to enter the second color combination dichroic mirror 209. The three color lights are subjected to color combination by this second color combination dichroic mirror 209, and color-combined image light is magnified and projected onto a non-illustrated screen.

At this time, as shown in FIG. 2, there is a description in which fans 221A to 221C as cooling means are provided on an outer side surface of the casing 201 in accordance with the first to third liquid crystal panel assemblies 210A to 210C (FIG. 1). Additionally, an air stream from the fan 221A (221B, 221C) is supplied in a direction indicated by an arrow X and a direction indicated by an arrow Y in substantially parallel with respective surfaces of the polarizer 212 and the liquid crystal panel 213 in each of the first to third liquid crystal panels 210A (210B, 210C) through a fan duct 222A (222B, 222C), effective cooling can be thereby performed, and it is possible to obtain the projection type display apparatus 200 capable of projecting the color-combined image light having higher luminance onto a screen.

Meanwhile, according to the conventional projection type display apparatus 200, since each polarizer 212 and each liquid crystal panel 213 in the first to third liquid crystal panel assemblies 210A to 210C corresponding to RGB are respectively cooled by using the three fans 221A to 221C and the three fan ducts 22A to 222C, the three cooling means disadvantageously have a large-scaled structural conformation.

Additionally, the conventional projection type display apparatus 200 has each liquid crystal panel 213 for each of the R, G and B lights constituted as a transmission type, but acquisition of a high resolution with respect to a projected image is difficult in case of the transmission type. Thus, when a reflective liquid crystal panel is adopted in order to achieve the high resolution, even if the cooling means in the conventional projection type display apparatus 200 are used as they are, the cooling means likewise have a large-scaled structural conformation.

SUMMARY OF THE INVENTION

Therefore, there has been demanded a projection type display apparatus which can remove an unnecessary polarized component to achieve high luminance and high contrast when color-combined image light obtained by performing color combination of image lights of respective colors emitted from reflective spatial light modulation elements for respective color lights is projected by a projection lens in the projection type display apparatus to which the three reflective spatial light modulation elements (reflective liquid crystal panels) are applied in accordance with R light, G light and B light, and there has been also demanded a projection type display apparatus which can cool the inside of the apparatus with respect to heat generation due to lights from a light source with a simple configuration.

Further, as another problem, in the projection type display apparatus using the reflective spatial light modulation elements for respective colors, optical components or a projection lens are interposed between the reflective spatial light modulation elements for the respective color lights and a screen on which lights are projected by the projection lens, but there is a phenomenon that unnecessary reflected lights reflected from respective interfaces of these optical components or the projection lens are projected onto the screen so that contrast is lowered, and its solution has been demanded.

In order to achieve the above object, according to a first aspect of the present invention, there is provided a projection type display apparatus (10) comprising: a reflective spatial light modulation element (33) for each color light corresponding to each of R light, G light and B light; each color light illuminating means (11-21) for illuminating the reflective spatial light modulation element (33) for each color light with each of the R light, the G light and the B light; a reflective polarizing plate (32) for each color light which transmits a polarized component in one direction of each of the R light, the G light and the B light from each color light illuminating means (11-21) therethrough, and reflects as image light of each color a polarized component in the other direction different from the polarized light in one direction obtained by subjecting each of the transmitted R light, G light and B light to light modulation in accordance with an image signal of each color light by the reflective spatial light modulation element (33) for each color light; unnecessary polarized light removing means (34, (35), (37)) for each color light for removing an unnecessary polarized component with respect to the image light of each color from the reflective spatial light modulation element (33) for each color light reflected by the reflective polarizing plate (32) for each color light to emit the image light of each color without the unnecessary polarized component; a color combination optical system (40) which subjects the image light of each color emitted from the unnecessary polarized light removing means (34, (35), (37)) for each color light to color combination to emit the thus combined light as color-combined image light; and a projection lens (42) which projects the color-combined image light, wherein the unnecessary polarized light removing means (34, (35), (37)) for each color light is a polarizing plate (34, (37)) which absorbs unnecessary polarized light or a polarizing plate (35) which reflects the unnecessary polarized light.

According to the first aspect of the present invention, in the projection type display apparatus to which three reflective spatial light modulation elements (reflective liquid crystal panels) are applied in accordance with R light, G light and B light in particular, a plate-like reflective polarizing plate (a so-called "wire grid polarizer") as polarization splitting means is arranged in accordance with each of the R light, the G light and the B light between each color light illuminating means for illuminating the reflective spatial light modulation element for each color light and a color combination optical system, whereby each color light from each color light illuminating means and image light from the reflective spatial light modulation element for each color light are assuredly subjected to polarization split by the reflective polarizing plate for each color light. Further, when unnecessary polarized light removing means for each color light is arranged between the reflective spatial light modulation element for each color light and the color combination optical system in order to remove unnecessary polarized light with respect to the image light of each color emitted from the reflective spatial light modulation element for each color light, since a polarizing plate which absorbs the unnecessary polarized light or a polarizing plate which reflects the unnecessary polarized light is used as the unnecessary polarized light removing means for each color light, color-combined image light from which the unnecessary polarized light has been removed can be excellently projected onto a screen, and hence high luminance and high contrast can be achieved, which contributes to an improvement in quality and reliability of the projection type display apparatus.

Furthermore, in order to achieve the above object, according to a second aspect of the present invention, there is provided a projection type display apparatus (10) comprising: a reflective spatial light modulation element (33) for each color light corresponding to each of R light, G light and B light; each color light illuminating means (11-21) for illuminating the reflective spatial light modulation element (33) for each color light with each of the R light, the G light and the B light; a reflective polarizing plate (32) for each color light which transmits a polarized component in one direction of each of the R light, the G light and the B light from each color light illuminating means (11-21) therethrough, and reflects as image light of each color a polarized component in the other direction different from the polarized light in one direction obtained by subjecting each of the transmitted R light, G light and B light to light modulation in accordance with an image signal of each color light by the reflective spatial light modulation element (33) for each color light; unnecessary polarized light removing means (34, (35), (37)) for each color light for removing an unnecessary polarized component with respect to the image light of each color from the reflective spatial light modulation element (33) for each color light reflected by the reflective polarizing plate (32) for each color to emit the image light of each color without the unnecessary polarized component; a color combination optical system (40) which subjects the image light of each color emitted from the unnecessary polarized light removing means (34, (35), (37)) for each color light to color combination to emit the thus combined light as color-combined image light; and a projection lens (42) which projects the color-combined image light, wherein the unnecessary polarized light removing means (34, (35), (37)) for each color light is a polarizing plate (34, (37)) which absorbs unnecessary polarized light with respect to the R light and the G light and, on the other hand, it is a polarizing plate (35) which reflects the unnecessary polarized light with respect to the B light.

According to the second aspect of the present invention, in the projection type display apparatus to which three reflective spatial light modulation elements (reflective liquid crystal panels) are applied in accordance with R light, G light and B light in particular, a plate-like reflective polarizing plate (a so-called "wire grid polarizer") as polarization splitting means is arranged in accordance with each of the R light, the G light and the B light between each color light illuminating means for illuminating the reflective spatial light modulation element for each color light and a color combination optical system, whereby each color light from each color light illuminating means and image light from the reflective spatial light modulation element for each color light are assuredly subjected to polarization split by the reflective polarizing plate for each color light. Furthermore, when unnecessary polarized light removing means for each color light is arranged between the reflective spatial light modulation element for each color light and the color combination optical system in order to remove unnecessary polarized light with respect to the image light of each color emitted from the reflective spatial light modulation element for each color light, since a polarizing plate which absorbs the unnecessary polarized light with respect to the R light and the G light and a polarizing plate which reflects the unnecessary polarized light with respect to the B light are used as the unnecessary polarized light removing means for each color, color-combined image light from which the unnecessary polarized light has been removed can be further excellently projected onto a screen by a projection lens by substantially providing the reflective polarizing plate for the B light with heat resisting properties or light stability with respect to the B light whose wavelength is shorter than those of the R light and the G light, whereby high luminance and high contrast can be achieved, which further contributes to an improvement in quality and reliability of the projection type display apparatus.

According to a third aspect of the present invention, air-cooling means (26) which air-cools the unnecessary polarized light removing means (34, (35), (37)) for each color light is further provided in the first or second aspect of the present invention.

According to the third aspect of the present invention, since the unnecessary polarized light removing means for each color light which generates heat due to light from a light source is air-cooled by the air-cooling means having a simple configuration, the unnecessary polarized light removing means for each color light can be prevented from being deteriorated due to heat generation.

According to a fourth aspect of the present invention, in any one of the first, second and third aspects of the present invention, a triangular prismatic housing (31) for each color light is arranged in proximity to the color combination optical system (40), the triangular prismatic housing (31) for each color light having: a first surface (31a) which has an inclination angle of approximately 45° with respect to an optical axis of each color light from each color light illuminating means (11-21) and on which the reflective polarizing plate (32) for each color light is attached; a second surface (31b) which is orthogonal to the optical axis of each color light transmitted through the reflective polarizing plate (32) for each color light and on which the reflective spatial light modulation element (33) for each color light is attached; a third surface (31c) which is orthogonal to the optical axis of each color light obtained by reflecting reflected light from the reflective spatial light modulation element (33) for each color light by the reflective polarizing plate (32) for each color and on which the unnecessary polarized light removing means (34, (35)) for each color light is attached; and a lower surface (31d) and an upper surface (31e) which seal a space surrounded by the first surface (31a) to the third surface (31c).

According to a fifth aspect of the present invention, in any one of the first, second and third aspects of the present invention, a triangular prismatic housing (31) for each color light is arranged in proximity to the color combination optical system (40), the triangular prismatic housing (31) for each color light having: a first surface (31a) which has an inclination angle of approximately 45° with respect to an optical axis of each color light from each color light illuminating means (11-21) and on which the reflective polarizing plate (32) for each color light is attached; a second surface (31b) which is orthogonal to the optical axis of each color light transmitted through the reflective polarizing plate (32) for each color light and on which the reflective spatial light modulation element (33) for each color light is attached; a third surface (31c) which is orthogonal to the optical axis of each color light obtained by reflecting reflected light from the reflective spatial light modulation element (33) for each color light by the reflective polarizing plate (32) for each color and on which a transparent glass plate (36) for each color light is attached; and a lower surface (31d) and an upper surface (31e) which seal a space surrounded by the first surface (31a) to the third surface (31c), and the unnecessary polarized light removing means (37) for each color light is secured on each incidence surface (40a-40c) of the color combination optical system (40) which faces the transparent glass plate (36) for each color light attached on the third surface (31c) of the triangular prismatic housing (31) for each color light.

According to a sixth aspect of the present invention, in any one of the first, second and third aspects of the present invention, a triangular prismatic housing (31) for the R light, a triangular prismatic housing (31) for the G light and a triangular prismatic housing (31) for the B light are arranged in proximity to the color combination optical system (40), the triangular prismatic housing for the R light having: a first surface (31a) which has an inclination angle of approximately 45° with respect to an optical axis of the R light in the respective color lights from each color light illuminating means (11-21) and on which a reflective polarizing plate (32) for R light is attached; a second surface (31b) which is orthogonal to the optical axis of the R light transmitted through the reflective polarizing plate (32) for the R light and on which a reflective spatial light modulation element (33) for R light is attached; a third surface (31c) which is orthogonal to the optical axis of the R light obtained by reflecting reflected light from the reflective spatial light modulation element (33) for the R light by the reflective polarizing plate (32) for the R light and on which a transparent glass plate (36) for R light is attached; and a lower surface (31d) and an upper surface (31e) which seal a space surrounded by the first surface (31a) to the third surface (31c), the triangular prismatic housing (31) for the G light having: a first surface (31a) which has an inclination angle of approximately 45° with respect to an optical axis of the G light in the respective color lights from each color light illuminating means (11-21) and on which a reflective polarizing plate (32) for G light is attached; a second surface (31b) which is orthogonal to the optical axis of the G light transmitted through the reflective polarizing plate (32) for the G light and on which a reflective spatial light modulation element (33) for G light is attached; a third surface (31c) which is orthogonal to the optical axis of the G light obtained by reflecting reflected light from the reflective spatial light modulation element (33) for the G light by the reflective polarizing plate (32) for the G light and on which a transparent glass (36) for G light is attached; and a lower surface (31d) and an upper surface (31e) which seal a space surrounded by the first surface (31a) to the third surface (31c); the triangular prismatic housing (31) for the B light having: a first surface (31a) which has an inclination angle of approximately 45° with respect to an optical axis of the B light in the respective color lights from each color light illuminating means (11-21) and on which a reflective polarizing plate (32) for B light is attached; a second surface (31*b*) which is orthogonal to the optical axis of the B light transmitted through the reflective polarizing plate (32) for the B light and on which a reflective spatial light modulation element (33) for B light is attached; a third surface (31*c*) which is orthogonal to the optical axis of the B light obtained by reflecting reflected light from the reflective spatial light modulation element (33) for the B light by the reflective polarizing plate (32) for the B light and on which unnecessary polarized light removing means (35) for B light is attached; and a lower surface (31*d*) and an upper surface (31*e*) which seal a space surrounded by the first surface (31*a*) to the third surface (31*c*), and unnecessary polarized light removing means (37) for R light and G light are secured on respective incidence surfaces (40*a*, 40*b*) of the color combination optical system (40) which respectively face the transparent glass plate (36) for the R light attached on the third surface (31*c*) of the triangular prismatic housing (31) for the R light and the transparent glass plate (36) for the G light attached on the third surface (31*c*) of the triangular prismatic housing (31) for the G light.

According to the fourth, fifth and sixth aspects of the present invention, since the inside of a triangular prismatic housing is sealed in a state where the reflective polarizing plate (a so-called "wire grid polarizer") is attached on a first surface of the triangular prismatic housing, the reflective spatial light modulation element (a reflective liquid crystal panel) is attached on a second surface of the triangular prismatic housing and the unnecessary polarized light removing means or a transparent glass plate is attached on a third surface of the triangular surface, dust does not enter the triangular prismatic housing, thereby improving quality and reliability with respect to each component attached in the triangular prismatic housing.

According to a seventh aspect of the present invention, in any one of the first, second and third aspects of the present invention, a triangular prismatic housing (31) for each color light is arranged in proximity to the color combination optical system, the triangular prismatic housing (31) for each color light having: a first surface (31*a*) which has an inclination angle of approximately 45° with respect to an optical axis of each color light from each color light illuminating means (11-21) and on which the reflective polarizing plate (32) for each color light is attached; a second surface (31*b*) which is orthogonal to the optical axis of each color light transmitted through the reflective polarizing plate (32) for each color light and on which the reflective spatial light modulation element (33) for each color light is attached; a third surface (31*c*) which has a predetermined inclination angle with respect to the optical axis of each color light obtained by reflecting reflected light from the reflective spatial light modulation element (33) for each color light by the reflective polarizing plate (32) for each color light and on which the unnecessary polarized light removing means (34, (35)) for each color light is attached in order to prevent unnecessary reflected light from the projection lens (42) side from being projected; and a lower surface (31*d*) and an upper surface (31*a*) which seal a space surrounded by the first surface (31*a*) to the third surface (31*c*).

According to an eighth aspect of the present invention, in any one of the first, second and third aspects of the present invention, a triangular prismatic housing (31) for each color light is arranged in proximity to the color combination optical system (40), the triangular prismatic housing (31) for each color light having: a first surface (31*a*) which has an inclination angle of approximately 45° with respect to an optical axis of each color light from each color light illuminating means (11-21) and on which the reflective polarizing plate (32) for each color light is attached; a second surface (31*b*) which is orthogonal to the optical axis of each color light transmitted through the reflective polarizing plate (32) for each color light and on which the reflective spatial light modulation element (33) for each color light is attached; a third surface (31*c*) which has a predetermined inclination angle with respect to the optical axis of each color light obtained by reflecting reflected light from the reflective spatial light modulation element (33) for each color light by the reflective polarizing plate (32) for each color light and on which a transparent glass plate (36) for each color light is attached in order to prevent unnecessary reflected light from the projection lens (42) side from being projected; and a lower surface (31*d*) and an upper surface (31*e*) which seal a space surrounded by the first surface (31*a*) to the third surface (31*c*), and the unnecessary polarized light removing means (37) for each color light is secured on each incidence surface (40*a*, 40*b*) of the color combination optical system (40) which faces the transparent glass plate (36) for each color light attached on the third surface (31*a*) of the triangular prismatic housing (31) for each color light.

According to a ninth aspect of the present invention, in any one of the first, second and third aspects of the present invention, a triangular prismatic housing (31) for R light, a triangular prismatic housing (31) for G light and a triangular prismatic housing (31) for B light are arranged in proximity to the color combination optical system (40), the triangular prismatic housing for the R light having: a first surface (31*a*) which has an inclination angle of approximately 45° with respect to an optical axis of the R light in the respective color lights from each color light illuminating means (11-21) and on which a reflective polarizing plate for R light is attached; a second surface (31*b*) which is orthogonal to the optical axis of the R light transmitted through the reflective polarizing plate (32) for the R light and on which a reflective spatial light modulation element (33) for R light is attached; a third surface (31*c*) which has a predetermined inclination angle with respect to the optical axis of the R light obtained by reflecting reflected light from the reflective spatial light modulation element (33) for the R light by the reflective polarizing plate (32) for the R light and on which a transparent glass plate (36) for R light is attached in order to prevent unnecessary reflected light from the projection lens (42) side from being projected; and a lower surface (31*d*) and an upper surface (31*e*) which seal a space surrounded by the first surface (31*a*) to the third surface (31*c*), the triangular prismatic housing (31) for the G light having: a first surface (31*a*) which has an inclination angle of approximately 45° with respect to an optical axis of the G light in the respective color lights from each color light illuminating means (11-21) and on which a reflective polarizing plate (32) for G light is attached; a second surface (31*b*) which is orthogonal to the optical axis of the G light transmitted through the reflective polarizing plate (32) for the G light and on which a reflective spatial light modulation element (33) for G light is attached; a third surface (31*c*) which has a predetermined inclination angle with respect to the optical axis of the G light obtained by reflecting reflected light from the reflective spatial light modulation element (33) for the G light by the reflective polarizing plate (32) for the G light and on which a transparent glass plate (36) for G light is attached in order to prevent unnecessary reflected light from the projection lens (42) side from being projected; and a lower surface (31*d*) and an upper surface (31*e*) which seal a space surrounded by the first surface (31*a*) to the third surface (31*c*), the triangular prismatic housing

(31) for the B light having: a first surface (31a) which has an inclination angle of approximately 45° with respect to an optical axis of the B light in the respective color lights from each color light illuminating means (11-21) and on which a reflective polarizing plate for B light is attached; a second surface which is orthogonal to the optical axis of the B light transmitted through the reflective polarizing plate (32) for the B light and on which a reflective spatial light modulation element (33) for B light is attached; a third surface (31c) which has a predetermined inclination angle with respect to the optical axis of the B light obtained by reflecting reflected light from the reflective spatial light modulation element for the B light by the reflective polarizing plate (32) for the B light and on which unnecessary polarized light removing means (35) for B light is attached in order to prevent unnecessary reflected light from the projection lens (42) side from being projected; and a lower surface (31d) and an upper surface (31e) which seal a space surrounded by the first surface (31a) to the third surface (31c), and unnecessary polarized light removing means (37) for R light and G light are secured on respective incidence surfaces (40a, 40b) of the color combination optical system (40) which respectively face the transparent glass plate (36) for the R light attached on the third surface (31c) of the triangular prismatic housing (31) for the R light and the transparent glass plate (36) for the G light attached on the third surface (31c) of the triangular prismatic housing (31) for the G light.

According to the seventh, eighth and ninth aspects of the present invention, since the inside of the triangular prismatic housing is sealed in a state where the reflective polarizing plate (a so-called "wire grid polarizer") is attached on the first surface of the triangular prismatic housing, the reflective spatial light modulation element (a reflective liquid crystal panel) is attached on the second surface of the triangular prismatic housing and the unnecessary polarized light removing means or a transparent glass plate is attached on the third surface of the triangular prismatic housing which is inclined at a predetermined angle, dust does not enter the triangular prismatic housing, thereby improving quality and reliability with respect to each component attached in the triangular prismatic housing. Further, since the unnecessary polarized light removing means or the transparent glass plate obliquely attached on the third surface of the triangular prismatic housing at a predetermined angle prevents unnecessary reflected light from the projection lens side from being projected, contrast is not lowered with respect to color-combined image light emitted from the projection lens, and a factor of displaying a ghost image can be also removed, whereby the color-combined image light with high picture quality can be projected onto the screen.

According to a tenth aspect of the present invention, the unnecessary polarized light removing means (34, (35), (37)) for each color light has a function of restricting a disused wavelength band in any one of the first to ninth aspects of the present invention.

According to the tenth aspect of the present invention, since the unnecessary polarized light removing means for each color light has the function of restricting a disused wavelength band, it is possible to obtain a projected image with high color purity and improved contrast.

According to an eleventh aspect of the present invention, the transparent glass plate (36) for each color light has a function of restricting a disused wavelength band in the fifth or eighth aspect of the present invention.

According to a twelfth aspect of the present invention, the transparent glass plate (36) for the R light and the G light has a function of restricting a disused wavelength band in the sixth or ninth aspect of the present invention.

According to the eleventh and twelfth aspects of the present invention, since the transparent glass plate for each color light and the transparent glass plate for the R light and the G light have the function of restricting a disused wavelength band, it is possible to obtain a projected image with high color purity and improved contrast.

Furthermore, in order to achieve the above object, according to a thirteenth aspect of the present invention, there is provided a projection type display apparatus (10) comprising: a reflective polarizing plate (32) which has an inclination angle of approximately 45° with respect to an optical axis of an incident light from a light source (11) and transmits a predetermined polarized light; a reflective modulation element (33) which modulates the predetermined polarized light from the reflective polarizing plate (32) and reflects the modulated polarized light; and a closed-type triangular prismatic housing (31) which has triangular upper and lower surfaces (31d, 31e) and first to third surfaces (31a, 31b, 31c) connecting the upper surface (31e) and the lower surface (31d), the reflective polarizing plate (32) and the reflective modulation element (33) being attached on inner surfaces of the first surface (31a) and the second surface (31b), respectively, wherein a polarized light having a polarized light component orthogonal to the incident light included in a light reflected on the reflective modulation element (33) is reflected on the reflective polarizing plate (32) and then emitted from the third surface (31c) of the closed-type triangular prismatic housing (31).

According to a fourteenth aspect of the present invention, unnecessary polarized light removing means (34, (35), (37)) attached on an inner surface of the third surface (31c) of the closed-type triangular prismatic housing (31), for removing an unnecessary polarize light is further provided in the thirteenth aspect of the present invention.

According to a fifteenth aspect of the present invention, the unnecessary polarized light removing means (34, (35), (37)) is a polarizing plate (34, (37)) which absorbs the unnecessary polarized light or a polarizing plate (35) which reflects the unnecessary polarized light in the fourteenth aspect of the present invention.

The nature, principle and utility of the invention will become more apparent from the following detailed description when read in conjunction with the accompanying drawings.

DETAILED DESCRIPTION OF THE PREFERRED EMBODIMENTS

Embodiments of a projection type display apparatus according to the present invention will now be described in detail hereinafter in the order of Embodiments 1 to 3 with reference to the accompanying drawings.

Embodiment 1

Figure 4:
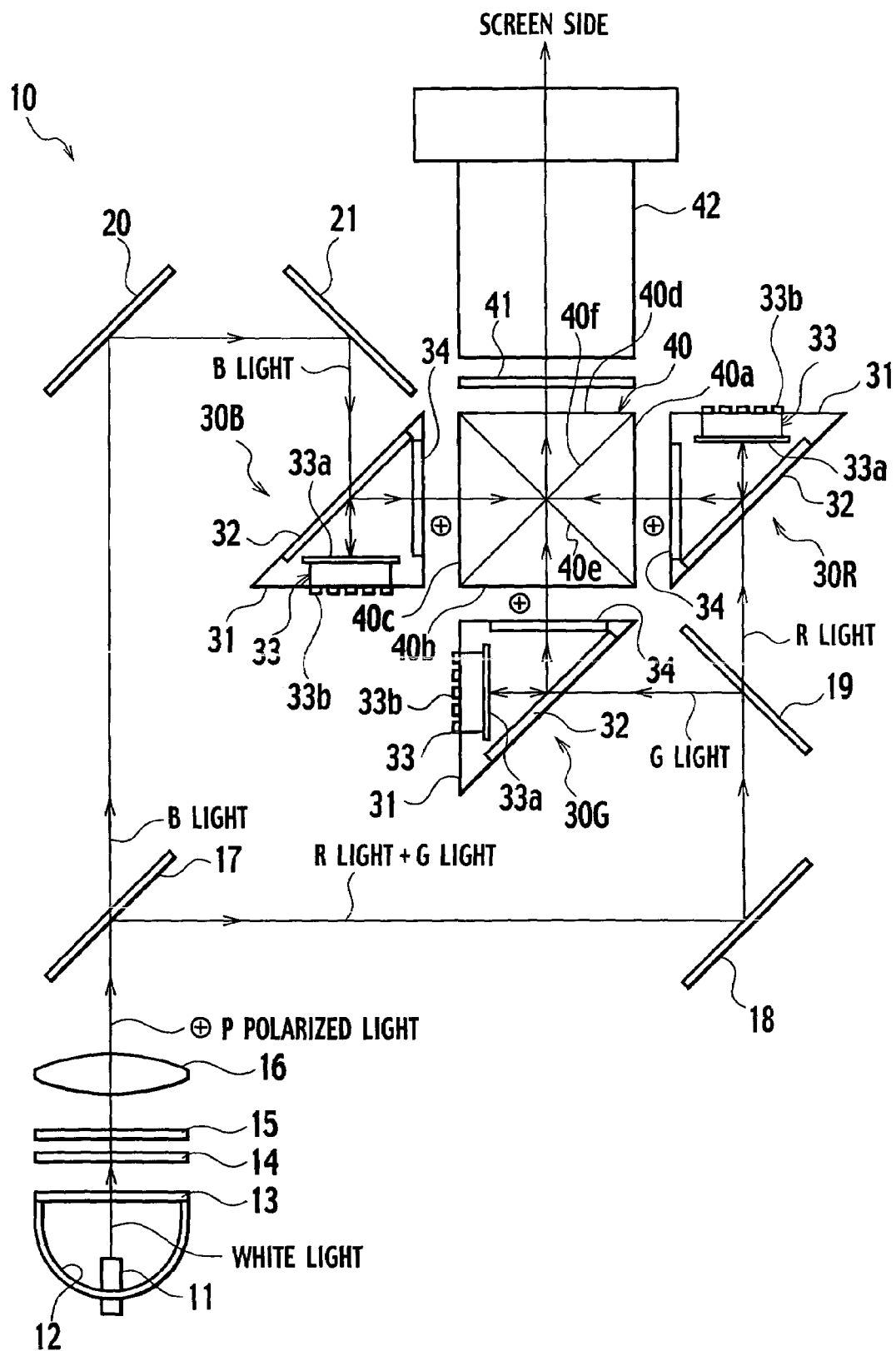
FIG. 4 is a plan view showing a configuration of a projection type display apparatus of Embodiment 1 according to the present invention.
Figure 5A:
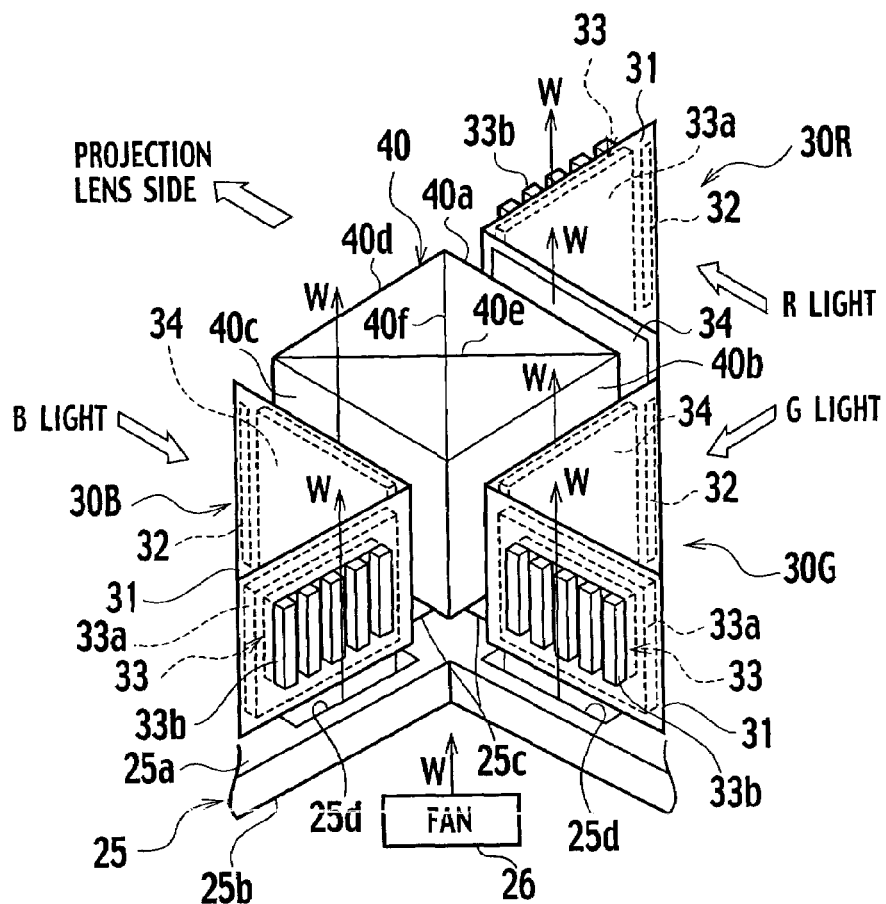
FIGS. 5A and 5B are a perspective view showing respective reflective liquid crystal panel assemblies for R, G and B lights and a three-color combination cross dichroic prism and a side view showing the three-color combination cross dichroic prism and the reflective liquid crystal panel assembly for the G light in the projection type display apparatus of Embodiment 1 according to the present invention.
Figure 5B:
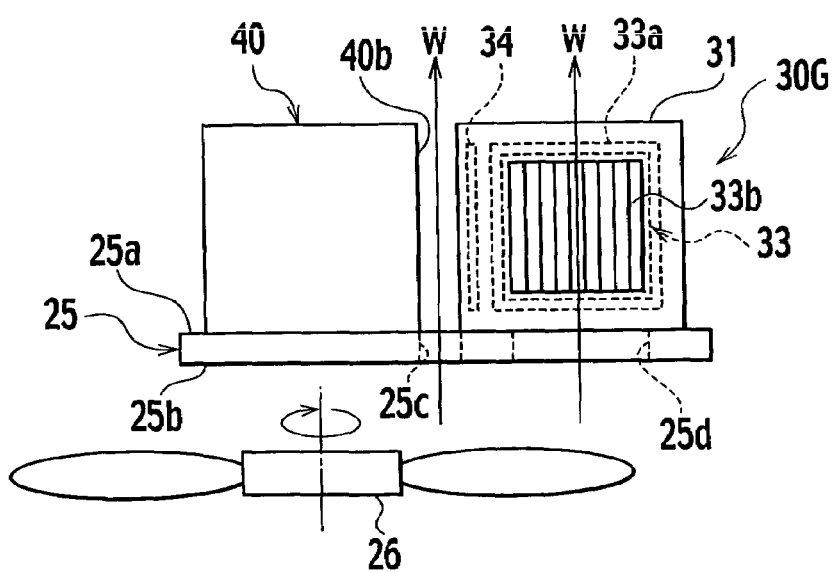
Figure 6:
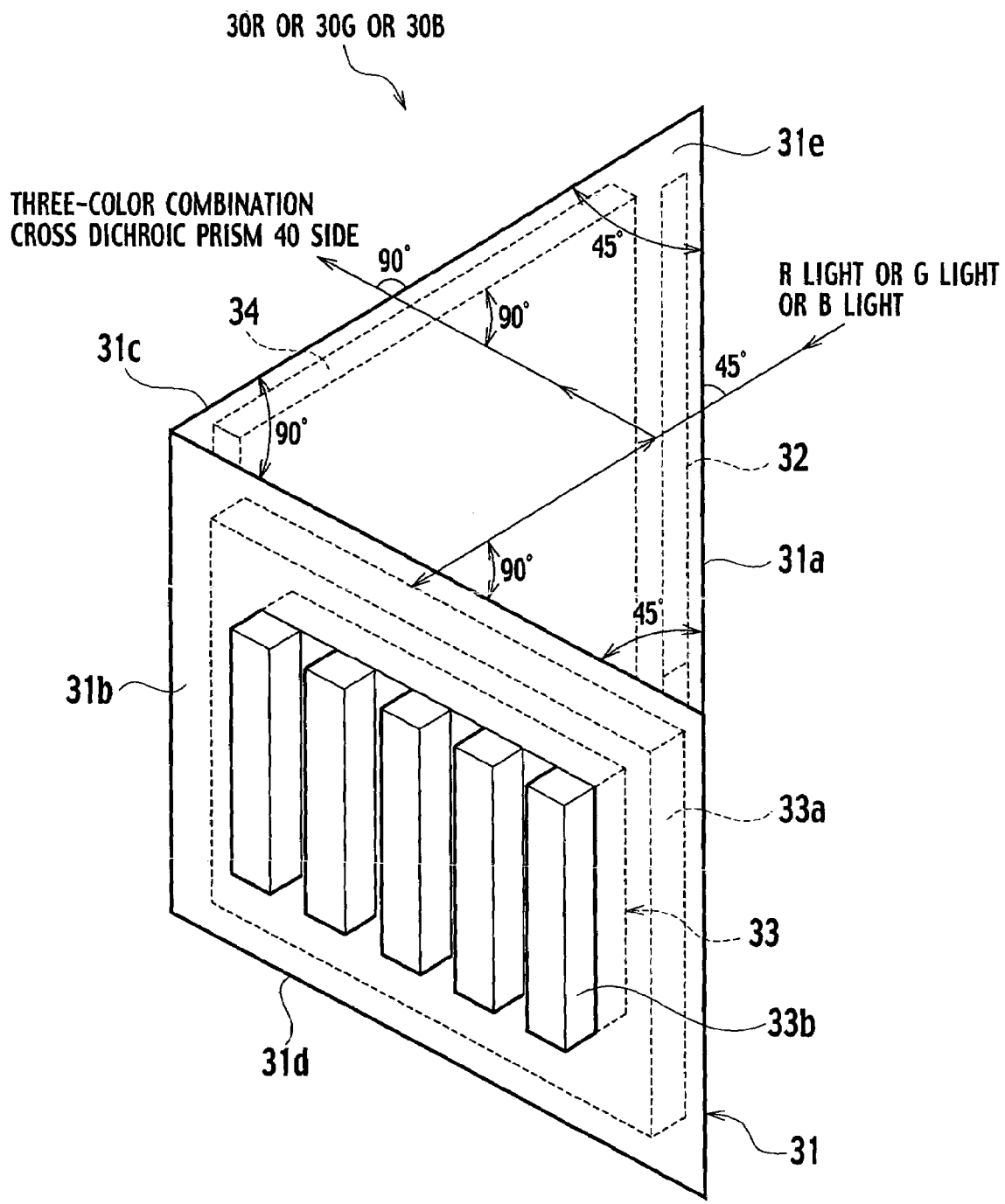
FIG. 6 is a perspective view showing the reflective liquid crystal display panel assembly for the R light, the G light or the B light in an enlarging manner in the projection type display apparatus of Embodiment 1 according to the present invention.
Figure 7A:
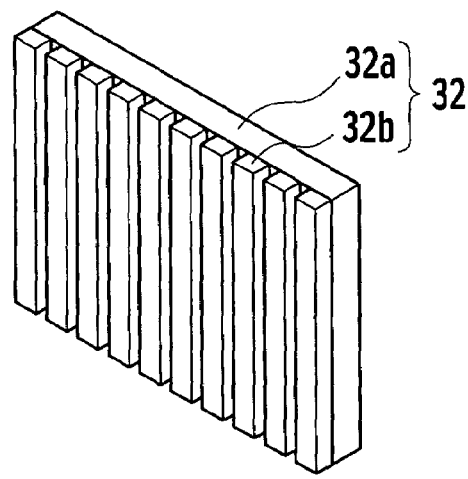
FIGS. 7A to 7C are views illustrating a reflective polarizing plate in the reflective liquid crystal panel assembly in the projection type display apparatus of Embodiment 1 according to the present invention.
Figure 7B:
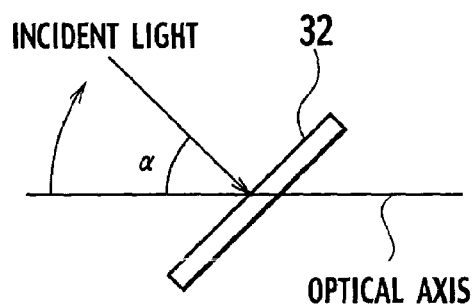
Figure 7C:
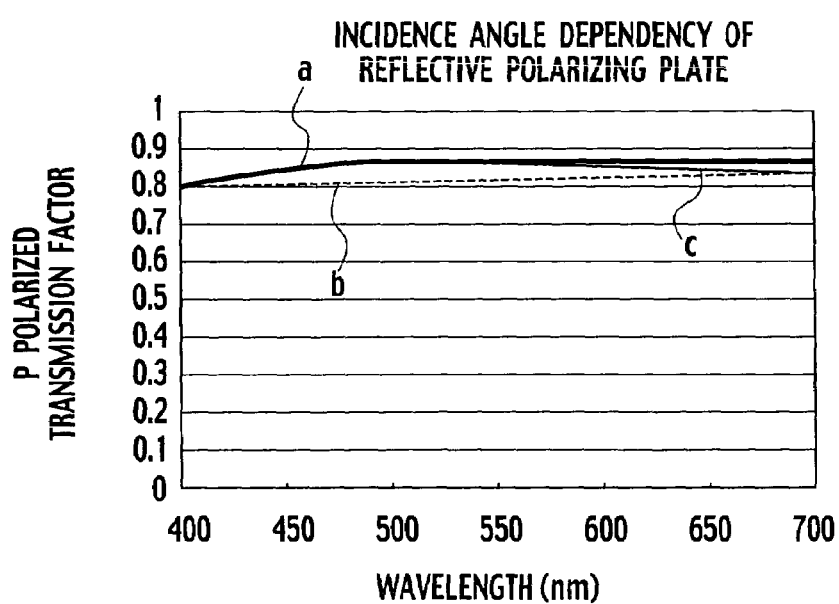

FIG. 4 is a plan view showing a configuration of a projection type display apparatus of Embodiment 1 according to the present invention. FIGS. 5A and 5B are a perspective view showing respective reflective liquid crystal panel assemblies for R, G and B lights and a three-color combination cross dichroic prism and a side view showing the three-color combination cross dichroic prism and the reflective liquid crystal panel assembly for the G light in the projection type display apparatus or Embodiment 1 according to the present invention. FIG. 6 is a perspective view showing the reflective liquid crystal panel assembly for the R light, the G light or the B light in the projection type display apparatus of Embodiment 1 according to the present invention. FIGS. 7A to 7C are views illustrating a reflective polarizing plate in the reflective liquid crystal panel assembly in the projection type display apparatus of Embodiment 1 according to the present invention.

As shown in FIG. 4, a projection type display apparatus 10 of Embodiment 1 according to the present invention is constituted by using a reflection type which reflects light as each spatial light modulation element corresponding to R light, G light or B light as will be described later. In this projection type display apparatus 10, on the same plane are arranged a light source 11 which emits white light as non-polarized light, color separation optical systems 17 and 19 which subject the white light from the light source 11 to color separation to obtain the R light (red light), the G light (green light) and the B light (blue light), respective reflective spatial light modulation elements (which will be referred to as reflective liquid crystal panels hereinafter) 33 for the R, G and B lights, a three-color combination cross dichroic prism 40 which performs color combination of image lights having the respective colors subjected to light modulation by the respective reflective liquid crystal panels 33 for the R, G and B lights, and a projection lens 42 which projects color-combined image light obtained by the three-color combination cross dichroic prism 40.

First, the light source 11 emits white light as non-polarized light including the R light, the G light and the B light by using, e.g., a metal halide lamp, a xenon lamp or a halogen lamp. When the white light emitted from this light source 11 is reflected by a concave spherical reflecting mirror 12, the white source is turned to each parallel light to sequentially enter a first fly-eye lens array 13 attached on a front surface of the concave spherical reflecting mirror 12 and a second fly-eye lens array 14 provided in front of this first fly-eye lens array 13. These first and second fly-eye lens arrays 13 and 14 form a pair to constitute an integrator which homogenizes an illumination distribution within a light beam of the white light. It is to be noted that a non-illustrated visible external light removing filter which cuts ultraviolet light and infrared light may be arranged in front of the light source 11.

Then, the non-polarized white light whose illumination distribution has been homogenized by the first and second fly-eye lens arrays 13 and 14 is allowed to enter a polarization converting prism array 15 as a polarization converting optical element. This polarization converting prism array 15 has a polarization split prism array and a λ/2 wave plate, and is constituted into a tabular shape as a whole. That is, light which has entered this polarization converting prism array 15 is first divided into a P polarized component and an S polarized component with respect to polarizing beam splitter film surfaces by the polarizing beam splitter film surfaces of the polarization split prism array. At this time, the plurality of polarizing beam splitter film surfaces of the polarization converting prism array 15 are provided in the form of parallel strips, and each film surface has an inclination of approximately 45° with respect to a main surface of the polarization converting prism array 15. The P polarized component is transmitted through the polarizing beam splitter film surfaces to be emitted to a front surface side of the polarization converting prism array 15, and the S polarized component is reflected by the polarizing beam splitter film surfaces. An optical path of the S polarized component reflected by one polarizing beam splitter film surface is deflected 90°. This S polarized component is again reflected by an adjacent polarizing beam splitter film surface so that its optical path is deflected 90°, and is emitted to the front surface side of the polarization converting prism array 15. Furthermore, the λ/2 wave plate is provided in a region to which such an S polarized component is emitted. A polarization direction of the S polarized component transmitted through this λ/2 wave plate is rotated 90° so that the S polarized component has the same polarization direction as that of the P polarized component transmitted through the polarizing beam splitter film surfaces (or the S polarized component reflected twice by the polarizing beam splitter film surfaces). After the non-polarized white light from the light source 11 is transmitted through the polarization converting prism array 15 in this manner, the white light is turned to polarized light in a predetermined direction.

In this Embodiment 1, the light transmitted through the polarization converting prism array 15 is converted into, e.g., P polarized light as the polarized light in a predetermined direction as indicated by a sign in FIG. 4.

However, polarization converting efficiency in the polarization converting prism array 15 is not 100%, and the S polarized component of several % to several-ten % is included in the light emitted from this polarization converting prism array 15.

It is to be noted that a description will be given as to the polarized light in a predetermined direction obtained by the polarization converting prism array 15 as the P polarized light, but the present invention is not restricted thereto, and it is possible to adopt a method which subjects the white light from the light source 11 to polarization conversion to be turned to the S polarized light in the light converting prism array 15.

Then, the white light as the P polarized light transmitted through the polarization converting prism array 15 enters the first dichroic mirror 17 through a field lens 16. This first dichroic mirror 17 reflects two color components, i.e., the R light and the G light from the white light including the R light, the G light and the B light so that their direction is changed 90°, and transmits the remaining B light therethrough so that the B light travels straight ahead. Additionally, the R light and the G light reflected by the first dichroic mirror 17 fall on a first metal film reflecting mirror 18 to be reflected by this first metal film reflecting mirror 18 so that their direction is changed 90°. Thereafter, these lights enter or fall on the second dichroic mirror 19. In this second dichroic mirror 19, the R light is transmitted therethrough to travel straight ahead so that the R light enters a reflective liquid crystal panel assembly 30R for the R light and, on the other hand, the G light is reflected so that its direction is changed 90°, and the G light then enters a reflective liquid crystal panel assembly 30G for the G light.

Further, the B light transmitted through the first dichroic mirror 17 is sequentially reflected by second and third metal film reflecting mirrors 20 and 21 to enter a reflective liquid crystal panel assembly 30B for the B light.

The first and second dichroic mirrors 17 and 19 constitute color separation optical systems which subject the white light from the light source 11 to color separation to be divided into the R light, the G light and the B light, and the respective constituent members from the light source 11 to the color separation optical systems 17 and 19 constitute respective color light illuminating means which illuminate the reflective liquid crystal panels (reflective spatial light modulation elements) 33 for the respective color lights with the R light, the G light and the B light.

It is to be noted that the description has been given as to the example in which the white light from the light source 11 is subjected to color separation to be divided into the R light, the G light and the B light by the color separation optical systems 17 and 19 in this Embodiment 1, but the present invention is not restricted thereto. For example, when respective LED light sources for the R light, the G light and the B light which emit the R light, the G light and the B light are used, the color separation optical systems 17 and 19 do not have to be provided, and hence the respective reflective liquid crystal panels 33 for the respective color lights corresponding to the respective color lights may be directly illuminated with the respective polarized components in one direction of the R light, the G light and the B light emitted from the LED light sources for the respective color lights as respective color light illuminating means. Furthermore, the LED light sources for the respective color lights as the respective color light illuminating means can be applied to later-described Modifications 1 to 9 obtained by partially modifying Embodiment 1, a later-described Embodiment 2 and a later-described Embodiment 3.

Here, the reflective liquid crystal panel assembly 3OR for the R light, the reflective liquid crystal panel assembly 30G for the G light and the reflective liquid crystal panel assembly 30B for the B light all have the same configuration, and the reflective liquid crystal panel assembly 30R for the R light, the reflective liquid crystal panel assembly 30G for the G light and the reflective liquid crystal panel assembly 30B for the B light respectively face respective incidence surfaces 40a to 40c of the three-color combination cross dichroic prism 40 as a color combination optical system having a rectangular parallelepiped shape with respective gaps therebetween.

In this example, as shown in FIGS. 5A and 5B, the reflective liquid crystal panel assembly 30R for the R light, the reflective liquid crystal panel assembly 30G for the G light, the reflective liquid crystal panel assembly 30B for the B light and the three-color combination cross dichroic prism 40 are fixed on an upper surface 25a of a base board 25 using an aluminum material or the like by an adhesive.

Furthermore, as shown in FIG. 6 in an enlarging manner, in each of the reflective liquid crystal panel assembly 30R for the R light, the reflective liquid crystal panel assembly 30G for the G light and the reflective liquid crystal panel assembly 30B for the B light, a hollow triangular prismatic housing 31 is prepared for each color light, a tabular reflective polarizing plate (a sol-called "wire grid polarizer") 32 as polarization splitting means is attached on a first surface 31a having an inclination angle of approximately 45° with respect to an optical axis of each color light from each color light illuminating means from the light source (FIG. 4) to the color separation optical systems 17 and 19 (FIG. 4) in the triangular prismatic housing for each color light, a reflective liquid crystal panel 33 is attached on a second surface 31b orthogonal to the optical axis of each color light transmitted through the reflective polarizing plate 32 for each color light, a transmission type polarizing plate 34 as unnecessary polarized light removing means is attached on a third surface 31c orthogonal to the optical axis of each color light obtained by reflecting reflected light from the reflective liquid crystal panel 33 for each color light by the reflective polarizing plate 32 for each color light, and each side on which the transmission type polarizing plate 34 for each color light is arranged faces each of the incidence surfaces 40a to 40c (FIGS.4, 5A and 5B) of the three-color combination cross dichroic prism 40 with a gap therebetween in a state where a space surrounded by the first surface 31a to the third surface 31c of the triangular prismatic housing 31 is sealed from dust or the like by a lower surface 31d and an upper surface 31e.

It is to be noted that the triangular prismatic housing 31 is also applied to later-described Modifications 1 to 3 obtained by partially modifying Embodiment 1.

In this example, the reflective polarizing plate 32, the reflective liquid crystal panel 33 and the transmission type polarizing plate 34 respectively attached on the triangular prismatic housing 31 for each color are vertically provided with respect to an upper surface 25a of the base board 25 (FIGS. 5A and 5B).

Further, a wave plate 33a which corrects the liquid crystal corresponding to a pre-tilt by reciprocation is attached on a front surface of the reflective liquid crystal panel 33, and a heat sink 33b which cools the reflective liquid crystal panel 33 is attached on a rear surface of this reflective liquid crystal panel 33.

Furthermore, for example, when the R light of the P polarized component enters the reflective liquid crystal panel assembly 30R for the R light, this R light of the P polarized component is transmitted through the reflective polarizing plate 32 attached on the triangular prismatic housing 31 to enter the reflective liquid crystal panel 33 for the R light.

Moreover, as shown in FIG. 7A, the reflective polarizing plate 32 which is also referred to as the "wire grid polarizer" is formed by regularly arranging a plurality of metal wires 32b of aluminum or the like in a strip form on an optical glass plate 32a at a pitch of, e.g., 140 nm, and has a function of transmitting a polarized component (e.g., the P polarized light) vertical to the metal wires 32b therethrough and a function of reflecting a polarized component (e.g., the S polarized light) parallel to the metal wires 32b.

Additionally, as shown in FIG. 7B, assuming that an incidence angle α of incident light based on the P polarized light with respect to the reflective polarizing plate 32 is a parameter, FIG. 7C shows wavelength dependence of a transmission factor of the P polarized component. In this FIG. 7C, a indicates a case where the incidence angle α of the incident light based on the P polarized light with respect to the reflective polarizing plate 32 is 0°, b indicates a case where the incidence angle α is −15°, and c indicates a case where the incidence angle α is +15°. It is to be noted that the incidence angle α is an angle formed by the incident light on the reflective polarizing plate 32 with respect to the optical axis, and an incidence surface of the reflective polarizing plate 32 is inclined approximately 45° with respect to the optical axis. In this reflective polarizing plate 32, even if the incidence angle α reaches ±15°, the wavelength dependence of a transmission factor of the P polarized light is very small and stable in a visible wavelength region.

Therefore, it can be understood that a bright display image with excellent color reproducibility can be obtained when the reflective polarizing plate 32 is used. Additionally, since the reflective polarizing plate 32 is one tabular polarization splitting plate, it is light in weight. Further, since the reflective polarizing plate 32 hardly absorbs light emitted from the light source 11 (FIG. 4), it can suppress a reduction in quality of a display image due to birefringence.

Again referring to FIGS. 4, 5A and 5B, when the R light based on the P polarized light transmitted through the reflective polarizing plate 32 for the R light enters the reflective liquid crystal panel 33 for the R light, a light beam reflected after being subjected to light modulation in accordance with an image signal of the R light in the reflective liquid crystal panel 33 for the R light through the wave plate 33a attached on the surface of the reflective liquid crystal panel 33 is again transmitted through the wave plate 33a to return to the reflective polarizing plate 32 for the R light. Here, only a light beam of the S polarized light which has been light-modulated and reflected by the reflective liquid crystal panel 33 for the R light is reflected by the reflective polarizing plate 32 for the R light.

In this example, the reflective liquid crystal panel 33 has a reflection type configuration in which switching elements are provided on a silicon substrate in a matrix form, a plurality of pixel electrodes formed of a metal such as aluminum are provided in a matrix form on the switching elements through an insulating layer, a liquid crystal is included between the plurality of pixel electrodes and a common electrode provided on a transparent substrate, a voltage is applied between the plurality of pixel electrodes and the common electrode, incident light which has entered from the transparent substrate side is subjected to light modulation in accordance with an image signal of each color light, and image light obtained by reflecting this incident light by the plurality of pixel electrodes is emitted. Such a reflective liquid crystal panel 33 has a high degree of pixel integration and hence it is suitable for a high-resolution image. Further, it has an advantage that a numerical aperture can be increased to approximately 90% and a bright, smooth and fine image can be displayed since a circuit structure can be laminated below the plurality of pixel electrodes.

Then, the R light based on the S polarized light reflected by the reflective polarizing plate 32 for the R light enters the transmission type polarizing plate 34 as the unnecessary polarized light removing means for the R light arranged to face the three-color combination cross dichroic prism 40 in the triangular prismatic housing 31 for the R light, and the R light is allowed to enter from the incidence surface 40a of the three-color combination cross dichroic prism 40 while removing the P polarized light (the unnecessary polarized light) which is an unwanted polarized component in this transmission type polarizing plate 34.

In this example, the transmission type polarizing plate 34 as the unnecessary polarized light removing means is provided in order to remove the unnecessary P polarized light since the P polarized light as the unnecessary polarized light can be a factor of lowering a contrast ratio of a display image if the P polarized light is mixed in the reflected light from the reflective polarizing plate 32. Furthermore, as the transmission type polarizing plate 34, absorption dichroism is obtained by performing dyeing and absorption of a dichroic material such as iodine or an organic dye in a base material film (polyvinyl alcohol; PVA) and highly drawing and orienting the obtained material. A polarizing film in which this PVA polarizing layer is held between TAC (triacetylcellulose) layers is attached on a glass substrate by a binder or an adhesive. The transmission type polarizing plate 34 having such absorption dichroism as a fundamental principle absorbs a polarized component in the same direction as an array of a dichroic dye and transmits the other polarized component of orthogonal polarized components of an incident light beam.

Since this transmission type polarizing plate 34 is of a light absorption type, it is desirable to constitute this plate by using a substrate of, e.g., crystal or sapphire superior in thermal conductivity while considering heat resisting properties and heat radiating properties. In order to improve a light utilization ratio and avoid a reduction in quality of a display image due to unwanted reflected light on an interface, a reflection reducing coat must be applied to an air interface of the transmission type polarizing plate 34. It is desirable to optimize these polarization characteristics and antireflective coat characteristics with respect to each of the R, G and B colors.

Furthermore, although the transmission type polarizing plate 34 may comprise a single-sided film, it is difficult to flatten a surface of the film in wavelength order, and hence non-planarity of this film surface becomes a wavefront aberration, which can be a factor of deteriorating a resolution. Thus, in order to realize a higher resolution, this polarizing film is held between flat substrates (white sheet glass, optical glass, crystal, quartz, sapphire and others) subjected to optical polishing, and irregularities of the film are filled with an adhesive or an adhesive compound, thereby preventing the resolution from being deteriorated.

Then, like the R light, when the G light and the B light are allowed to enter the reflective liquid crystal panel assembly 30G for the G light and the reflective liquid crystal panel assembly 30B for the B light, the G light and the B light of the S polarized light which has been light-modulated and reflected by the reflective liquid crystal panels 33 and 33 for the G light and the B light are allowed to enter from the incidence surface 40b and the incidence surface 40c of the three-color combination cross dichroic prism 40.

Thereafter, the respective image lights of the R light, the G light and the B light which have entered from the respective incidence surfaces 40a to 40c of the three-color combination cross dichroic prism 40 are subjected to color combination by first and second dichroic films 40e and 40f formed in the three-color combination cross dichroic prism 40, color-combined image light obtained by this three-color cross dichroic prism 40 is emitted from an emission surface 40d to enter a projection lens 42 through a ¼ wave plate 41, and the color-combined image light from which unnecessary polarized light has been removed by the transmission type polarizing plate 34 is projected onto a non-illustrated screen by the projection lens 42. Therefore, high luminance and high contrast can be achieved, thereby contributing to an improvement in quality and reliability of the projection type display apparatus 10.

In this example, the three-color combination cross dichroic prism 40 is formed into a rectangular parallelepiped shape (including a cubic shape) by using optical glass, and the first and second dichroic films 40e and 40f cross each other in an X-like shape as seen from the upper surface.

Moreover, the first dichroic film 40e in the three-color combination cross dichroic prism 40 is provided with a function of reflecting the R light which has entered from the incidence surface 40a and changing a direction of this light 90° so that this light is emitted from the emission surface 40d, of transmitting the G light which has entered from the incidence surface 40b therethrough so that this light is emitted from the emission surface 40d, and of also transmitting the B light which has entered from the incidence surface 40c therethrough. Additionally, the second dichroic film 40f of the three-color combination cross dichroic prism 40 is provided with a function of reflecting the B light which has entered from the incidence surface 40c and changing a direction of this light 90° so that this light exists from the emission surface 40d, of transmitting the G light which has entered from the incidence surface 40b therethrough so that this light is emitted from the emission surface 40d, and of also transmitting the R light which has entered from the incidence surface 40a therebetween. Therefore, three-color combination is enabled by the first and second dichroic films 40e and 40f formed in the three-color combination cross dichroic prism 40.

Further, the ¼ wave plate 41 arranged between the three-color combination cross dichroic prism 40 and the projection lens 42 prevents appearance of unwanted light in a ghost-like form which occurs when a small quantity of reflected light from the lens surface of the projection lens 42 returns to the reflective liquid crystal panel 33 side for each color light through the three-color combination cross dichroic prism 40, the transmission type polarizing plate 34 for each color light and the reflective polarizing plate 32 for each color light, and is again reflected to reach the screen. This ¼ wave plate 41 may be set as required.

Here, in Embodiment 1, when the R light, the G light and the B light are allowed to enter the reflective liquid crystal panel assembly 30R for the R light, the reflective liquid crystal panel assembly 30G for the G light and the reflective liquid crystal panel assembly 30B for the B light, temperatures are increased in the reflective polarizing plate 32, the reflective liquid crystal panel 33 and the transmission type polarizing plate 34 respectively attached and arranged on the triangular prismatic housing 31 for each color light whose inside is sealed and in the respective incidence surfaces 40a to 40c of the three-color combination cross dichroic prism 40 due to the light from the light source 11. Therefore, a fan 26 as air-cooling means is rotatably set on a lower surface 25b side of the base board 25.

Based on this configuration, a first fan hole 25c is formed through the base board 25 in accordance with each gap formed between the respective reflective liquid crystal panel assemblies 30R, 30G and 30B for the respective color lights and the respective incidence surfaces 40a to 40c of the three-color combination cross dichroic prism 40, and a second fan hole 25d is formed through the base board 25 so as to face the heat sink 33b attached on the rear surface of the reflective liquid crystal panel 33 for each color light.

Further, air stream W generated when rotating the fan 26 is supplied to the upper surface 25a side of the base board 25 through the first and second fan holes 25c and 25d formed in the base board 25 from the lower surface 25b side of this base board 25. Here, the air stream W which has passed through the first fan hole 25c is supplied to each gap formed between the transmission type polarizing plate 34 attached on the triangular prismatic housing a1 for each color light and the respective incidence surfaces 40a to 40c of the three-color combination cross dichroic prism 40 to cool the surface of the transmission type polarizing plate 34 for each color light and the respective incidence surfaces 40a to 40c of the three-color combination cross dichroic prism 40, and the air stream W which has passed through the second fan hole 25d cools the heat sink 33b attached on the rear surface of the reflective liquid crystal panel 33 for each color light. Therefore, it is possible to suppress an increase in temperatures of the reflective liquid crystal panel 33 for each color light, the transmission type polarizing plate 34 for each color light and the three-color combination cross-dichroic prism 40 to avoid deterioration due to heat generation, whereby high luminance and high contrast can be achieved, which contributes an improvement in reliability with respect to the projection type display apparatus 10 of Embodiment 1.

Figure 8:
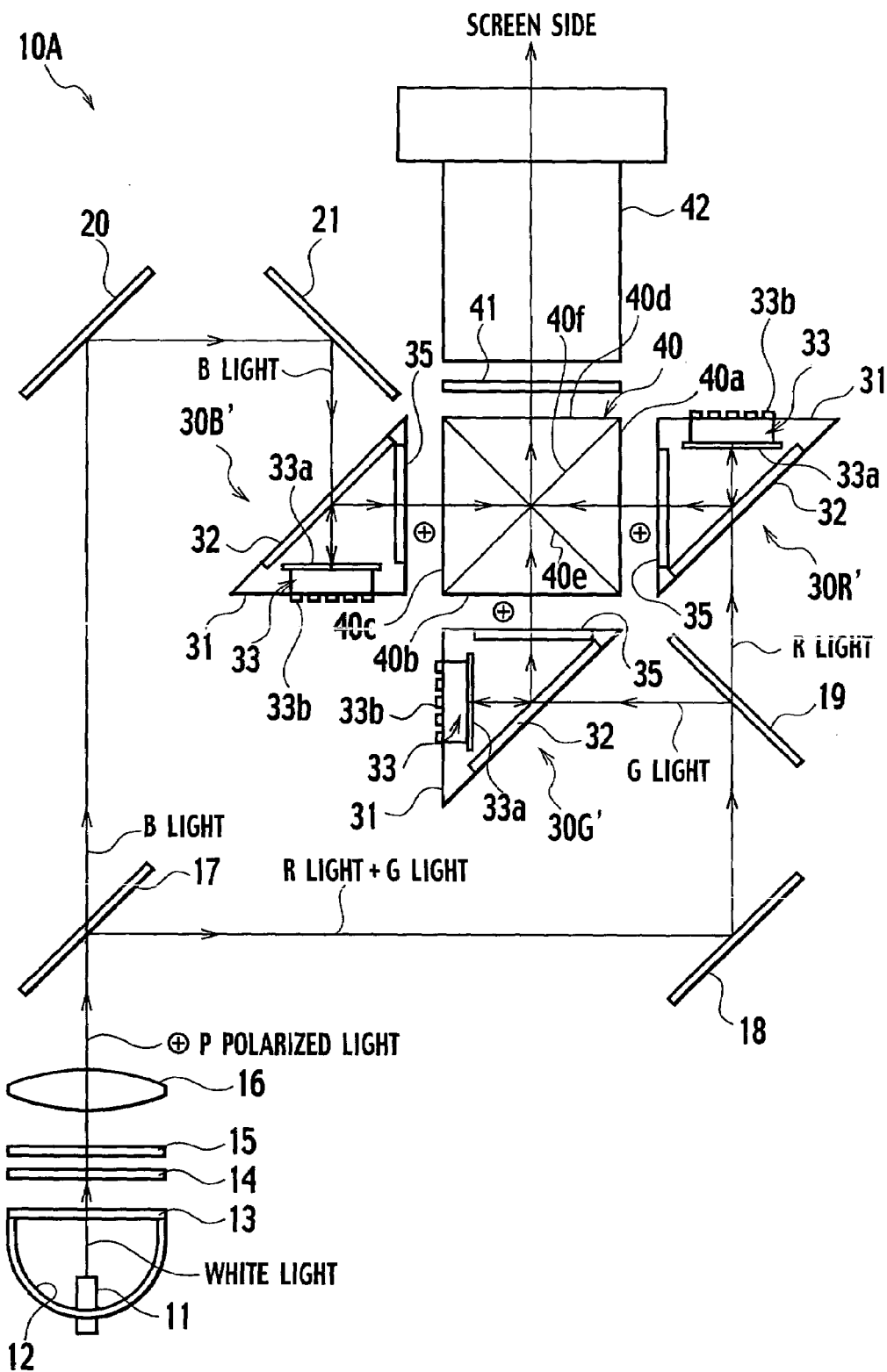
FIG. 8 is a plan view showing a configuration of projection type display apparatus of Modification 1 obtained by partially modifying the projection type display apparatus of Embodiment 1 according to the present invention.
Figure 9A:
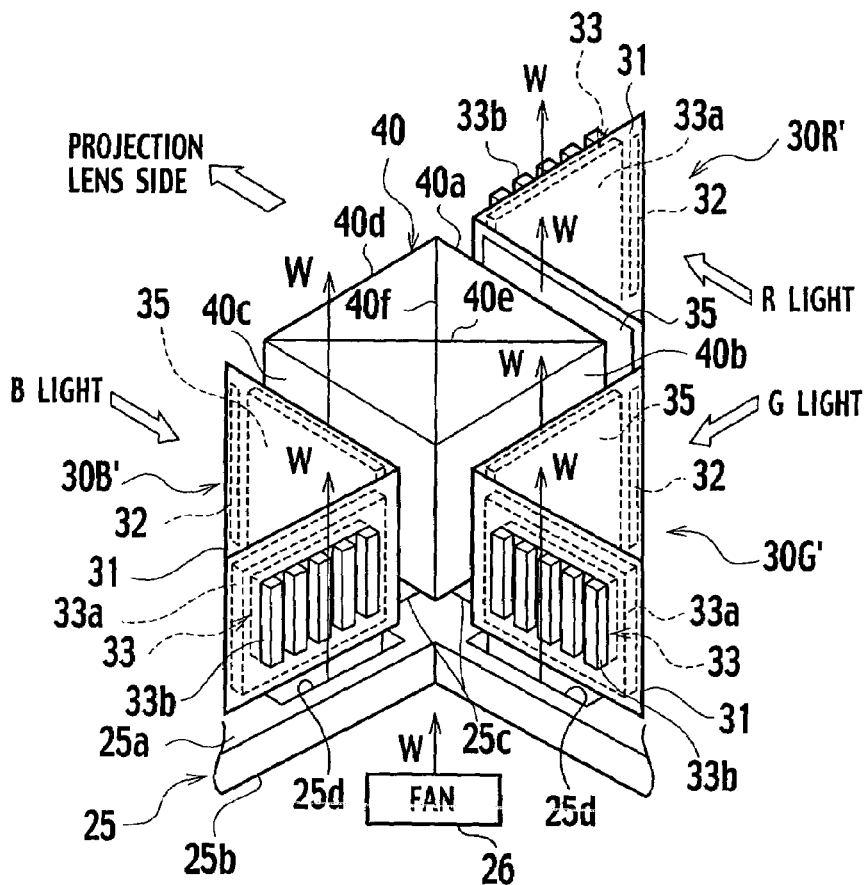
FIGS. 9A and 9B are a perspective view showing respective reflective liquid crystal panel assemblies for R, G and B lights and a three-color combination cross dichroic prism and a side view showing the three-color combination cross dichroic prism and the reflective liquid crystal panel assembly for the G light in Modification 1 obtained by partially modifying the projection type display apparatus of Embodiment 1.
Figure 9B:
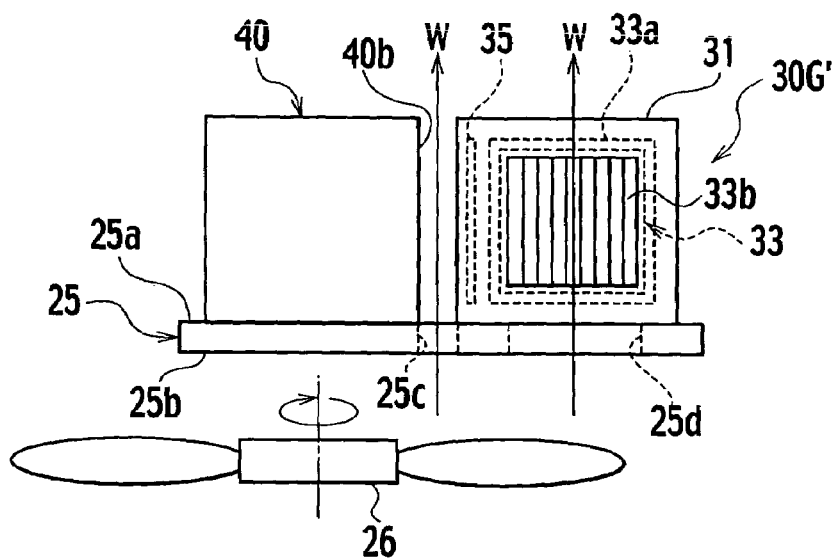

A projection type display apparatus 10A of Modification 1 obtained by partially modifying the projection type display apparatus 10 of Embodiment 1 will now be briefly described while mainly focusing on differences from Embodiment 1 (FIGS. 4, 5A and 5B) with reference to FIGS. 8, 9A and 9B.

FIG. 8 is a plan view showing a configuration of a projection type display apparatus of Modification 1 obtained by partially modifying the projection type display apparatus of Embodiment 1 according to the present invention. FIGS. 9a and 9B are a perspective view showing respective reflective liquid crystal panel assemblies for R, G and B lights and a three-color combination cross dichroic prism and a side view showing the three-color combination cross dichroic prism and the reflective liquid crystal panel assembly for the G light in Modification 1 obtained by partially modifying the projection type display apparatus of Embodiment 1.

As shown in FIGS. 8, 9A and 9B, in the projection type display apparatus 10A of Modification 1 obtained by partially modifying Embodiment 1, a difference from Embodiment 1 lies in that a reflective polarizing plate 35 for each color light which reflects unnecessary polarized light is used as unnecessary polarized light removing means for each color light in place of the transmission type polarizing plate 34 for each color light utilized in Embodiment 1 in a reflective liquid crystal panel assembly 30R' for R light, a reflective liquid crystal panel assembly 30G' for G light and a reflective liquid crystal panel assembly 30B' for B light.

That is, in Modification 1 of Embodiment 1, each of the reflective liquid crystal panel assembly 30R' for the R light, the reflective liquid crystal panel assembly 30G' for the G light and the reflective liquid crystal panel assembly 30B' for the B light has the following configuration. A hollow triangular prismatic housing 31 is first prepared for each color light and, in the triangular prismatic housing 31 for each color light, a tabular reflective polarizing plate 32 (a so-called "wire grid polarizer") as polarization splitting means is attached on a first surface 31a (FIG. 6) having an inclination angle of approximately 45° with respect to an optical axis of each color light from each color light illuminating means from a light source 11 to color separation optical systems 17 and 19, and a reflective liquid crystal panel 33 is attached on a second surface 31b (FIG. 6) orthogonal to the optical axis of each color light transmitted through the reflective polarizing plate 32 for each color light. This point is the same as Embodiment 1. However, a difference from Embodiment 1 lies in that the reflective polarizing plate 35 as the unnecessary polarized light removing means is attached on a third surface 31c (FIG. 6) orthogonal to the optical axis of each color light obtained by reflecting reflected light from the reflective liquid crystal panel 33 for each color light by the reflective polarizing plate 32 for each color light in place of the transmission type polarizing plate 34 (FIGS. 4, 5A and 5B) of Embodiment 1, and that each side on which the reflective polarizing plate 35 for each color light is provided faces each of incidence surfaces 40a to 40c of a three-color combination cross dichroic prism 40 with a gap therebetween.

In this example, as the reflective polarizing plate 35 which serves as the unnecessary polarized light removing means, for example, a wire grid polarizer is used, and this wire grid polarizer is superior in heat resisting properties or light stability as compared with the transmission type polarizing plate 34 which is of a light absorption type used in Embodiment 1, thereby obtaining sufficient reliability with respect to light from the high-power light source 11.

Therefore, in Modification 1 of Embodiment 1, unnecessary polarized light (P polarized light) other than S polarized light is removed by the reflective polarizing plate 35 for each color light with respect to image light of each color from the reflective liquid crystal panel 33 for each color light reflected by the reflective polarizing plate 32 for each color light, and the S polarized light is emitted. Thereafter, the image light of each color transmitted through the reflective polarizing plate 35 for each color light is subjected to color combination by the three-color combination cross dichroic prism 40.

Then, in Modification 1 of Embodiment 1, an air stream W generated when rotating a fan 26 is likewise supplied to an upper surface 25a side of a base board 25 through first and second fan holes 25c and 25d formed in this base board 25 from a lower surface 25b side of the base board 25. Here, the air stream W which has passed through the first fan hole 25c is supplied to each gap formed between the reflective polarizing plate 35 attached in the triangular prismatic housing 31 for each color light and each of the incidence surfaces 40a to 40c of the three-color combination cross dichroic prism 40 to cool a surface of the reflective polarizing plate 35 for each color light and each of the incidence surfaces 40a to 40c of the three-color combination cross dichroic prism 40, and the air stream W which has passed through the second fan hole 25d cools a heat sink 33b attached on a rear surface of the reflective liquid crystal panel 33 for each color light. Therefore, it is possible to suppress an increase in temperatures of the reflective liquid crystal panel 33 for each color light, the reflective polarizing plate 35 for each color light and the three-color combination cross dichroic prism 40 to assuredly avoid deterioration due to heat generation, and high luminance and high contrast can be thereby achieved, which can contribute to an improvement in reliability with respect to the projection type display apparatus 10A of Modification 1.

Figure 10:
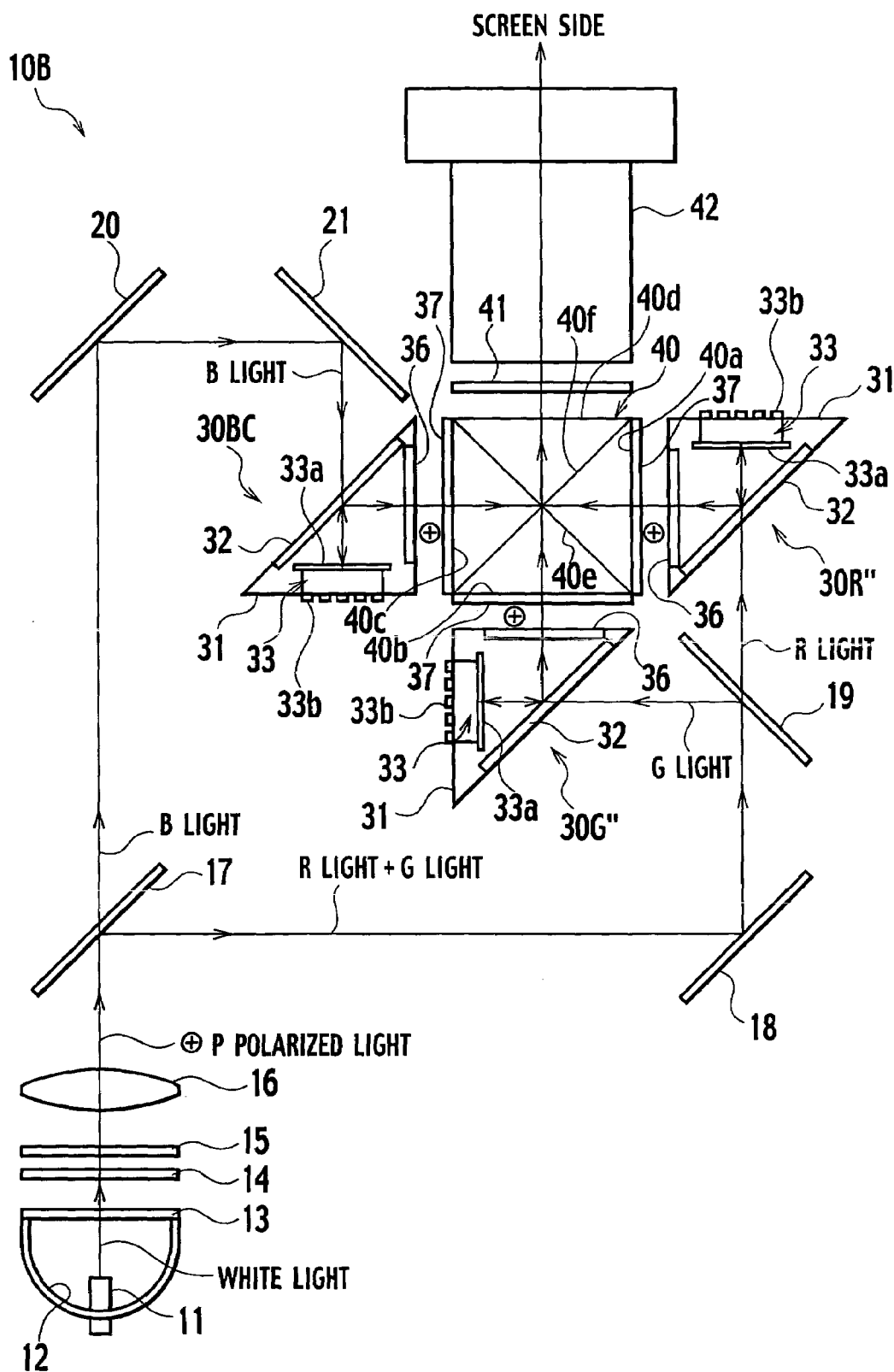
FIG. 10 is a plan view showing a configuration of a projection type display apparatus of Modification 2 obtained by partially modifying the projection type display apparatus of Embodiment 1 according to the present invention.
Figure 11A:
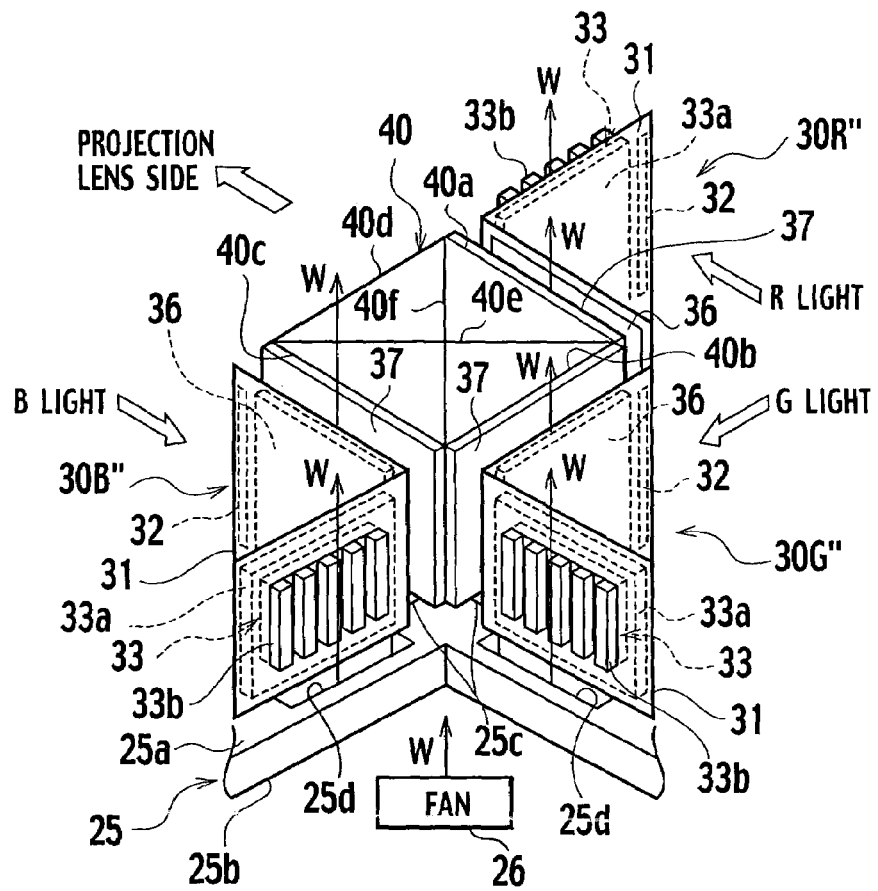
FIGS. 11A and 11B are a perspective view showing respective reflective liquid crystal display panel assemblies for R, G and B lights and a three-color combination cross dichroic prism and a side view showing the three-color cross dichroic prism and the reflective liquid crystal panel assembly for the G light in Modification 2 obtained by partially modifying the projection type display apparatus of Embodiment 1.
Figure 11B:
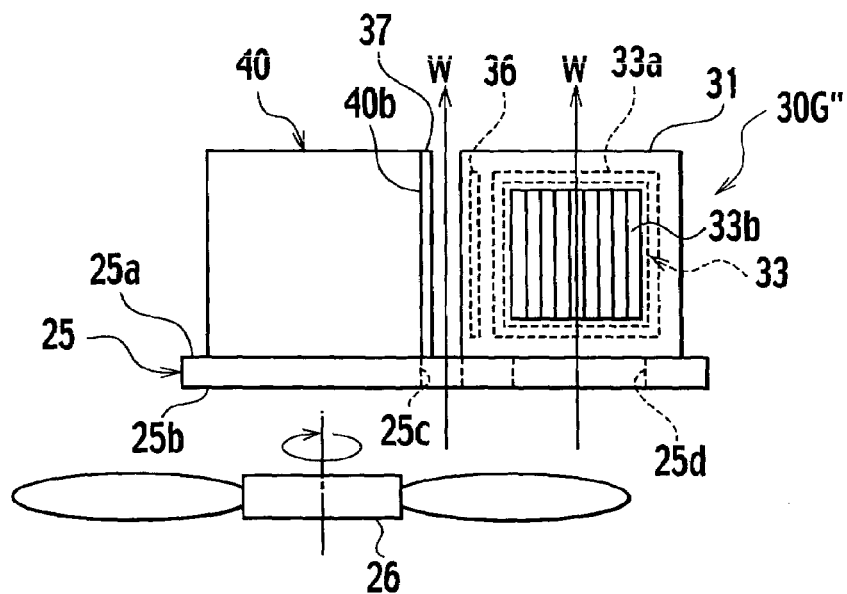

A projection type display apparatus 10B obtained by partially modifying the projection type display apparatus 10 of Embodiment 1 will now be briefly described while mainly focusing on a difference from Embodiment 1 (FIGS. 4, 5A and 5B) with reference to FIGS. 10, 11A and 11B.

FIG. 10 is a plan view showing a configuration of a projection type display apparatus of Modification 2 obtained by partially modifying the projection type display apparatus of Embodiment 1 according to the present invention FIGS. 11A and 11B are a perspective view showing respective reflective liquid crystal panel assemblies for R, G and B lights and a three-color combination cross dichroic prism and a side view showing the three-color combination cross dichroic prism and the reflective liquid crystal panel assembly for the G light in Modification 2 obtained by partially modifying the projection type display apparatus of Embodiment 1.

As shown in FIGS. 10, 11A and 11B, in the projection type display apparatus 10B of Modification 2 obtained by partially modifying Embodiment 1, a difference from Embodiment 1 lies in a reflective liquid crystal panel assembly 30R" for R light, a reflective liquid crystal panel assembly 30G" for G light and reflective liquid crystal panel assembly 30B" for B light and a transmission type polarizing plate 37 which is of a light absorption type and secured as unnecessary polarized light removing means for each color on each of incidence surfaces 40a to 40c of a three-color combination cross dichroic prism 40.

Figure 1:
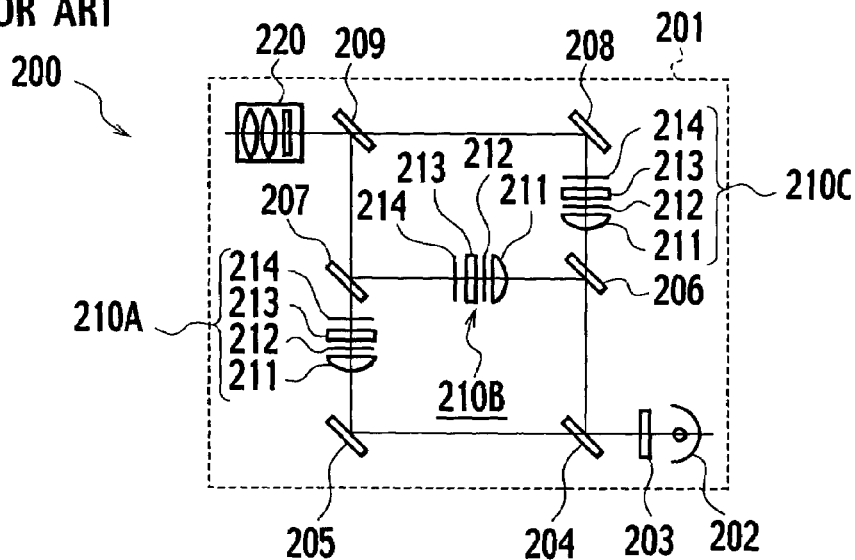
FIG. 1 is a structural view showing a conventional projection type display apparatus.
Figure 2:
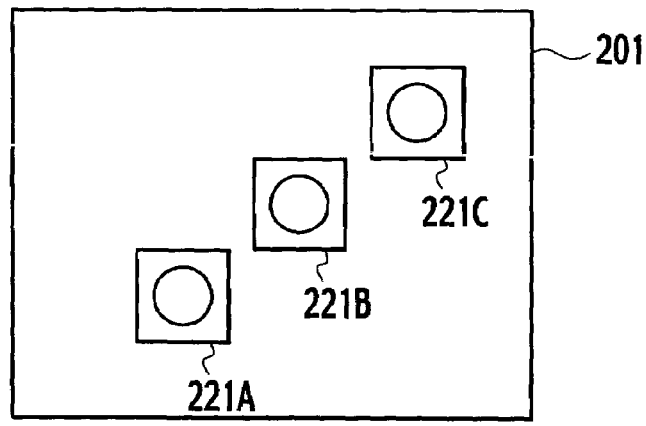
FIG. 2 is a side view showing an arrangement of cooling fans in the conventional projection type display apparatus.
Figure 3:
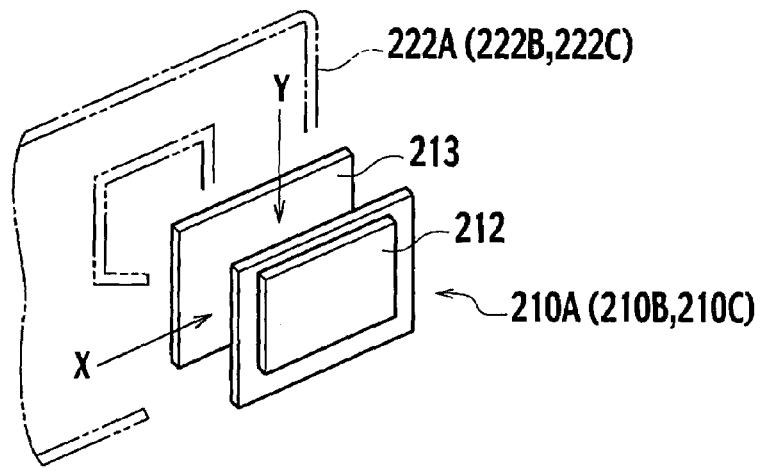
FIG. 3 is a perspective view showing a state of cooling a polarizer and a liquid crystal panel in the conventional projection type display apparatus.

That is, in Modification 2 of Embodiment 1, each of the reflective liquid crystal panel assembly 30R" for the R light, the reflective liquid crystal panel assembly 30G" for the G light and the reflective liquid crystal panel assembly 30B" for the B light has the following configuration. A hollow triangular prismatic housing 31 is first prepared for each color light and, in the triangular prismatic housing 31 for each color light, a tabular reflective polarizing plate (a so-called "wire grid polarizer") 32 as polarization splitting means is attached on a first surface 31a (FIG. 6) having an inclination angle of approximately 45° with respect to an optical axis of each color light from each color light illuminating means from a light source 11 to color separation optical systems 17 and 19, and a reflective liquid crystal panel 33 is attached on a second surface 31b (FIG. 6) orthogonal to the optical axis of each color light transmitted through the reflective polarizing plate 32 for each color light. This point is the same as Embodiment 1. However, a difference from Embodiment 1 lies in that a transparent glass plate 36 is attached in place of the transmission type polarizing plate 34 (FIGS. 4, 5A and 5B) of Embodiment 1 on a third surface 31c (FIG. 6) orthogonal to the optical axis of each color light obtained by reflecting reflected light from the reflective liquid crystal panel 33 for each color light by the reflective polarizing plate 32 for each color light and a side on which the transparent glass plate 36 for each color light is arranged faces each of incidence surfaces 40a to 40c of a three-color combination cross dichroic prism 40 with a gap therebetween. In this example, the transparent glass plate 36 for each color light attached on the third surface 31c (FIG. 3) of the triangular prismatic housing 31 for each color light transmits therethrough each color light obtained by reflecting the reflected light from the reflective liquid crystal panel 33 for each color light by the reflective polarizing plate 32 for each color light so that the transmitted light is emitted to the three-color combination cross dichroic prism 40 side, but the inside of the triangular prismatic housing 31 for each color light can be sealed from dust by attaching the transparent glass plate 36 for each color light.

In Modification 2 of Embodiment 1, the reflective polarizing plate 32, the reflective liquid crystal panel 33 and the transparent glass plate 36 attached and arranged in the triangular prismatic housing 31 for each color light are likewise vertically provided with respect to an upper surface 25a of a base board 25.

Based on this configuration, the transmission type polarizing plate 37 which is of a light absorption type as the unnecessary polarized light removing means for each color light which removes unnecessary polarized light with respect to each color light transmitted through the transparent glass plate 36 for each color light is secured on each of incidence surfaces 40a to 40c of the three-color combination cross dichroic prism 40.

In this example, the most inexpensive method of realizing the transmission type polarizing plate 37 is directly securing a transmission type polarizing film on each of the incidence surfaces 40a to 40c of the three-color combination cross dichroic prism 40. Alternatively, the transmission type polarizing film may be secured on a transparent substrate and then further secured on each of the incidence surfaces 40a to 40c. In this case, although inexpensive glass is used as a material of the transparent substrate of the transmission type polarizing plate 37, using crystal or sapphire superior in thermal conductivity can rapidly disperse heat of the polarizing film in the transparent substrate surface and further efficiently transfer this heat to the three-color combination cross dichroic prism 40, thereby improving reliability.

Therefore, in Modification 2 of Embodiment 1, image light of each color from the reflective liquid crystal panel 33 for each color light reflected by the reflective polarizing plate 32 for each color light is emitted from the transparent glass plate 36 for each color light as it is, then unnecessary polarized light (P polarized light) other than S polarized light is removed by the transmission type polarizing plate 37 for each color light secured on each of the incidence surface 40a to 40c of the three-color combination cross dichroic prism 40 with respect to the image light of each color transmitted through the transparent glass plate 36 for each color light, and the image light of each color transmitted through the transmission type polarizing plate 37 for each color light is subjected to color combination by the three-color combination cross dichroic prism 40.

Here, in Modification 2 of Embodiment 1, when the R light, the G light and the B light are allowed to enter the reflective liquid crystal panel assembly 30R" for the R light, the reflective liquid crystal panel assembly 30G" for the G light and the reflective liquid crystal panel assembly 30B" for the B light, light from the light source 11 increases temperatures of the reflective polarizing plate 32, the reflective liquid crystal panel 33 and the transparent glass plate 36 attached on the triangular prismatic housing 31 for each color light whose inside is sealed, and the light from the light source 11 also increases a temperature of the transmission type polarizing plate 37 for each color light secured on each of the incidence surfaces 40a to 40c of the three-color combination cross dichroic prism 40. Therefore, in order to avoid an increase in temperatures of these optical members, a cooling fan 26 is rotatably set on a lower surface 25b side of a base board 25 as shown in FIGS. 11A and 11B.

Based on this configuration, a first fan hole 25c is formed in the base board 25 in accordance with each gap formed between each of the reflective liquid crystal panel assemblies 30R", 30G" and 30B" for the respective color lights and the transmission type polarizing plate 37 for each color light secured on each of the incidence surfaces 40a to 40c of the three-color combination cross dichroic prism 40, and a second fan hole 25d is formed in the base board 25 to face a heat sink 33b attached on a rear surface of the reflective liquid crystal panel 33 for each color light.

Furthermore, an air stream W generated when rotating the fan 26 is supplied to an upper surface 25a side of the base board 25 through the first and second fan holes 25c and 25d formed in the base board 25 from a lower surface 25b side of the base board 25. Here, the air stream W which has passed through the first fan hole 25c is supplied to each gap formed between the transparent glass plate 36 attached on the triangular prismatic housing 31 for each color light and the transmission type polarizing plate 37 for each color light secured on each of the incidence surfaces 40a to 40c of the three-color combination cross dichroic prism 40 to cool a surface of the transparent glass plate 36 for each color light and the transmission type polarizing plate 37 for each color light secured on each of the incidence surfaces 40a to 40c of the three-color combination cross dichroic prism 40, and the air stream W which has passed through the second fan hole 25d cools the heat sink 33b attached on the rear surface of the reflective liquid crystal panel 33 for each color light. Therefore, it is possible to suppress an increase in temperatures of the reflective liquid crystal panel 33 for each color light, the transparent glass plate 36 for each color light and the transmission type polarizing plate 37 for each color light secured on each of the incidence surfaces 40a to 40c of the three-color combination cross dichroic prism 40 to avoid deterioration due to heat generation, and high luminance and high contrast can be thereby achieved, which contributes to an improvement in reliability with respect to the projection type display apparatus 10B of Modification 2 obtained by partially modifying Embodiment 1.

Figure 12:
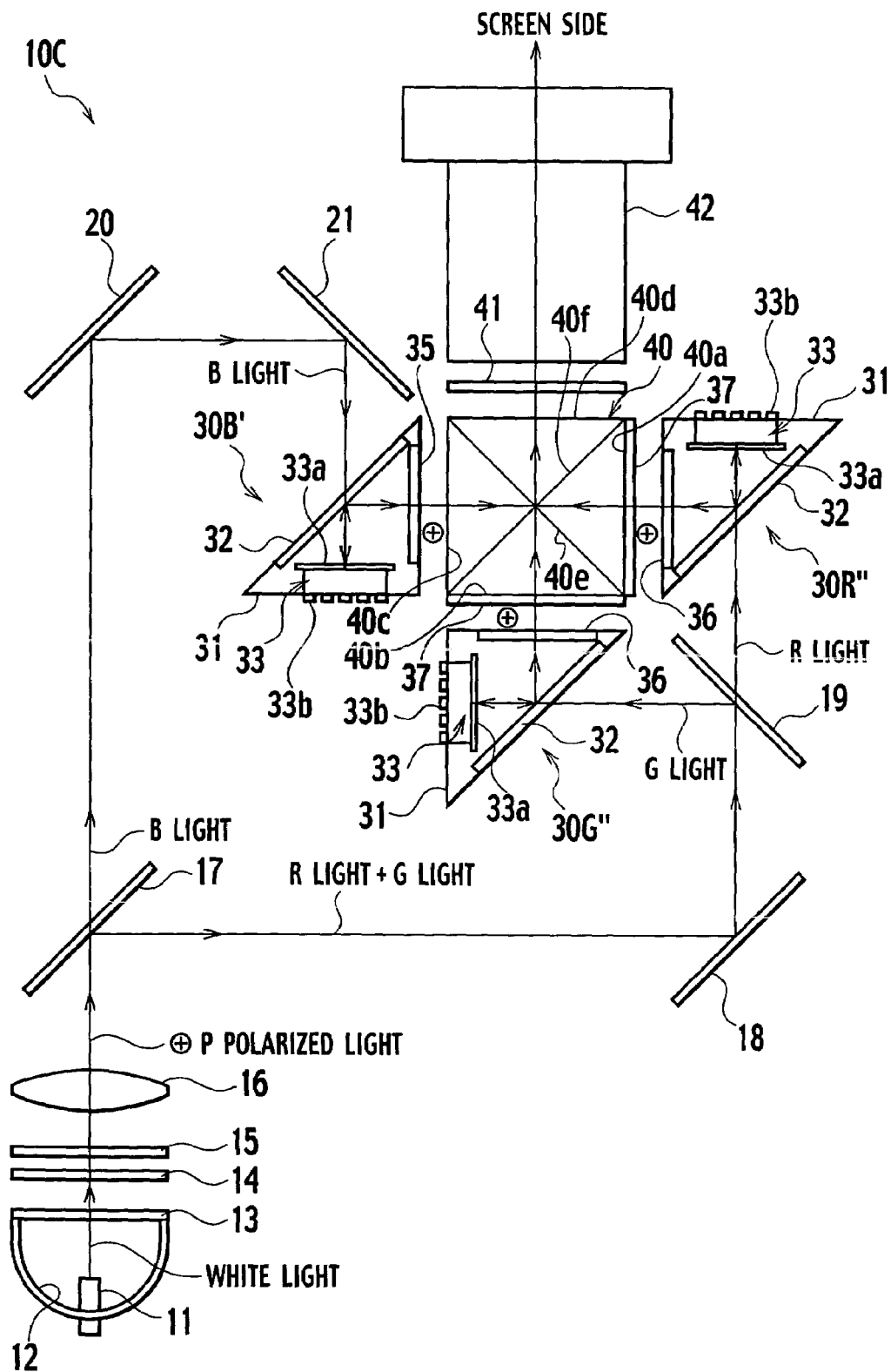
FIG. 12 is a plan view showing a configuration of a projection type display apparatus of Modification 3 obtained by partially modifying the projection type display apparatus of Embodiment 1 according to the present invention.
Figure 13A:
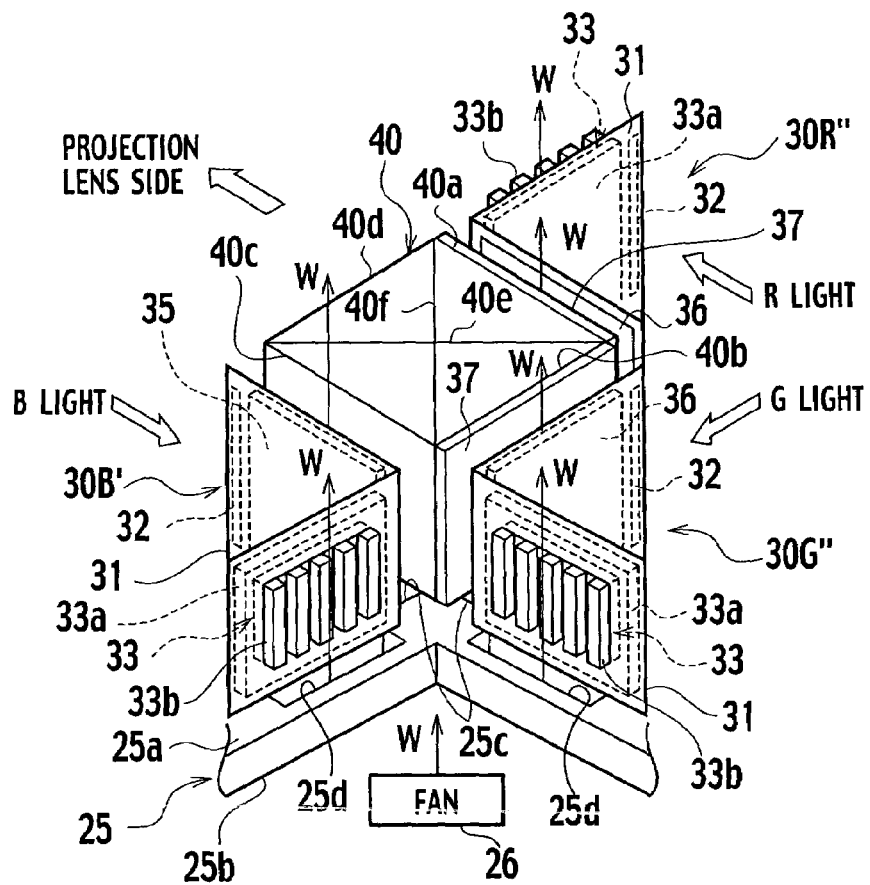
FIGS. 13A and 13B are a perspective view showing respective reflective liquid crystal panel assemblies for R, G and B lights and a three-color combination cross dichroic prism and a side view showing the reflective liquid crystal panel assembly for the B light, the three color combination cross dichroic prism and the reflective liquid crystal panel assembly for the R light in Modification 3 obtained by partially modifying the projection type display apparatus of Embodiment 1.
Figure 13B:
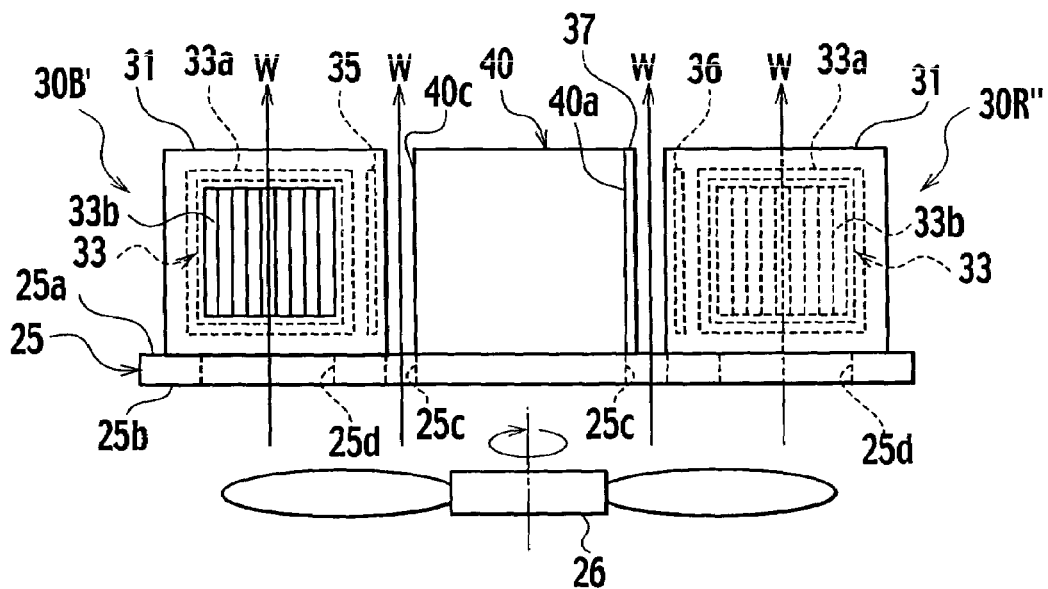

A projection type display apparatus 10C of Modification 3 obtained by partially modifying the projection type display apparatus 10 of Embodiment 1 will now be briefly described while mainly focusing on a difference from Embodiment 1 (FIGS. 4, 5A and 5B) with reference to FIGS. 12, 13A and 13B.

FIG. 12 is a plan view showing a configuration of the projection type display apparatus of Modification 3 obtained by partially modifying the projection type display apparatus of Embodiment 1 according to the present invention. FIGS. 13A and 13B are a perspective view showing respective reflective liquid crystal panel assemblies for R, G and B lights and a three-color combination cross dichroic prism and a side view showing the reflective liquid crystal panel assembly for the B light, the three-color combination cross dichroic prism and the reflective liquid crystal panel assembly for the R light in Modification 3 obtained by partially modifying the projection type display apparatus of Embodiment 1.

As shown in FIGS. 12, 13A and 13B, a projection type display apparatus 10C of Modification 3 obtained by partially modifying Embodiment 1 has the following characteristics. That is, a technical concept of Modification 2 of Embodiment 1 is applied to a reflective liquid crystal panel assembly 30R" for R light and a reflective liquid crystal panel assembly 30G" for G light, and a transmission type polarizing plate 37 which is of a light absorption type as unnecessary polarized light removing means for the R light and the G light is secured on each of incidence surfaces 40a and 40b of a three-color combination cross dichroic prism 40. On the other hand, a technical concept of Modification 1 of Embodiment 1 is applied to a reflective liquid crystal panel assembly 30B' for B light, and a reflective polarizing plate 35 relatively having heat resisting properties and light stability is used as unnecessary polarized light removing means for the B light in the reflective liquid crystal panel assembly 30B' for the B light.

That is, in Modification 3 of Embodiment 1, each of the reflective liquid crystal panel assembly 30R" for R light, the reflective liquid crystal panel assembly 30G" for G light and the reflective liquid crystal panel assembly 30B' for B light has the following configuration. That is, a hollow triangular prismatic housing 31 is first prepared for each light and, in the triangular prismatic housing 31 for each color light, a tabular reflective polarizing plate (a so-called "wire grid polarizer") 32 as polarization splitting means is attached on a first surface 31a (FIG. 6) having an inclination angle of approximately 45° with respect to an optical axis of each color light from each color light illuminating means from a light source 11 to color separation optical systems 17 and 19, and a reflective liquid crystal panel 33 for each color light is attached on a second surface 31b (FIG. 6) orthogonal to the optical axis of each color light transmitted through the reflective polarizing plate 32 for each color. This point is the same as Embodiment 1. However, the following points are different from Embodiment 1. That is, a transparent glass plate 36 for the R light or the G light is attached on a third surface 31c orthogonal to the optical axis of the R light or the G light obtained by reflecting reflected light from the reflective liquid crystal panel 33 for the R light or the G light by the reflective polarizing plate 32 for the R light or the G light in place of the transmission type polarizing plate 34 (FIGS. 4, 5A and 5B) of Embodiment 1, a reflective polarizing plate 35 for the B light as unnecessary polarized light removing means is attached on the third surface 31c (FIG. 6) orthogonal to the optical axis of the B light obtained by reflecting reflected light from the reflective liquid crystal panel 33 for the B light by the reflective polarizing plate 32 for the B light in place of the transmission type polarizing plate 34 (FIGS. 4, 5A and 5B) of Embodiment 1, and a side on which the transparent glass plate 36 for the R light or the G light is arranged faces a transmission type polarizing plate 37 as unnecessary polarized light removing means for the R light or the G light secured on each of incidence surfaces 40a and 40b of a three-color combination cross dichroic prism 40 with each gap therebetween, and a side on which the reflective polarizing plate 35 for the B light is arranged faces an incidence surface 40c of the three-color combination cross dichroic prism 40 with a gap therebetween.

Although the wire grip polarizer is used as the reflective polarizing plate 35 with respect to the G light only in Modification 3 of Embodiment 1, a cost per wire grid polarizing is generally expensive as compared with that of the transmission type polarizing plate 37 which is of a light absorption type. Further, since the reflective polarizing plate 35 reflects unnecessary polarized light, there is a problem that the reflected unnecessary polarized light again returns to the reflective liquid crystal panel 33 and further returns to a projection lens 42 side to project an unwanted component onto a non-illustrated screen or unnecessary polarized light reflected from a surface of the projection lens 42 or the like returns to the projection lens 42 by the reflective polarizing plate 35 to be projected onto the screen as a ghost image.

Therefore, considering balance with a cost and reliability, the transmission type polarizing plate 37 which is of a light absorption type is used with respect to the R light and the G light, and the reflective polarizing plate 35 relatively having heat resisting properties and light stability is used with respect to the B light. In this example, the reflective polarizing plate 35 is used with respect to the B light because the transmission type polarizing plate 37 which is of the light absorption type has a high light absorption ratio on a short wavelength side and great heat generation and polarization characteristics of the B light tends to be lowered due to weak light stability with respect to the B light having a short wavelength, whereby an improvement with respect to the B light is effective as compared with the R light or the G light.

Furthermore, in Modification 3 of Embodiment 1, when the transmission type polarizing plate 37 for the R light or the G light and the reflective type polarizing plate 35 for the B light are air-cooled by using a fan 26, it is likewise possible to suppress an increase in temperatures of the reflective liquid crystal panel 33, the reflective polarizing plate 35, the transparent glass plate 36 and the transmission type polarizing plate 37 to avoid deterioration due to heat generation, and hence high luminance and high contrast can be achieved, which contributes to an improvement in reliability with respect to the projection type display apparatus 10C of Modification 3.

Figure 14:
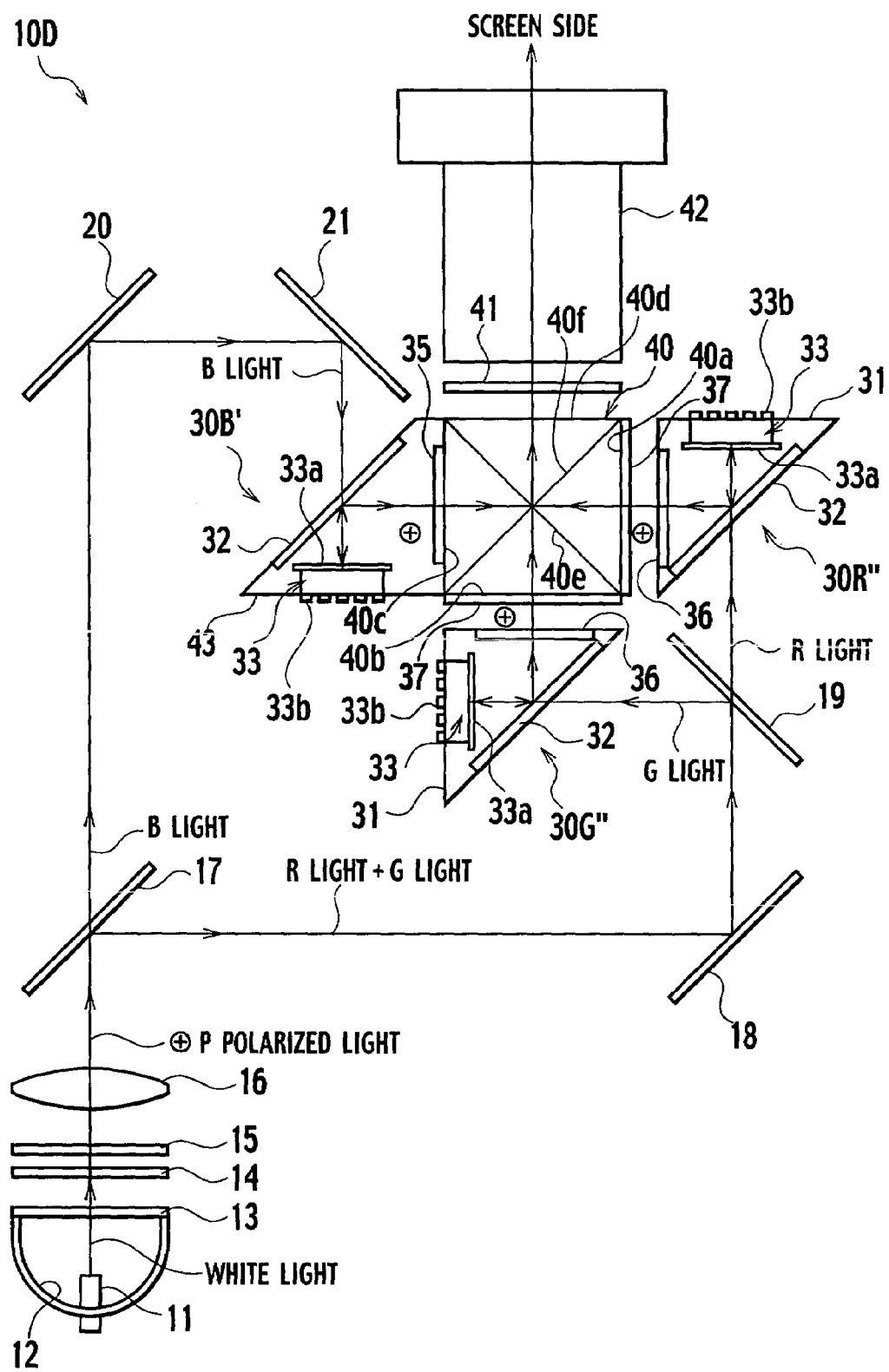
FIG. 14 is a plan view showing a configuration of a projection type display apparatus of Modification 4 obtained by partially modifying the projection type display apparatus of Embodiment 1 according to the present invention.
Figure 15A:
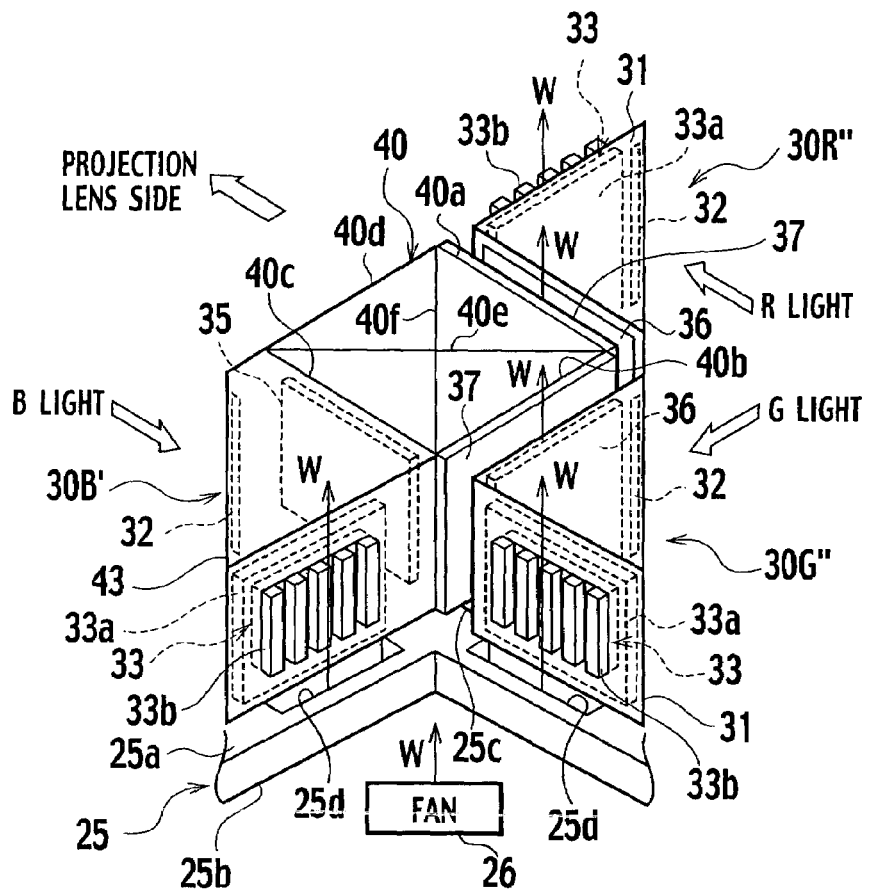
FIGS. 15A and 15B are a perspective view showing respective reflective liquid crystal panel assemblies for R, G and B lights and a three-color combination cross dichroic prism and a side view showing the reflective liquid crystal panel assembly for the B light, the three-color combination cross dichroic prism and the reflective type liquid crystal panel assembly for the R light in Modification 4 obtained by partially modifying the projection type display apparatus of Embodiment 1.
Figure 15B:
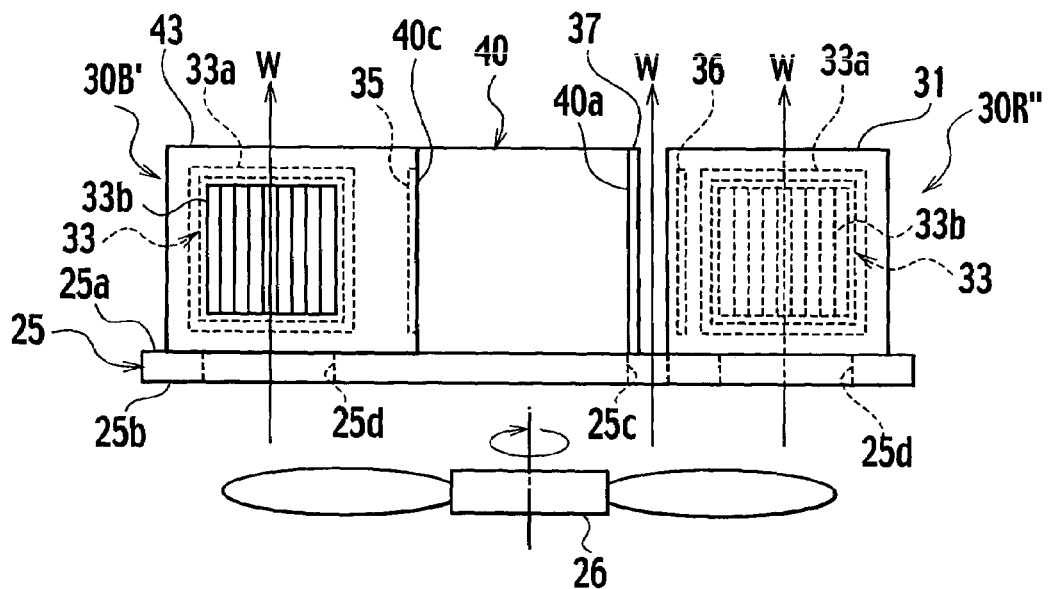

A projection type display apparatus 10D of Modification 4 obtained by partially modifying the projection type display apparatus 10 of Embodiment 1 will now be briefly described while mainly focusing on a difference from Embodiment 1 (FIGS. 4, 5A and 5B) with reference to FIGS. 14, 15A and 15B.

FIG. 14 is a plan view showing a configuration of a projection type display apparatus of Modification 4 obtained by partially modifying the projection type display apparatus of Embodiment 1 according to the present invention. FIGS. 15A and 15B is a perspective view showing respective reflective liquid crystal panel assemblies for R, G and B light and a three-color combination cross dichroic prism and a side view showing the reflective liquid crystal panel assembly for the B light, the three-color combination cross dichroic prism and the reflective liquid crystal panel assembly for the R light in Modification 4 obtained by partially modifying the projection type display apparatus of Embodiment 1.

As shown in FIGS. 14, 15A and 15B, in a projection type display apparatus 10D of Modification 4 obtained by partially modifying Embodiment 1, like Modification 3 of Embodiment 1, a technical concept of Modification 2 of Embodiment 1 is applied to a reflective liquid crystal panel assembly 30R" for R light and a reflective liquid crystal panel assembly 30G" for G light, and a transmission type polarizing plate 37 which is of a light absorption type as unnecessary polarized light removing means for the R light or the G light is secured on each of incidence surfaces 40a and 40b of a three-color combination cross dichroic prism 40. On the other hand, a technical concept of Modification 1 of Embodiment 1 is applied to a reflective liquid crystal panel assembly 30B' for B light, and a reflective polarizing plate 35 relatively having heat resisting properties and light stability as unnecessary polarized light removing means for the B light is used in the reflective liquid crystal panel assembly 30B' for the B light. This is the same configuration as Modification 3 of Embodiment 1. However, an only difference from Modification 3 of Embodiment 1 lies in that the reflective polarizing plate 35 for the B light in the reflective liquid crystal panel assembly 30B' for the B light is directly secured on an incidence surface 40c of the three-color combination cross dichroic prism 40.

In this example, the reflective liquid crystal panel assembly 30B' for the B light is formed into a trapezoidal prism 43 in place of the triangular prismatic housing 31 in such a manner that the same optical path length as those of the reflective liquid crystal panel assembly 30R" for the R light and the reflective liquid crystal panel assembly 30G" for the G light can be obtained with respect to the three-color combination cross dichroic prism 40, and a reflective polarizing plate 32, a reflective liquid crystal panel 33 and the reflective polarizing plate 35 are accommodated in the trapezoidal prism 43 for the B light with the inside of the prism being sealed as shown in the drawing.

Therefore, the projection type display apparatus 10D of Modification 4 obtained by partially modifying Embodiment 1 can acquire substantially the same advantages as those of the projection type display apparatus 10C of Modification 3 of Embodiment 1.

Figure 16:
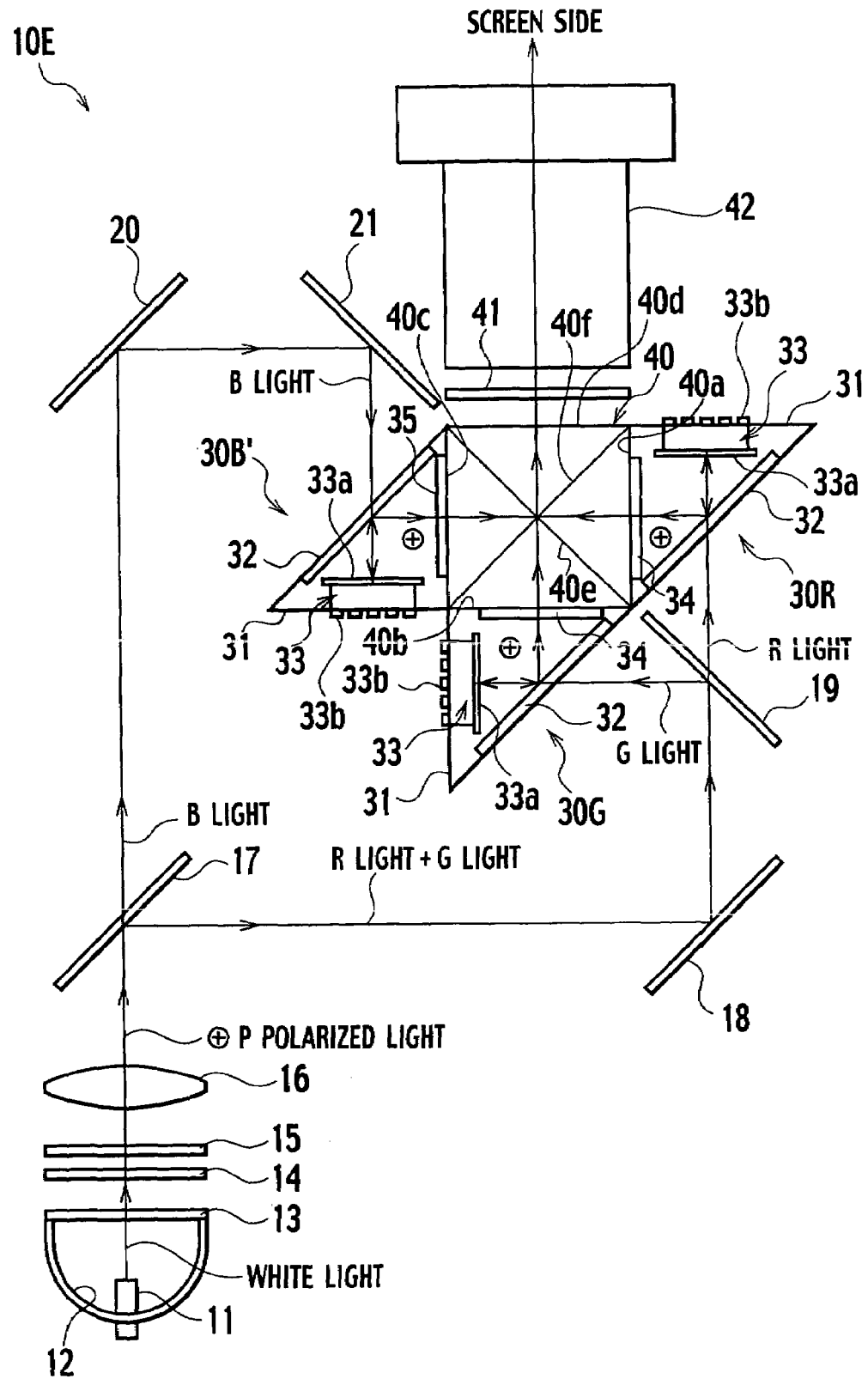
FIG. 16 is a plan view showing a configuration of a projection type display apparatus of Modification 5 obtained by partially modifying the projection type display apparatus of Embodiment 1 according to the present invention.
Figure 17A:
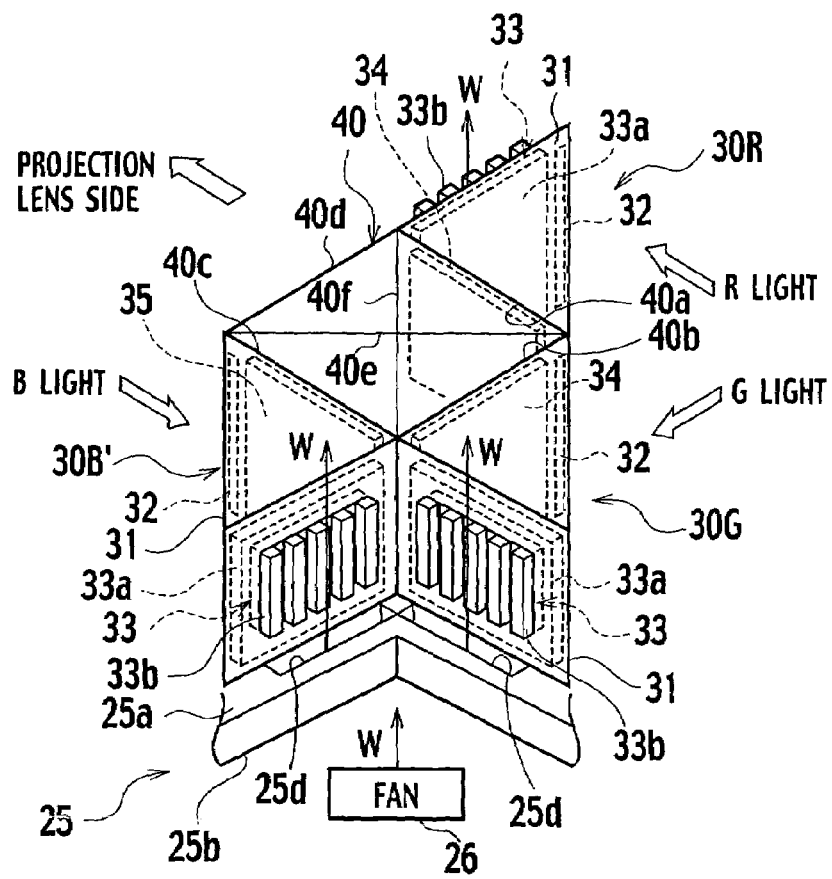
FIGS. 17A and 17B are a perspective view showing respective reflective liquid crystal panel assemblies for R, G and B lights and a three-color combination cross dichroic prism and a side view showing the reflective liquid crystal panel assembly for the B light, the three-color combination cross dichroic prism and the reflective liquid crystal panel assembly for the R light in Modification 5 obtained by partially modifying the projection type display apparatus of Embodiment 1.
Figure 17B:
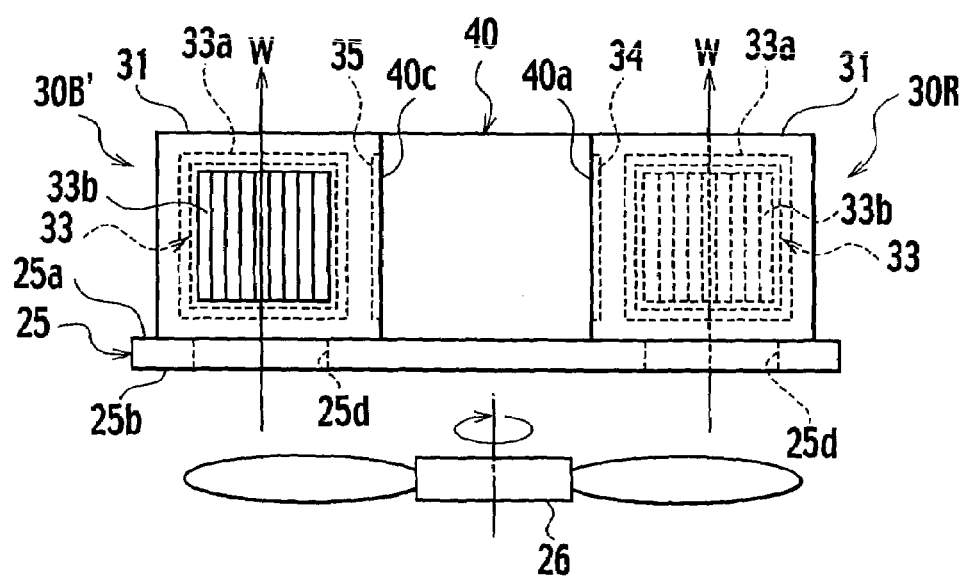

A projection type display apparatus 10E of Modification 5 obtained by partially modifying the projection type display apparatus 10 of Embodiment 1 will now be briefly described while mainly focusing on a difference from Embodiment 1 (FIGS. 4, 5A and 5B) with reference to FIGS. 16, 17A and 17B.

FIG. 16 is a plan view showing a configuration of a projection type display apparatus of Modification 5 obtained by partially modifying the projection type display apparatus of Embodiment 1 according to the present invention. FIGS. 17A and 17B are a perspective view showing respective reflective liquid crystal panel assemblies for R, G and B lights and a three-color combination cross dichroic prism and a side view showing the reflective liquid crystal panel assembly for the B light, the three-color combination cross dichroic prism and the reflective type liquid crystal panel assembly for the R light in Modification 5 obtained by partially modifying the projection type display apparatus of Embodiment 1.

As shown in FIGS. 16, 17A and 17B, in a projection type display apparatus 10E of Modification 5 obtained by partially modifying Embodiment 1, a technical concept of Embodiment 1 is applied to a reflective liquid crystal panel assembly 30R for R light and a reflective liquid crystal panel assembly 30G for G light, and a transmission type polarizing plate 34 which is of a light absorption type as unnecessary polarized light removing means for the R light or the G light is used in each of the reflective liquid crystal panel assemblies 30R and 30G for the R light and the G light. On the other hand, a technical concept of Modification 1 of Embodiment 1 is applied to a reflective liquid crystal panel assembly 30B' for B light, and a reflective polarizing plate 35 relatively having heat resisting properties and light stability as unnecessary polarized light removing means for the B light is used in the reflective liquid crystal panel assembly 30B' for the B light. However, this modification is characterized in that the reflective liquid crystal panel assembly 30R for the R light, the reflective liquid crystal panel assembly 30G for the G light and the reflective liquid crystal panel assembly 30B' for the B light are appressed against respective incidence surfaces 40$a$ to 40$c$ of the three-color combination cross dichroic prism 40 without gap.

In this example, with each of the incidence surfaces 40$a$ to 40$c$ of the three-color combination cross dichroic prism 40 being determined as one side, the inside a triangular prismatic housing 31 for each color light is sealed and the transmission type polarizing plates 34 for the R light and the G light and the reflective polarizing plate 35 for the B light are appressed against the respective incidence surfaces 40$a$ to 40$c$ of the three-color combination cross dichroic prism 40 without gap. As a result, even if air-cooling between these members is eliminated, heat generation is small when power of a light source 11 is relatively small. Therefore, heat from the light source 11 can escape to the inside of the three-color combination cross dichroic prism 40. Accordingly, a fan does not have to be provided on a lower surface 25$b$ side of a base board 25, but providing the fan 26 as required can cool a rear surface of the reflective liquid crystal panel 33 for each color light.

Moreover, when the reflective liquid crystal panel assembly 30R for the R light, the reflective liquid crystal panel assembly 30G for the G light and the reflective liquid crystal panel assembly 30B' for the B light are appressed against the respective incidence surfaces 40$a$ to 40$c$ of the three-color combination cross dichroic prism 40, color separation and color combination optical systems can be reduced in size. Additionally, since a transparent glass plate 36 is not attached in the triangular prismatic housing 31 for each color light, unwanted reflected light by interface reflection from the transparent glass plate 36 is not generated.

It is to be noted that the description has been given as to the example where the absorption type polarizing plates are used for the R and G lights and the reflective polarizing plate is used for the B light as the unnecessary polarized light removing means for each color light in Modifications 3 to 5 of Embodiment 1 mentioned above, but the present invention is not restricted thereto, and the absorption type polarizing plate may be used for the R light and the reflective polarizing plates may be used for the G and B lights. In this case, when power of the light source (a lamp) is increased in order to improve brightness, reliability of a G light band can be also enhanced.

A projection type display apparatus 10F of Modification 6 obtained by partially modifying the projection type display apparatus 10 of Embodiment 1 will now be briefly described while mainly focusing on a difference from Embodiment 1 (FIGS. 4, 5A and 5B) with reference to FIGS. 18, 19A, 19B and 20.

Figure 18:
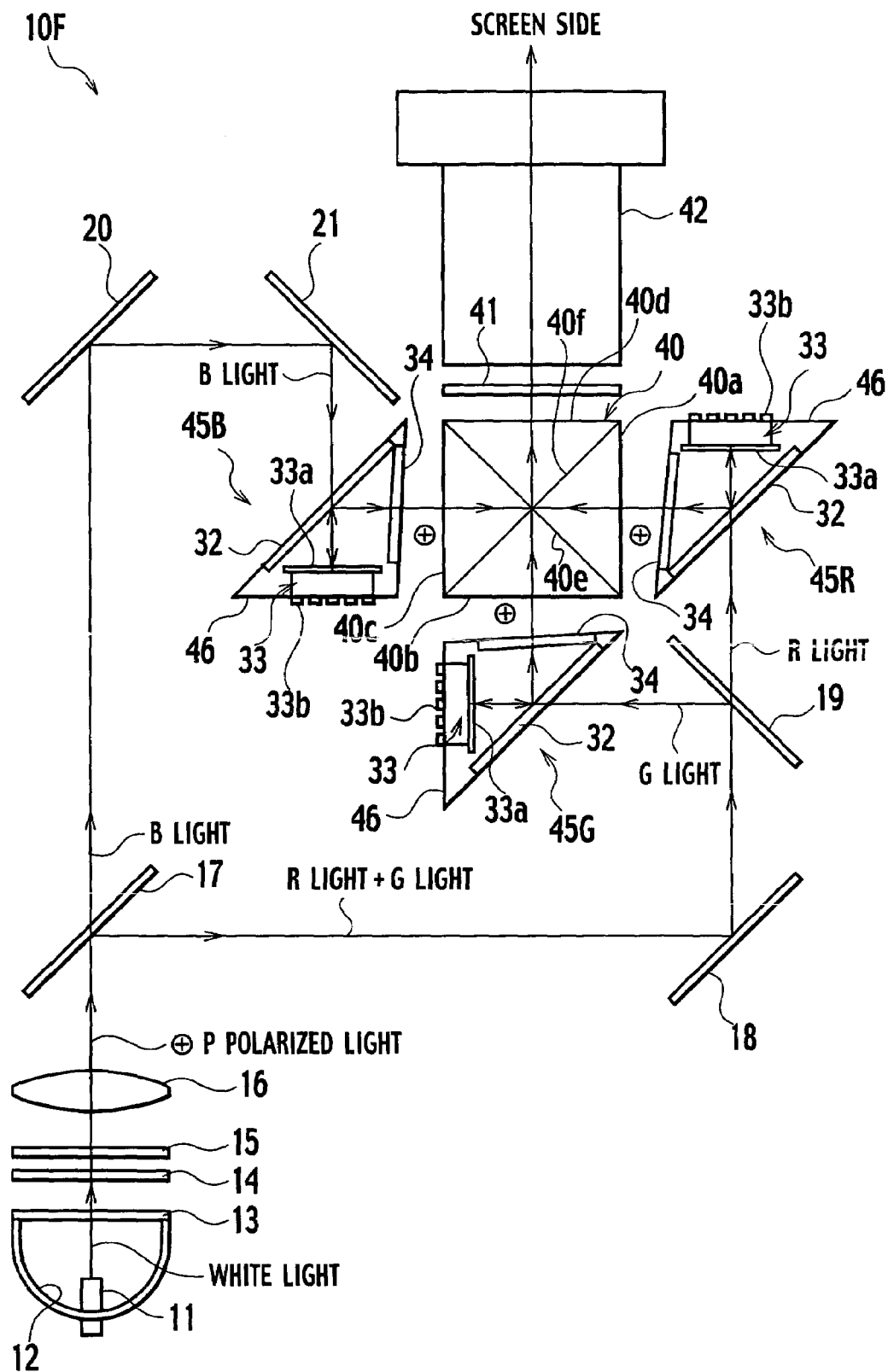
FIG. 18 is a plan view showing a configuration of a projection type display apparatus of Modification 6 obtained by partially modifying the projection type display apparatus of Embodiment 1 according to the present invention.
Figure 19A:
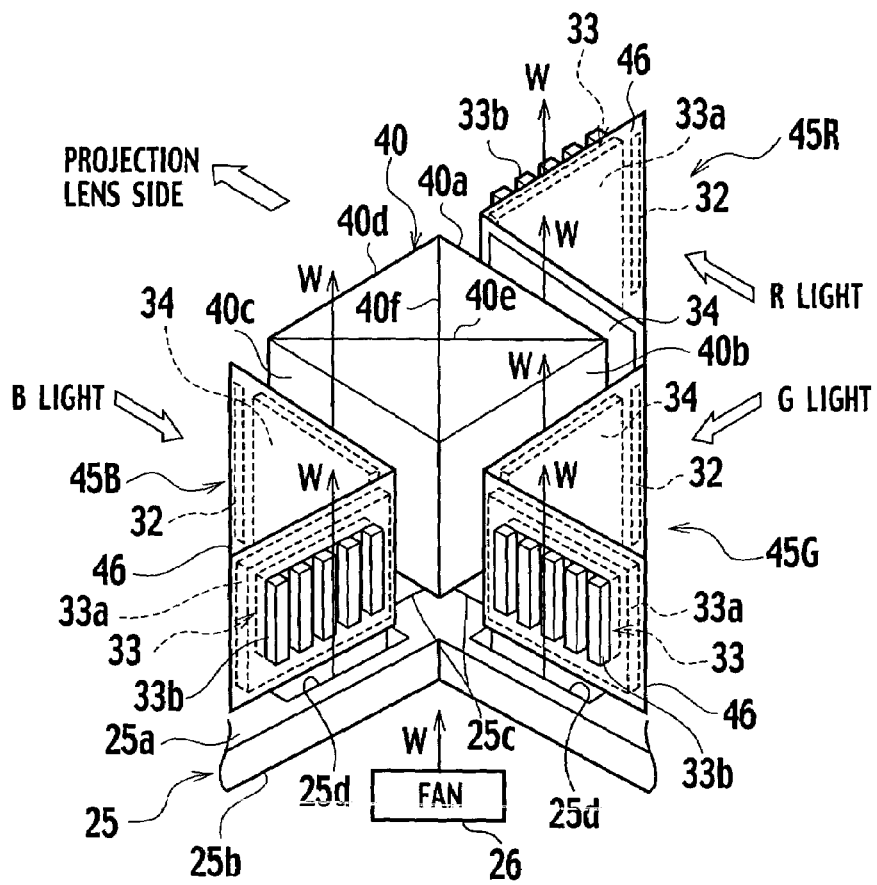
FIGS. 19A and 19B are a perspective view showing respective reflective liquid crystal panel assemblies for R, G and B lights and a three-color combination cross dichroic prism and a side view showing the three-color combination cross dichroic prism and the reflective liquid crystal panel assembly for the G light in Modification 6 obtained by partially modifying the projection type display apparatus of Embodiment 1.
Figure 19B:
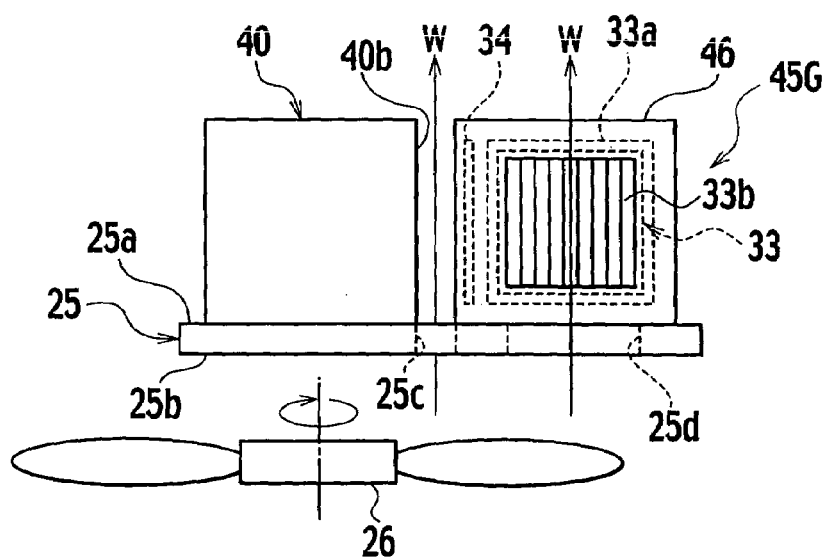
Figure 20:
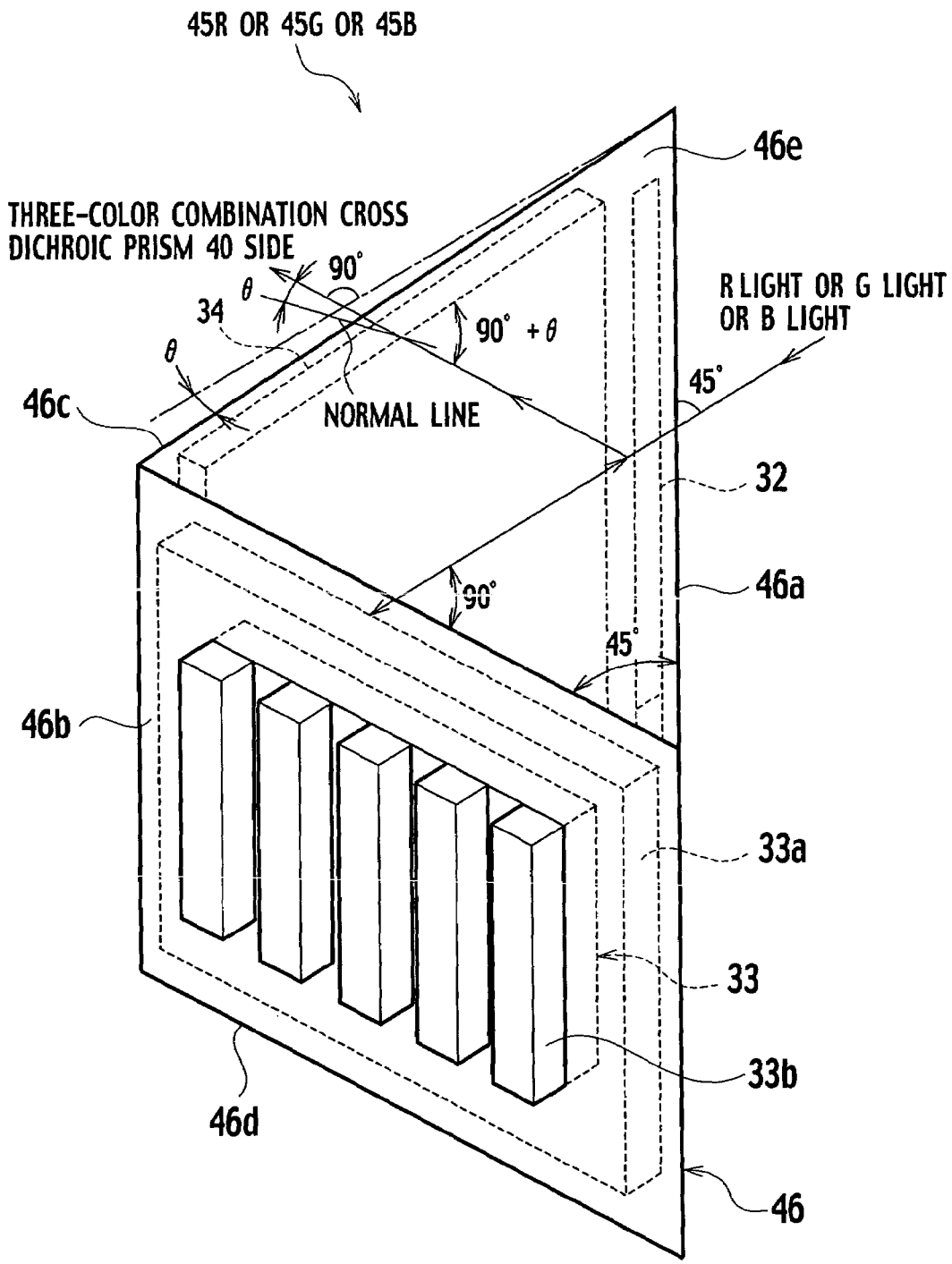
FIG. 20 is a perspective view showing the reflective liquid crystal panel assembly for the R light, the G light or the B light in an enlarging manner in Modification 6 obtained by partially modifying the projection type display apparatus of Embodiment 1.

FIG. 18 is a plan view showing a configuration of a projection type display apparatus of Modification 6 obtained by partially modifying the projection type display apparatus of Embodiment 1 according to the present invention. FIGS. 19A and 19B are a perspective view showing respective reflective liquid crystal panel assemblies for R, G and B lights and a three-color combination cross dichroic prism and a side view showing the three-color combination cross dichroic prism and the reflective liquid crystal panel assembly for the G light in Modification 6 obtained by partially modifying the projection type display apparatus of Embodiment 1. FIG. 20 is a perspective view showing the reflective liquid crystal panel assembly for the R light, the G light or the B light in an enlarging manner in Modification 6 obtained by partially modifying the projection type display apparatus of Embodiment 1.

As shown in FIGS. 18, 19A and 19B, in the projection type display apparatus 10F of Modification 6 obtained by partially modifying Embodiment 1, a shape of a third surface 46$c$ (FIG. 20) in each triangular prismatic housing 46 is different from that of the triangular prismatic housing 31 (FIGS. 4, 5A and 5B) of Embodiment 1, each triangular prismatic housing 46 being provided in each of a reflective liquid crystal panel assembly 45R for R light, a reflective liquid crystal panel assembly 45G for G light and a reflective liquid crystal panel assembly 45B for B light.

That is, as shown in FIG. 20 in an enlarging manner, in Modification 6 of Embodiment 1, each of the reflective liquid crystal panel assembly 45R for the R light, the reflective liquid crystal panel assembly 45G for the G light and the reflective liquid crystal panel assembly 45B for the B light has the following configuration. That is, a hollow triangular prismatic housing 46 is first prepared for each color light and, in the triangular prismatic housing 46 for each color light, a tabular reflective polarizing plate 32 (a so-called "wire grid polarizer") as polarization splitting means is attached on a first surface 46$a$ having an inclination angle of approximately 45° with respect to an optical axis of each color light from each color light illuminating means from a light source 11 (FIG. 18) to color separation optical systems 17 and 19 (FIG. 18), and a reflective liquid crystal panel 33 is attached on a second surface 46$b$ orthogonal to the optical axis of each color light transmitted through the reflective polarizing plate 32 for each color light. This point is the same as Embodiment 1. However, a transmission type polarizing plate 34 as unnecessary polarized light removing means is attached on a third surface 46$c$ having a predetermined inclination angle θ with respect to the optical axis of each color light obtained by reflecting reflected light from the reflective liquid crystal panel 33 for each color light by the reflective polarizing plate 32 for each color light, and unnecessary reflected light from a projection lens 42 side is prevented from being projected by the transmission type polarizing plate 34 for each color light which is inclined at a predetermined angle. Furthermore, in a state where a space of the triangular prismatic housing 46 surrounded by the first surface 46$a$ to the third surface 46$c$ is sealed from dust or the like by a lower surface 46$d$ and an upper surface 46$e$, each side on which the transmission type polarizing plate 34 for each color light is arranged faces each of the incidence surfaces 40$a$ to 40$c$ (FIGS. 18, 19A and 19B) of the three-color cross dichroic prism 40 with each gap therebetween.

In this example, as to an inclination direction of the third surface 46$c$ as a light emission surface side of the triangular prismatic housing 46, it is desirable to incline the third surface 46$c$ along spread of light emitted from the liquid crystal panel 33 for each color light. Additionally, the inclination angle θ of the third surface 46$c$ of the triangular prismatic housing 46 is set as an angle formed by a normal line of the transmission type polarizing plate 34 for each color light attached along this third surface 46$c$ and the optical axis of each color light, and it is effective to incline the third surface 46$c$ in such a manner that a light ray having a maximum angle of an effective light beam of each color light emitted from the liquid crystal panel 33 for each color light exceeds a fetch angle of the projection lens 42 (FIG. 18). Specifically, the third surface 46c of the triangular prismatic housing 46 is inclined so that the inclination angle θ becomes 10° or above when the projection lens 42 of F2.8 is used, and the same is inclined so that the inclination angle θ becomes approximately 8° when the projection lens 42 of F3.2 is used.

It is to be noted that the triangular prismatic housing 46 is likewise applied to later-described Modifications 7 to 9 obtained by partially modifying Embodiment 1.

Here, giving a description on the unnecessary reflected light from the projection lens 42 side, an AR coat (Anti Reflection Coat) is applied on each interface of each optical component from the transmission polarizing plate 34 for each color light to the projection lens 42, and an interface reflection loss generated on each interface of each optical component is reduced as much as possible. However, even if the AR coat is applied on each interface of each optical component, reflection of approximately 0.2% to 1% occurs to generate unnecessary reflected light. Additionally, when this unnecessary reflected light is projected onto a screen (not shown) through the projection lens 42, contrast of color-combined image light emitted from the projection lens 42 is lowered, or a ghost image is displayed.

Accordingly, in the projection type display apparatus 10F of Modification 6 obtained by partially modifying Embodiment 1, the third surface 46c as the light emission surface side of the triangular prismatic housing 46 for each color light is inclined at a predetermined angle with respect to an optical axis of each color light, and the transmission type polarizing plate 34 for each color light is obliquely attached along this third surface 46c. As a result, when the unnecessary reflected light from the projection lens 42 side returns to the transmission type polarizing plate 34 for each color light and the unnecessary reflected light again enters the projection lens 42 through the three-color combination cross dichroic prism 40 by interface reflection of the transmission type polarizing plate 34 for each color light, the unnecessary reflected light deviates from the fetch angle of the projection lens 42, whereby the unnecessary reflected light does not reach the screen (not shown).

As a result, contrast is not lowered with respect to color-combined image light emitted from the projection lens 42, and a factor of displaying a ghost image can be also eliminated. Therefore, the color-combined image light with high picture quality can be projected onto the screen.

Further, color purity can be increased by adding an unnecessary wavelength band restricting effect to the transmission type polarizing plate 34 for each color light attached on the third surface 46c of the triangular prismatic housing 46.

Furthermore, it is possible to eliminate a ghost component which enters the liquid crystal panel 33 for a given color from the liquid crystal panel 33 for another color. For example, a mixed-color component between the respective R, G and B bands can be attenuated by adopting the transmission type polarizing plate 34 for each color light on which a dichroic filter with reduced bandwidths of R, G and B is deposited. Of course, since the transmission type polarizing plate 34 for each color light having the dichroic filter is inclined at a predetermined angle with respect to the optical axis of each color light as described above, unwanted reflected light from the projection lens 42 side does not reach the screen (not shown) even if a reflective wavelength band restricting function of a dichroic film or the like is provided, thereby obtaining a projected image with high color purity and high contrast.

Moreover, in Modification 6 of Embodiment 1, as shown in FIGS. 19A and 19B, since an air stream W generated when rotating a fan 26 is supplied to an upper surface 25a side of a base board 25 from a lower surface 25b side of the base board 25 through first and second fan holes 25c and 25d formed in the base board 25, it is possible to suppress an increase in temperatures of the reflective liquid crystal panel 33 for each color light, the transmission type polarizing plate 34 for each color light and the three-color combination cross dichroic prism 40 by air-cooling of the fan 26 to further assuredly avoid deterioration due to heat generation, whereby high luminance and high contrast can be achieved, which contributes to an improvement in reliability with respect to the projection type display apparatus 10F of Modification 6.

Figure 21:
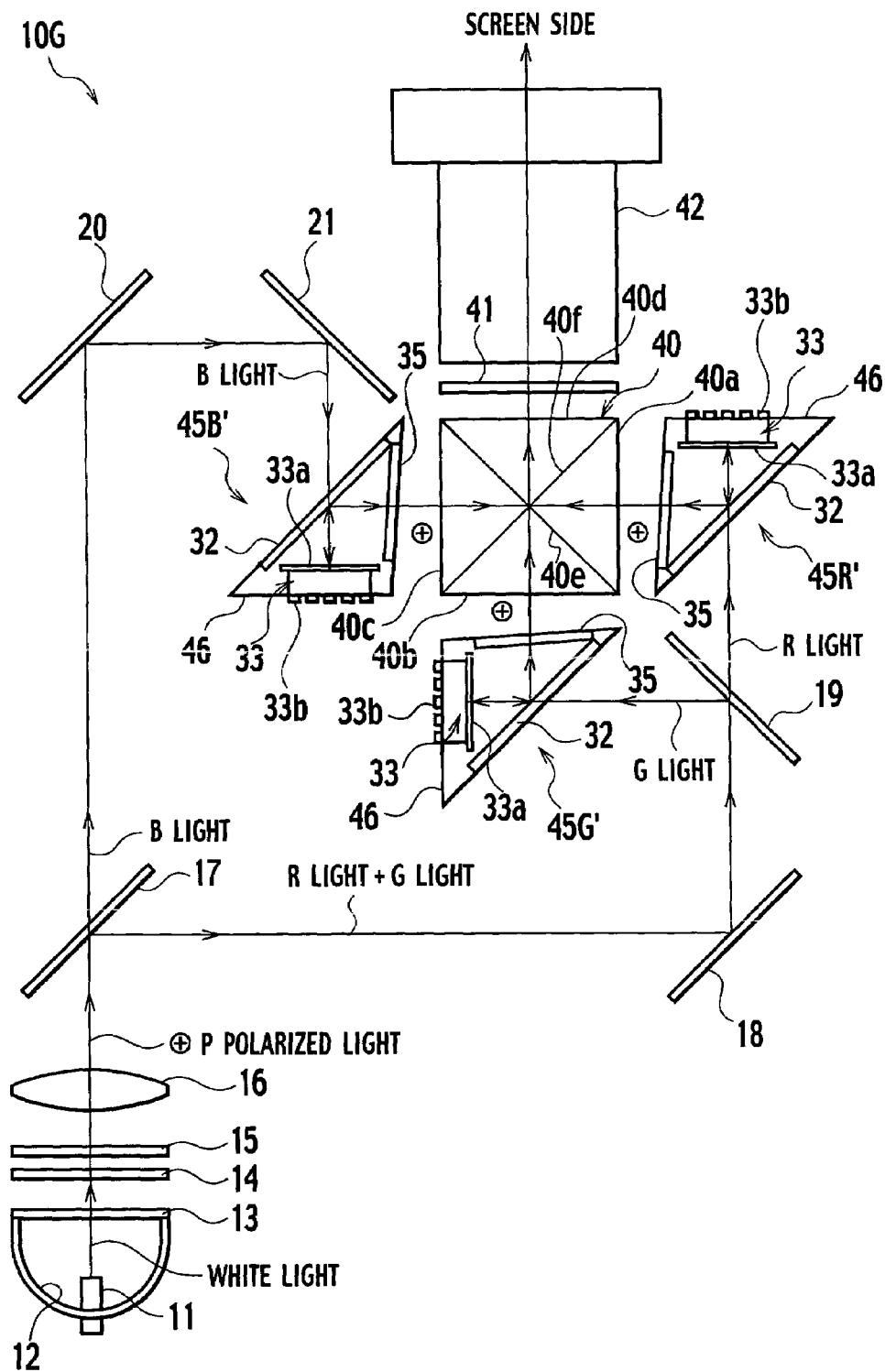
FIG. 21 is a plan view showing a configuration of a projection type display apparatus of Modification 7 obtained by partially modifying the projection type display apparatus of Embodiment 1 according to the present invention.
Figure 22A:
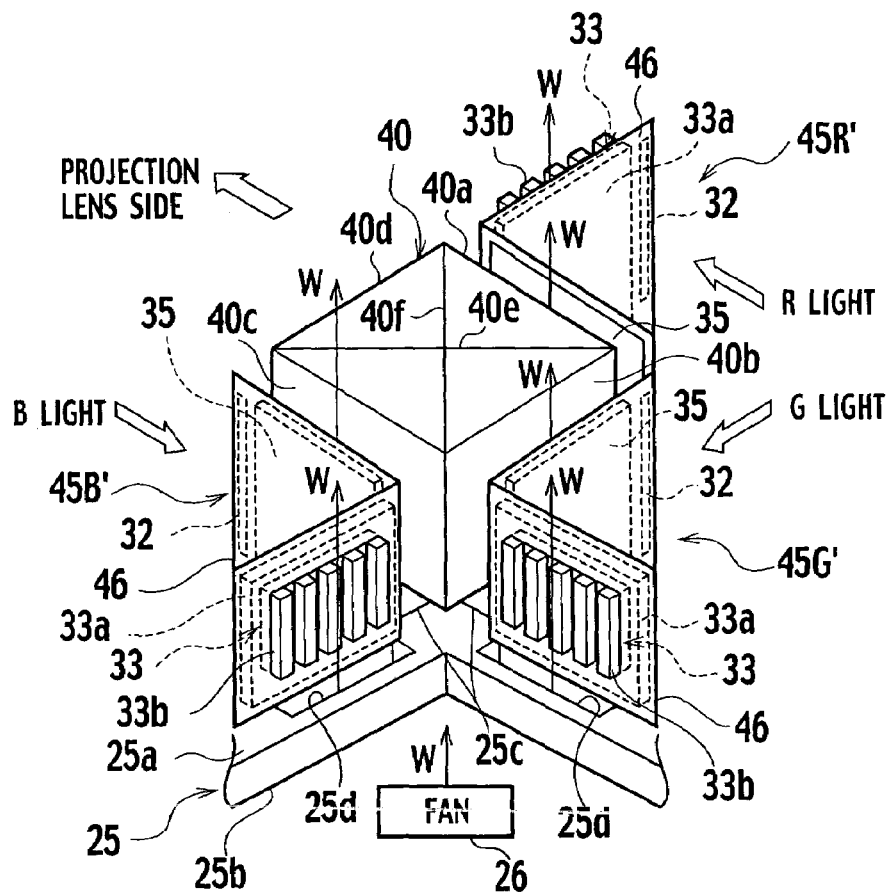
FIGS. 22A and 22B are a perspective view showing respective reflective liquid crystal panel assemblies for R, G and B lights and a three-color combination cross dichroic prism and a side view showing the three-color combination cross dichroic prism and the reflective liquid crystal panel assembly for the G light in Modification 7 obtained by partially modifying the projection type display apparatus of Embodiment 1.
Figure 22B:
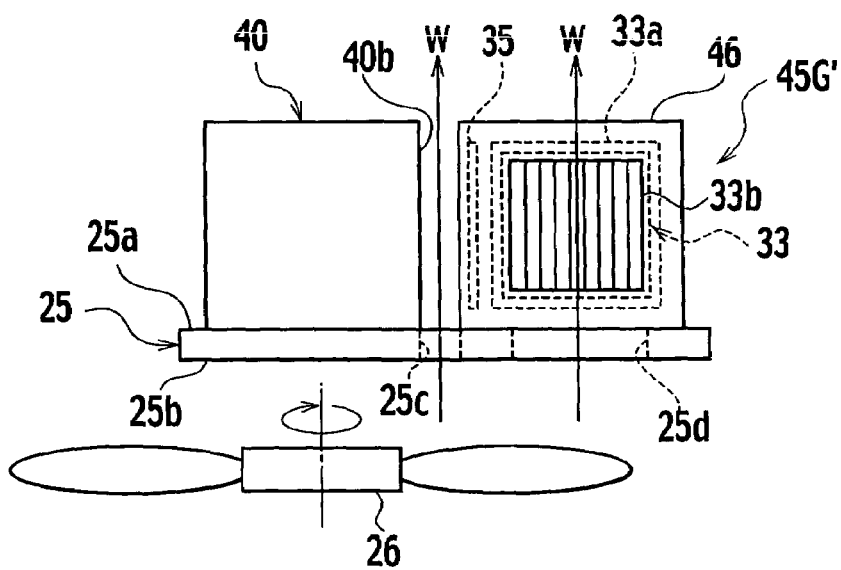

A projection type display apparatus 10G of Modification 7 obtained by partially modifying the projection type display apparatus 10 of Embodiment 1 will now be briefly described while mainly focusing on a difference from Embodiment 1 (FIGS. 4, 5A and 5B) and Modification 1 (FIGS. 8, 9A and 9B) obtained by partially modifying Embodiment 1 with reference to FIGS. 21, 22A and 22B.

FIG. 21 is a plan view showing a configuration of a projection type display apparatus of Modification 7 obtained by partially modifying the projection type display apparatus of Embodiment 1 according to the present invention. FIGS. 22A and 22B are a perspective view showing respective reflective liquid crystal panel assemblies for R, G and B lights and a three-color combination cross dichroic prism and a side view showing the three-color combination cross dichroic prism and the reflective liquid crystal panel assembly for the G light in Modification 7 obtained by partially modifying the projection type display apparatus of Embodiment 1.

As shown in FIGS. 21, 22A and 22B, in a projection type display apparatus 10G of Modification 7 obtained by partially modifying Embodiment 1, a shape of a third surface 46c (FIG. 20) of a triangular prismatic housing 46 provided in each of a reflective liquid crystal panel assembly 45R' for R light, a reflective liquid crystal panel assembly 45G' for G light and a reflective liquid crystal panel assembly 45B' for B light is different from those of the triangular prismatic housing 31 (FIGS. 4, 5A and 5B) of Embodiment 1 and the triangular prismatic housing 31 (FIGS. 8, 9A and 9B) of Modification 1. On the other hand, a reflective polarizing plate 35 for each color light which reflects unnecessary polarized light as unnecessary polarized light removing means is provided on this third surface 46c, which is the same as Modification 1.

That is, in Modification 7 of Embodiment 1, each of the reflective liquid crystal panel assembly 45R' for the R light, the reflective liquid crystal panel assembly 45G' for the G light and the reflective liquid crystal panel assembly 45B' for the B light has the following configuration. That is, a hollow triangular prismatic housing 46 is first prepared for each color light and, in the triangular prismatic housing 46 for each color light, a tabular reflective polarizing plate 32 (a so-called "wire grid polarizer") as polarization splitting means is attached on a first surface 46a (FIG. 20) having an inclination angle of approximately 45° with respect to an optical axis of each color light from each color light illuminating means from a light source 11 to color separation optical systems 17 and 19, and a reflective liquid crystal panel 33 is attached on a second surface 46b (FIG. 20) orthogonal to the optical axis of each color light transmitted through the reflective polarizing plate 32 for each color light. This point is the same as Embodiment 1 and Modification 1. However, a difference from Embodiment 1 and Modification 1 lies in that a reflective polarizing plate 35 as unnecessary polarized light removing means is attached on a third surface 46c (FIG. 20) having a predetermined inclination angle θ (FIG. 20) with respect to the optical axis of each color light obtained by reflecting reflected light from the reflective liquid crystal panel 33 for each color light by the reflective polarizing plate 32 for each color light in place of the transmission type polarizing plate 34 of Embodiment 1 (FIGS. 4, 5A and 5B) so that unnecessary reflected light from a projection lens 42 side is prevented from being projected by the reflective type polarizing plate 35 for each color light inclined at a predetermined angle, and each side on which the reflective polarizing plate 35 for each color light is arranged faces each of incidence surfaces 40a to 40c of a three-color combination cross dichroic prism 40 with a gap therebetween.

In this example, the inclination angle θ (FIG. 20) of the third surface 46c as a light emission surface side of the triangular prismatic housing 46 is set as an angle formed by a normal line of the reflective polarizing plate 35 for each color light attached along this third surface 46c and the optical axis of each color light, and it is effective to incline the third surface 46c in such a manner that a light ray having a maximum angle of an effective light beam of each color light emitted from the liquid crystal panel 33 for each color light exceeds a fetch angle of the projection lens 42 (FIG. 21). Specifically, the third surface 46c is inclined so that the inclination angle θ becomes 10° or above when the projection lens 42 of F2.8 is used, and the same is inclined so that the inclination angle θ becomes approximately 8° when the projection lens 42 of F3.2 is used.

Therefore, in the projection type display apparatus 10G of Modification 7 obtained by partially modifying Embodiment 1, the third surface 46c as the light emission surface side of the triangular prismatic housing 46 for each color light is inclined at a predetermined angle with respect to the optical axis of each color light, and the reflective polarizing plate 35 for each color light is obliquely attached along this third surface 46c. As a result, when unnecessary reflected light from the projection lens 42 side returns to the reflective polarizing plate 35 for each color light and the unnecessary reflected light again enters the projection lens 42 through the three-color combination cross dichroic prism 40 by interface reflection of the reflective polarizing plate 35 for each color light, the unnecessary reflected light deviates from the fetch angle of the projection lens 42 so that it does not reach a screen (not shown).

As a result, contrast is not lowered with respect to color-combined image light emitted from the projection lens 42, and a factor of displaying a ghost image is also eliminated. Therefore, the color-combined image light with high picture quality can be projected onto the screen.

Moreover, for example, when a dichroic filter with reduced bandwidths of R, G and B is deposited on the reflective polarizing plate 35 for each color light attached on the third surface 46c of the triangular prismatic housing 46 to add an unnecessary wavelength band restricting effect, it is possible to obtain a projected image having high color purity and improved contrast.

Additionally, in Modification 7 of Embodiment 1, as shown in FIGS. 22A and 22B, likewise, since an air stream W generated when rotating a fan 26 is supplied to an upper surface 25a side of a base board 25 from a lower surface 25b side of the base board 25 through first and second fan holes 25c and 25d formed in the base board 25, it is possible to suppress an increase in temperatures of the reflective liquid crystal panel 33 for each color light, the reflective polarizing plate 35 for each color light and the three-color combination cross dichroic prism 40 by air-cooling of the fan 26 to further assuredly avoid deterioration due to heat generation, whereby high luminance and high contrast can be achieved, which contributes to an improvement in reliability with respect to the projection type display apparatus 10G of Modification 7.

Figure 23:
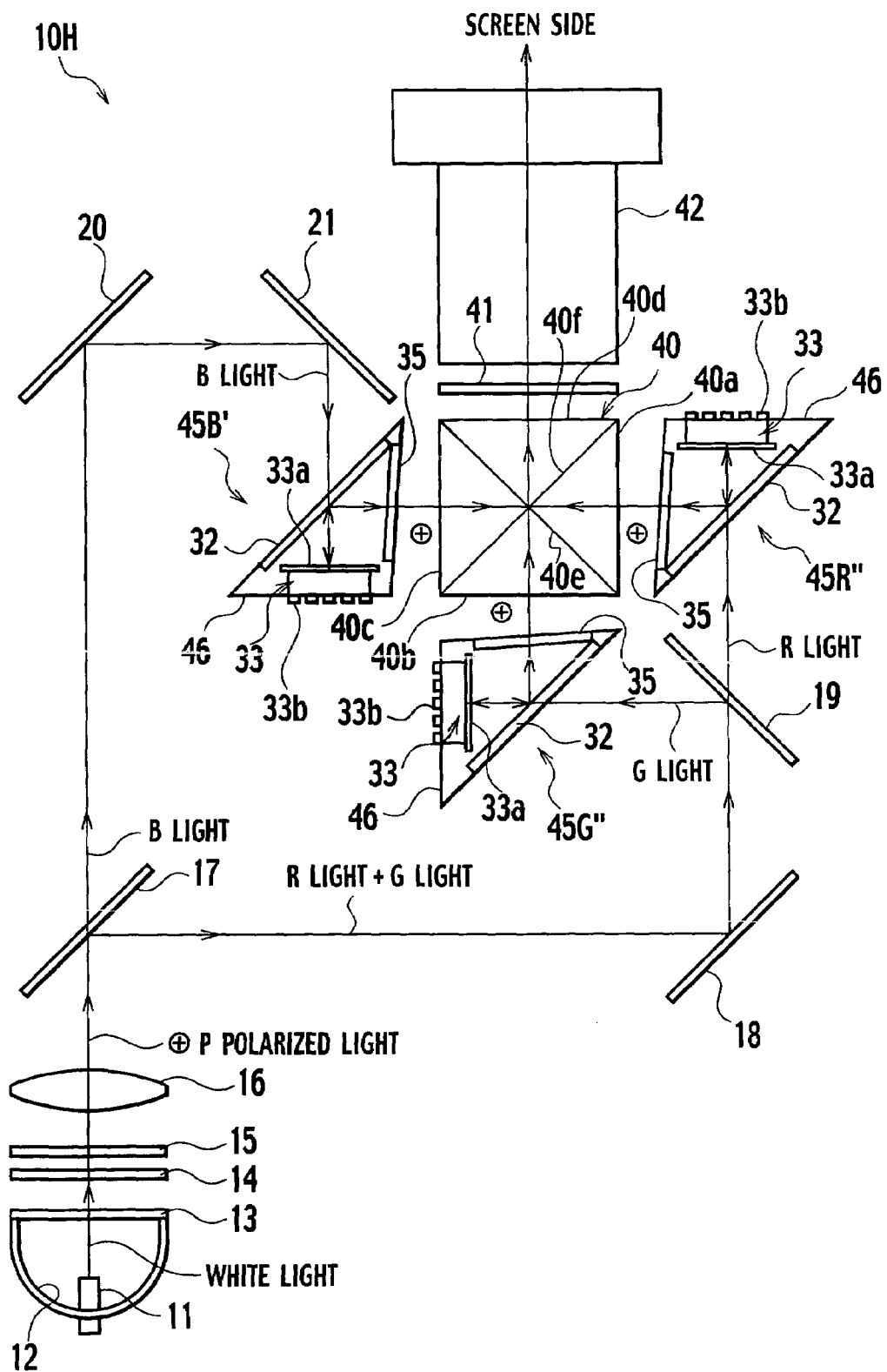
FIG. 23 is a plan view showing a configuration of a projection type display apparatus of Modification 8 obtained by partially modifying the projection type display apparatus of Embodiment 1 according to the present invention.
Figure 24A:
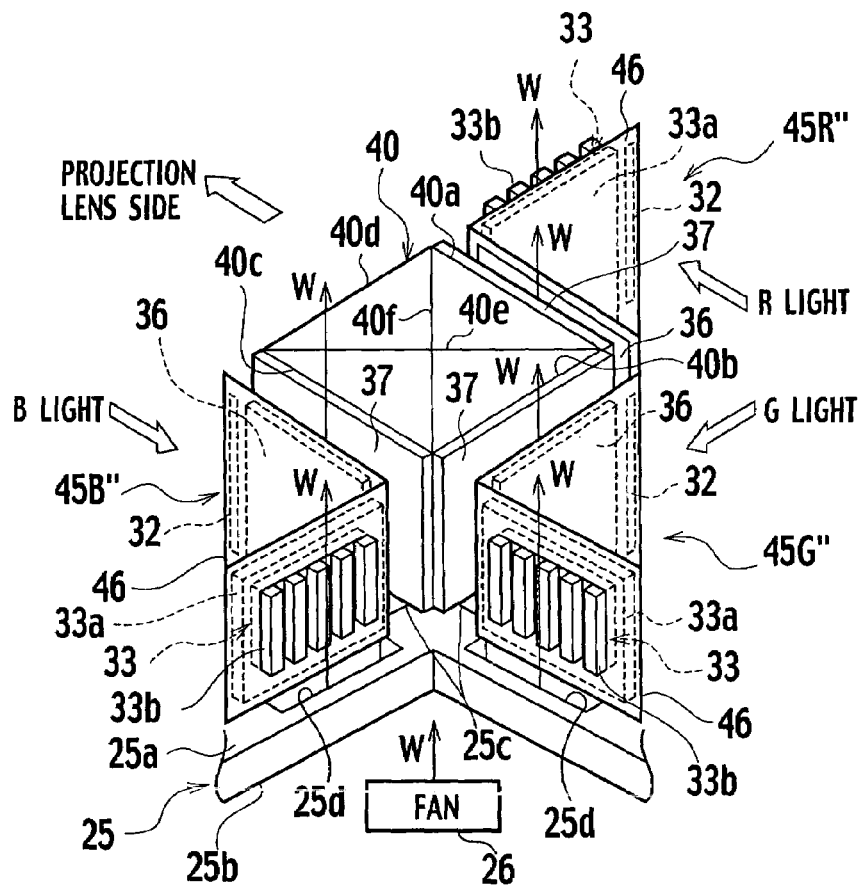
FIGS. 24A and 24B are a perspective view showing respective reflective liquid crystal panel assemblies for R, G and B lights and a three-color combination cross dichroic prism and a side view showing the three-color combination cross dichroic prism and the reflective liquid crystal panel assembly for the G light in Modification 8 obtained by partially modifying the projection type display apparatus of Embodiment 1.
Figure 24B:
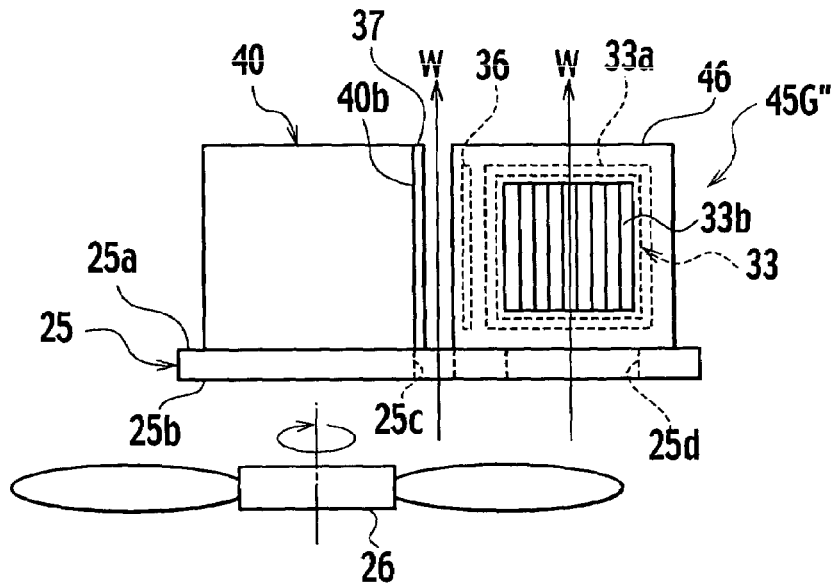

A projection type display apparatus 10H of Modification 8 obtained by partially modifying the projection type display apparatus 10 of Embodiment 1 will now be briefly described while mainly focusing on a difference from Embodiment 1 (FIGS. 4, 5A and 5B) and Modification 2 (FIGS. 10, 11A and 11B) obtained by partially modifying Embodiment 1 with reference to FIGS. 23, 24A and 24B.

FIG. 23 is a plan view showing a configuration of a projection type display apparatus of Modification 8 obtained by partially modifying the projection type display apparatus of Embodiment 1 according to the present invention. FIGS. 24A and 24B are a perspective view showing respective reflective liquid crystal panel assemblies for R, G and B lights and a three-color combination cross dichroic prism and a side view showing the three-color combination cross dichroic prism and the reflective liquid crystal panel assembly for the G light in Modification 8 obtained by partially modifying the projection type display apparatus of Embodiment 1.

As shown in FIGS. 23, 24A and 24B, in the projection type display apparatus 10H of Modification 8 obtained by partially modifying Embodiment 1, a shape of a third surface 46 (FIG. 20) of each triangular prismatic housing 46 provided in a reflective liquid crystal panel assembly 45R" for R light, a reflective liquid crystal panel assembly 45G" for G light and a reflective liquid crystal panel assembly 45B" for B light is different from those of the triangular prismatic housing 31 (FIGS. 4, 5A and 5B) of Embodiment 1 and the triangular prismatic housing 31 (FIGS. 10, 11A and 11B) of Modification 2. On the other hand, a transparent glass plate 36 for each color light is attached on this third surface 46c, and a transmission type polarizing plate 37 which is of a light absorption type as unnecessary polarized light removing means for each color light is secured on each of incidence surfaces 40a to 40c of a three-color combination cross dichroic prism 40 in such a manner that this transmission type polarizing plate 37 faces the transparent glass plate 36 for each color light. These points are the same as Modification 2.

That is, in Modification 8 of Embodiment 1, each of the reflective liquid crystal panel assembly 45R" for the R light, the reflective liquid crystal panel assembly 45G" for the G light and the reflective liquid crystal panel assembly 45B" for the B light has the following configuration. That is, a hollow triangular prismatic housing 46 is first prepared for each color light and, in the triangular prismatic housing 46 for each color light, a tabular reflective polarizing plate (a so-called "wire grid polarizer") 32 as polarization splitting means is attached on a first surface 46a having an inclination angle of approximately 45° with respect to an optical axis of each color light from each color light illuminating means from a light source 11 to color separation optical systems 17 and 19, and a reflective liquid crystal panel 33 is attached on a second surface 46b (FIG. 20) orthogonal to the optical axis of each color light transmitted through the reflective polarizing plate 32 for each color light. This point is the same as Embodiment 1 and Modification 2. However, a difference from Embodiment 1 and Modification 2 lies in that the transparent glass plate 36 is attached on the third surface 46c (FIG. 20) having a predetermined inclination angle θ (FIG. 20) with respect to the optical axis of each color light obtained by reflecting reflected light from the reflective liquid crystal panel 33 for each color light by the reflective polarizing plate 32 for each color light in place of the transmission type polarizing plate 34 (FIGS. 4, 5A and 5B) of Embodiment 1 in order to prevent unnecessary reflected light from a projection lens 42 side from being projected by the transparent glass plate 36 for each color light inclined at a predetermined angle, and each side on which the transparent glass plate 36 for each color light is arranged faces each of incidence surfaces 40a to 40c of the three-color combination cross dichroic prism 40 with a gap therebetween.

Based on the above-described configuration, the transmission type polarizing plate 37 which is of a light absorption type as unnecessary polarized light removing means for each color light which removes unnecessary polarized light from each color light transmitted through the transparent glass plate 36 for each color light is secured on each of the incidence surfaces 40a to 40c of the three-color combination cross dichroic prism 40. This point is the same as Modification 2.

In this example, the inclination angle θ (FIG. 20) of the third surface 46c as a light emission surface side of the triangular prismatic housing 46 is set as an angle formed by a normal line of the transparent glass plate 36 for each color light attached along this third surface 46c and an optical axis of each color light, and it is effective to incline the this surface 46c in such a manner that a light ray with a maximum angle of an effective light beam of each color light emitted from the liquid crystal panel 33 for each color light exceeds a fetch angle of the projection lens 42 (FIG. 23). Specifically, the third surface 46c of the triangular prismatic housing 46 is inclined in such a manner that the inclination angle θ becomes 10° or above when the projection lens 42 of F2.8 is used, and the same is inclined in such a manner that the inclination angle θ becomes approximately 8° when the projection lens 42 of F3.2 is used.

Therefore, in the projection type display apparatus 1OH of Modification 8 obtained by partially modifying Embodiment 1, the third surface 46c as the light emission surface side of the triangular prismatic housing 46 for each color light is inclined at a predetermined angle with respect to the optical axis, and the transparent glass plate 36 is obliquely attached along this third surface 46c. As a result, when unnecessary reflected light from the projection lens 42 side returns to the transparent glass plate 36 for each color light and again enters the projection lens 42 through the transmission type polarizing plate 37 for each color light and the three-color combination cross dichroic prism 40 by interface reflection of the transparent glass plate 36 for each color light, the unnecessary reflected light deviates from the fetch angle of the projection lens 42 so that it does not reach the screen (not shown).

Consequently, contrast is not lowered with respect to color-combined image light emitted from the projection lens 42 and a factor of displaying a ghost image is also eliminated, thereby projecting the color-combined image light with high picture quality onto the screen.

Furthermore, for example, when a dichroic filter with narrowed bands of R, G and B is deposited on the transparent glass plate 36 for each color light attached on the third surface 46c of the triangular prismatic housing 46 to add an unnecessary wavelength band restricting effect, thereby obtaining a projected image with high color purity and high contrast.

Moreover, in Modification 8 of Embodiment 1, as shown in FIGS. 24A and 24B, an air stream W generated when rotating a fan 26 is supplied to an upper surface 25a side of a base board 25 from a lower surface 25b side of the base board 25 through first and second fan holes 25c and 25d formed in this base board 25. Therefore, it is possible to suppress an increase in temperatures of the reflective liquid crystal panel 33 for each color light, the transparent glass plate 36 for each color light and the transmission type polarizing plate 37 for each color light secured on each of the incidence surfaces 40a to 40c of the three-color combination cross dichroic prism 40 to avoid deterioration due to heat generation. As a result, high luminance and high contrast can be achieved, which contributes to an improvement in reliability with respect to the projection type display apparatus 10H of Modification 8 obtained by partially modifying Embodiment 1.

Figure 25:
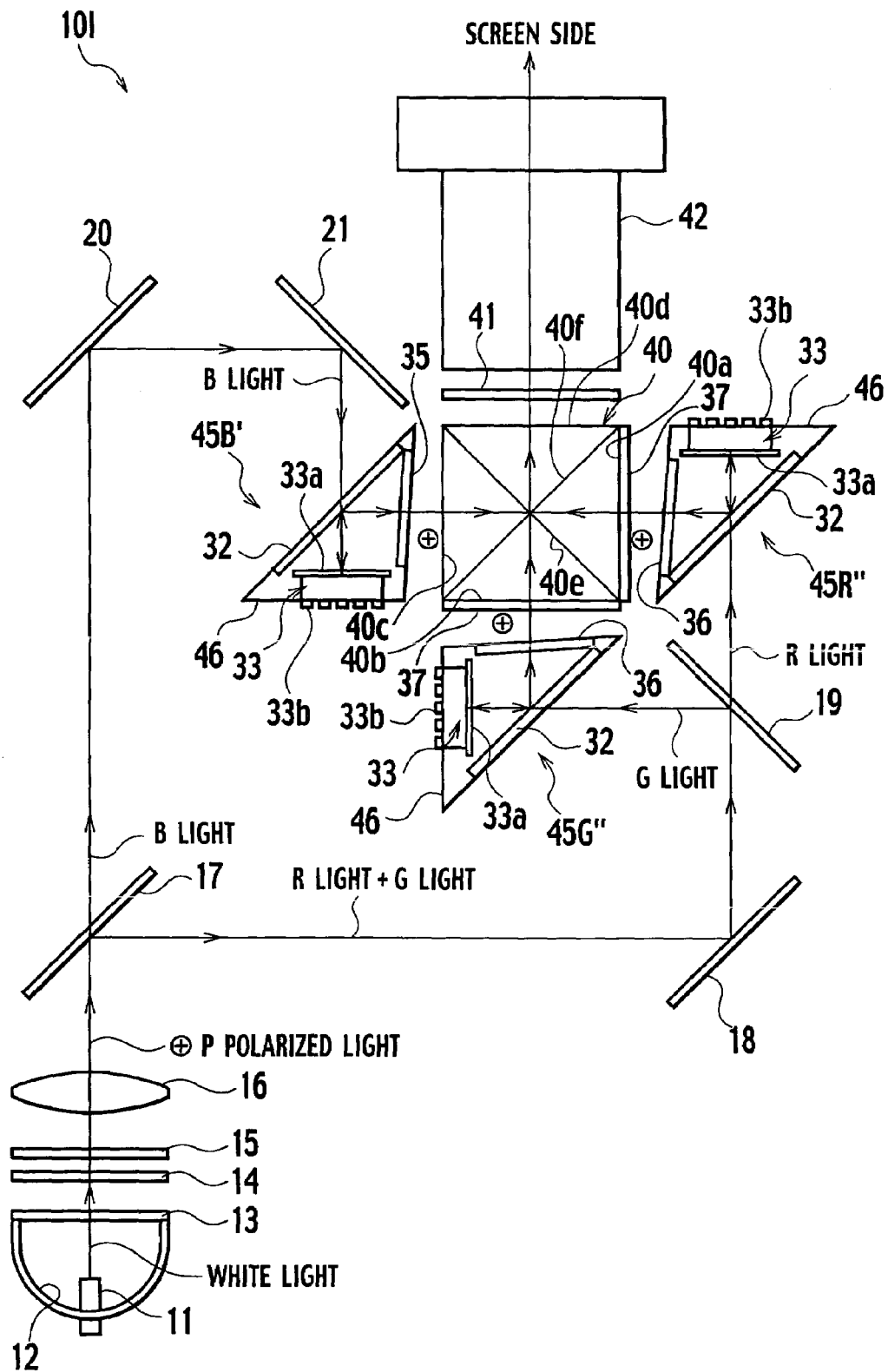
FIG. 25 is a plan view showing a configuration of a projection type display apparatus of Modification 9 obtained by partially modifying the projection type display apparatus of Embodiment 1 according to the present invention.
Figure 26A:
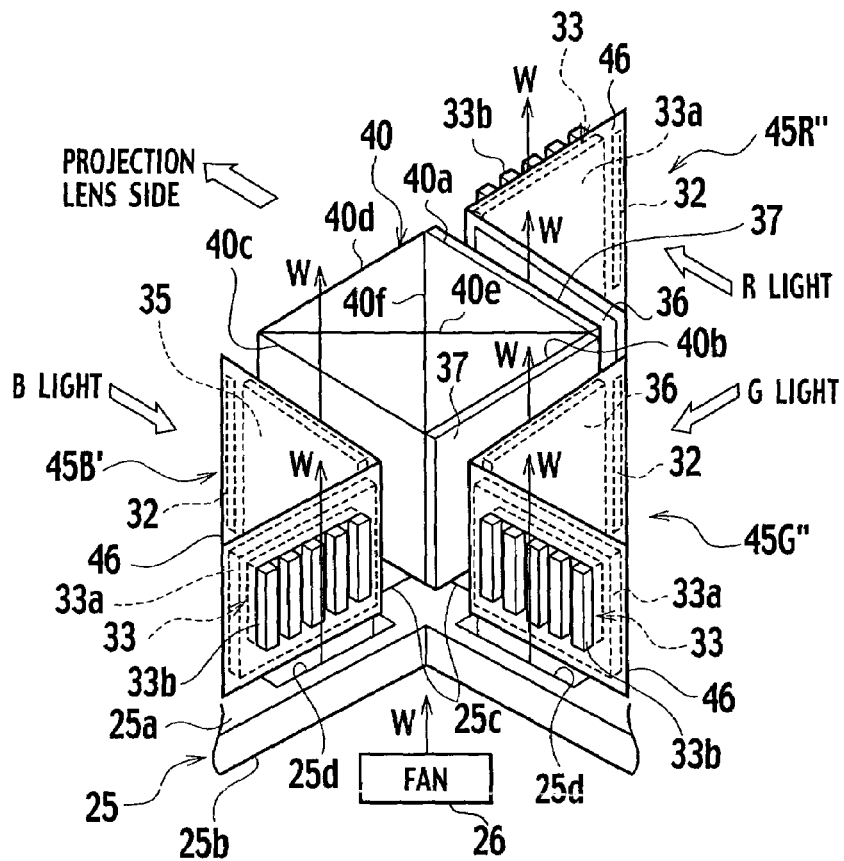
FIGS. 26A and 26B are a perspective view showing respective reflective liquid crystal panel assemblies for R, G and B lights and a three-color combination cross dichroic prism and a side view showing the reflective liquid crystal panel assembly for the B light, the three-color combination cross dichroic prism and the reflective liquid crystal panel assembly for the R light in Modification 9 obtained by partially modifying the projection type display apparatus of Embodiment 1.
Figure 26B:
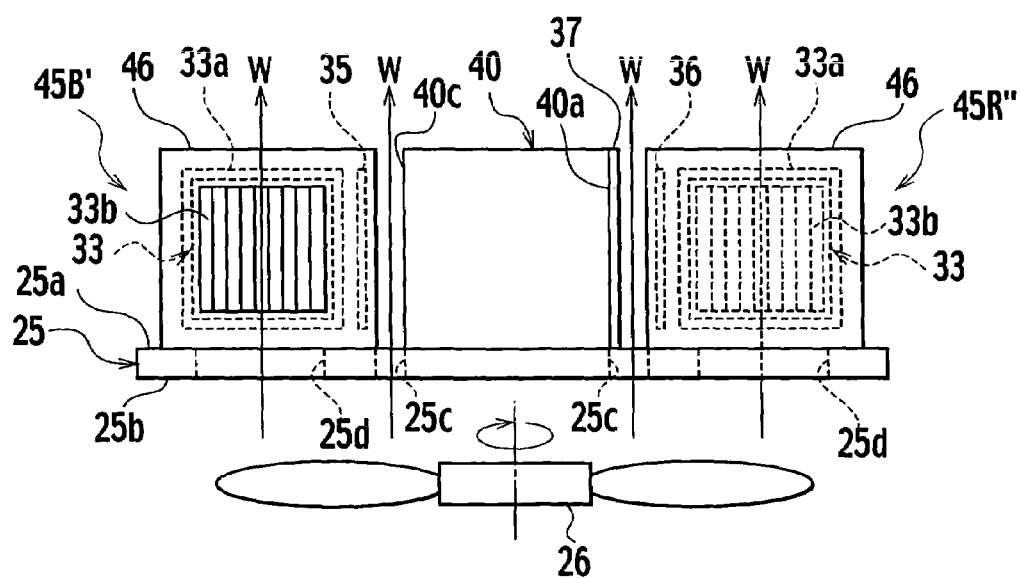

A projection type display apparatus 10I of Modification 9 obtained by partially modifying the projection type display apparatus 10 of Embodiment 1 will now be briefly described while mainly focusing on a difference from Embodiment 1 (FIGS. 4, 5A and 5B) and Modification 3 (FIGS. 12, 13A and 13B) obtained by partially modifying Embodiment 1 with reference to FIGS. 25, 26A and 26B.

FIG. 25 is a plan view showing a configuration of a projection type display apparatus of Modification 9 obtained by partially modifying the projection type display apparatus of Embodiment 1 according to the present invention. FIGS. 26A and 26B are a perspective view showing respective reflective liquid crystal panel assemblies for R, G and B lights and a three-color combination cross dichroic prism and a side view showing the reflective liquid crystal panel assembly for the B light, the three-color combination cross dichroic prism and the reflective liquid crystal panel assembly for the R light in Modification 9 obtained by partially modifying the projection type display apparatus of Embodiment 1.

As shown in FIGS. 25, 26A and 26B, in the projection type display apparatus 10I of Modification 9 obtained by partially modifying Embodiment 1, a shape of a third surface 46c (FIG. 20) of a triangular prismatic housing 46 provided in each of a reflective liquid crystal panel assembly 45R" for R light, a reflective liquid crystal panel assembly 45G" for G light and a reflective liquid crystal panel assembly 45B' for B light is different from those of the triangular prismatic housing 31 (FIGS. 4, 5A and 5B) of Embodiment 1 and the triangular prismatic housing 31 (FIGS. 12, 13A and 13B) of Modification 3. On the other hand, transparent glass plates 36 for the R light and G light are respectively provided on the third surfaces 46c of the respective triangular prismatic housings 46 for the R light and the G light, a reflective polarizing plate 35 as unnecessary polarized light removing means with respect to the B light is attached on the third surface 46c of the triangular prismatic housing 46 for the B light, and a transmission type polarizing plate 37 which is of a light absorption type as unnecessary polarized light removing means with respect to the R light and the G light is secured on each of incidence surfaces 40a and 40b of a three-color combination cross dichroic prism 40. This point is the same as Modification 3.

That is, in Modification 9 of Embodiment 1, each of the reflective liquid crystal panel assembly 45R" for the R light, the reflective liquid crystal panel assembly 45G" for the G light and the reflective liquid crystal panel assembly 45B' for the B light has the following configuration. That is, the hollow triangular prismatic housing 46 is first prepared for each color light and, in the triangular prismatic housing 46 for each color light, a tabular reflective polarizing plate (a so-called "wire grid polarizer") 32 as polarization splitting means is attached on a first surface 46a (FIG. 20) having an inclination angle of approximately 45° with respect to an optical axis of each color light from each color light illuminating means from a light source 11 to color separation optical systems 17 and 19, and a reflective liquid crystal panel 33 for each color light is attached on a second surface 46b (FIG. 20) orthogonal to the optical axis of each color light transmitted through the reflective polarizing plate 32 for each color light. This point is the same as Embodiment 1 and Modification 3. However, each of the transparent glass plate 36 for the R light or the G light is attached on the third surface 46c (FIG. 20) having a predetermined inclination angle θ (FIG. 20) with respect to the optical axis of the R light or the G light obtained by reflecting each reflected light from the reflective liquid crystal panel 33 for the R light or the G light by the reflective polarizing plate 32 for the R light or the G light in place of the transmission type polarizing plate 34 (FIGS. 4, 5A and 5B) of Embodiment 1, and the reflective polarizing plate 35 for the B light as the unnecessary polarized light removing means is attached on the third surface 46c (FIG. 20) having the predetermined inclination angle θ with respect to the optical axis of the B light obtained by reflecting reflected light from the reflective liquid crystal panel 33 for the B light by the reflective polarizing plate 32 for the B light in place of the transmission type polarizing plate 34 (FIGS. 4, 5A and 5B) of Embodiment 1. As a result, unnecessary reflected light from a projection lens 42 side is prevented from being projected by the transparent glass plates 36 for the R light and the G light and the reflective polarizing plate 35 for the B light inclined at the predetermined angle. Moreover, a side on which the transparent glass plate 36 for the R light or the G light is arranged faces the transmission type polarizing plate 37 as the unnecessary polarized light removing means for the R light or the G light secured on each of the incidence surfaces 40a and 40b of the three-color combination cross dichroic prism 40 with a gap therebetween, and a side on which the reflective polarizing plate 35 for the B light is arranged faces the incidence surface 40c of the three-color combination cross dichroic prism 40 with a gap therebetween. This point is different from Embodiment 1 and Modification 3.

In this example, the inclination angle θ (FIG. 20) of the third surface 46c as a light emission surface side of the triangular prismatic housing 46 is set as an angle formed by each normal line of the transparent glass plates 36 for the R light and the G light and the reflective polarizing plate 35 for the B light respectively attached along this third surface 46c and an optical axis of each color light, and it is effective to incline the third surface 46c in such a manner that a light ray having a maximum angle of an effective light beam of each color light emitted from the liquid crystal panel 33 for each color light exceeds a fetch angle of the projection lens 42 (FIG. 25). Specifically, the third surface 46c of the triangular prismatic housing 46 is inclined in such a manner that the inclination angle θ becomes 10° or above when the projection lens 42 of F2.8 is used, and the same is inclined in such a manner that the inclination angle θ becomes approximately 8° when the projection lens 42 of F3.2 is used.

Therefore, in the projection type display apparatus 10I of Modification 9 obtained by partially modifying Embodiment 1, the third surface 46c as the light emission surface side of the triangular prismatic housing 46 for each color light is inclined with respect to the optical axis of each color light at a predetermined angle, and each of the transparent glass plates 36 for the R light and the G light and the reflective polarizing plate 35 for the B light is obliquely attached along this third surface 46c. As a result, when unnecessary reflected light from the projection lens 42 side returns to the transparent glass plates 36 for the R light and the G light and the reflective polarizing plate 35 for the B light and again enters the projection lens 42 through the transmission type polarizing plates 37 for the R light and the G light and the three-color combination cross dichroic prism 40 by each interface reflection of the transparent glass plates 36 for the R light and the G light and the reflective polarizing plate 35 for the B light, the unnecessary reflected light deviates from the fetch angle of the projection lens 42 so that it does not reach a screen (not shown).

As a result, contrast is not lowered with respect to color-combined image light emitted from the projection lens 42, and a factor of displaying a ghost image can be also eliminated, thereby projecting the color-combined image light with high picture quality onto the screen.

Additionally, when dichroic filters with narrowed bands of R, G and B are deposited on the transparent glass plates 36 for the R light and the G light and the reflective polarizing plate 35 for the B light attached on the third surfaces 46c of the triangular prismatic housings 46 to add an unnecessary wavelength band restricting effect, a projected image with high color purity and high contrast can be obtained.

Further, in Modification 9 of Embodiment 1, as shown in FIGS. 26A and 26B, an air stream W generated when rotating a fan 26 is supplied to an upper surface 25a side of a base board 25 from a lower surface 25b side of a base board 25 through first and second fan holes 25c and 25d formed in this base board 25. Therefore, it is possible to suppress an increase in temperatures of the reflective liquid crystal panel 33, the reflective polarizing plate 35, the transparent glass plate 36 and the transmission type polarizing plate 37 by air-cooling of the fan 26 to avoid heat generation. As a result, high luminance and high contrast can be achieved, which contributes to an improvement in reliability with respect to the projection type display apparatus 10I of Modification 9 obtained by partially modifying Embodiment 1.

Embodiment 2

Figure 27:
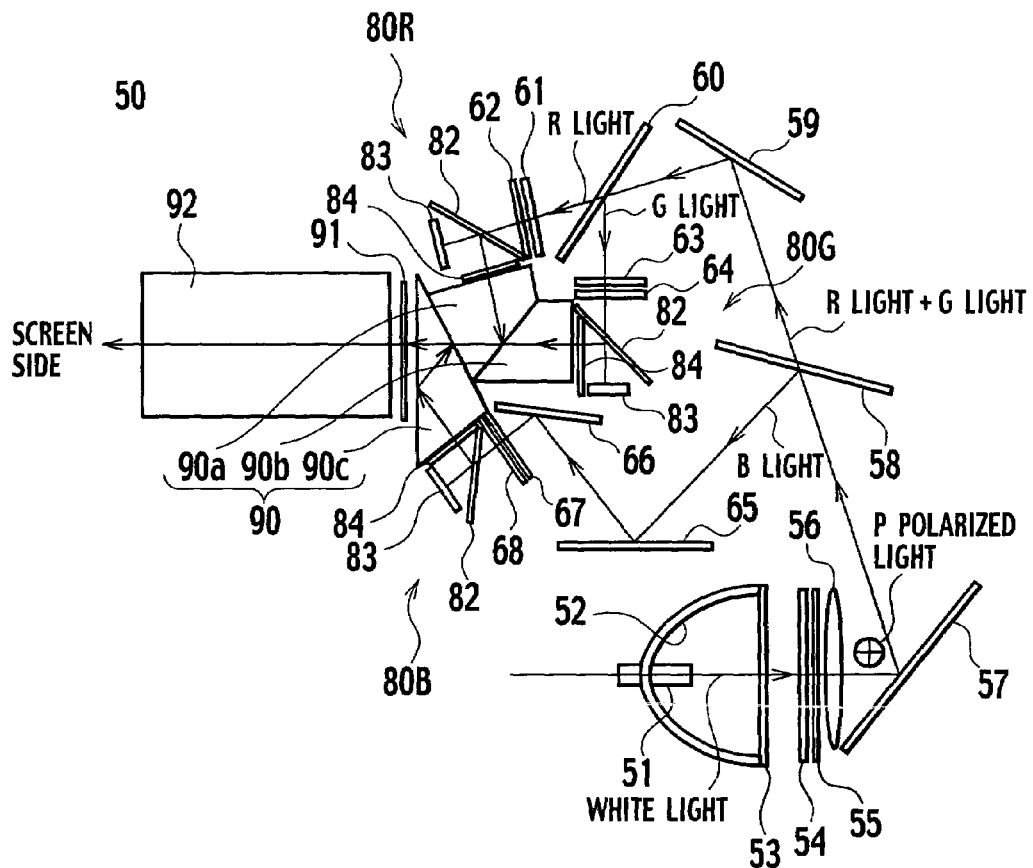
FIG. 27 is a plan view showing a configuration of a projection type display apparatus of Embodiment 2 according to the present invention.
Figure 28:
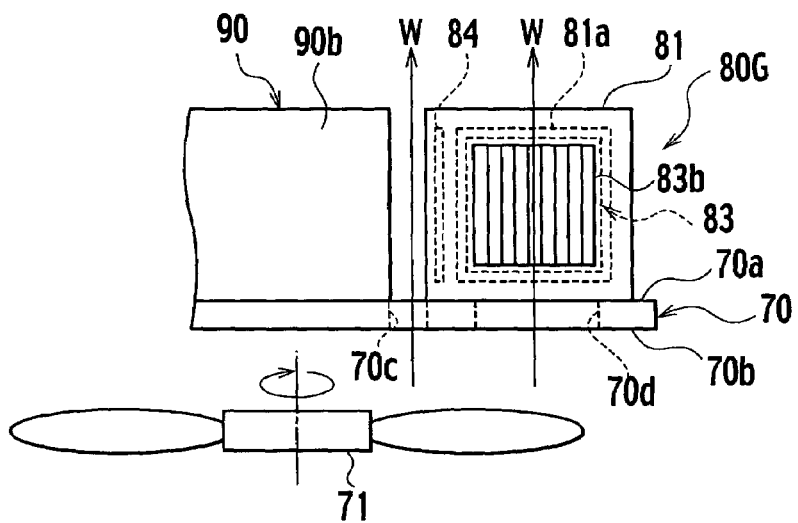
FIG. 28 is a side view showing a three-color combination prism and a reflective liquid crystal panel assembly for G light in the projection type display apparatus of Embodiment 2 according to the present invention.

FIG. 27 is a plan view showing a configuration of a projection type display apparatus of Embodiment 2 according to the present invention. FIG. 28 is a side view showing a three-color combination prism and a reflective liquid crystal panel assembly for G light in the projection type display apparatus of Embodiment 2 according to the present invention.

As shown in FIG. 27, a projection type display apparatus 50 of Embodiment 2 according to the present invention is configured as a reflective type which reflects light as a spatial light modulation element corresponding to each of R light, G light and B light, but is different from Embodiment 1 in a configuration of an optical system.

That is, in the projection type display apparatus 50 of Embodiment 2, on the same plane are arranged a light source 51 which emits white light as non-polarized light, color separation optical systems 58 and 60 which subjects the white light from the light source 51 to color separation to obtain the R light, the G light and the B light, respective spatial light modulation elements (which will be referred to as reflective liquid crystal panels hereinafter) for the R, G and B lights, a three-color combination prism 90 which subjects image lights of respective colors which have been light-modulated by the respective liquid crystal panels 83 for the R, G and B lights to color combination, and a projection lens 92 which projects color-combined image light obtained by this color combination prism 90.

First, the light source 51 emits white light as non-polarized light including the R light, the G light and the B light by using a metal halide lamp, a xenon lamp or a halogen lamp. The white light emitted from the light source 51 is reflected by a concave spherical reflecting mirror 52 to be turned to substantially parallel light, and this light sequentially enters a first fly-eye lens array 53 attached on a front surface of the concave spherical reflecting mirror 52 and a second fly-eye lens array 54 provided in front of this first fly-eye lens array 53. These first and second fly-eye lens arrays 53 and 54 form a pair to constitute an integrator which homogenizes an illumination distribution in a light beam of the white light. It is to be noted that a non-illustrated visible external light removing filter which cuts ultraviolet light and infrared light may be arranged in front of the light source 51.

Then, the white light as the non-polarized light whose illumination distribution has been homogenized by the first and second fly-eye lens arrays 53 and 54 enters a polarization converting prism array 55 as a polarization converting optical element. This polarization converting prism array 55 has the same configuration as the polarization converting prism array 15 (FIG. 4) of Embodiment 4, has a polarization splitting prism array and a λ/2 wave plate, and is entirely formed into a tabular shape. Further, the light transmitted through the polarization converting prism array 55 is turned to polarized light in a predetermined direction. In this Embodiment 2, like Embodiment 1, the polarized light in a predetermined direction obtained by the polarization converting prism array 55 is, e.g., P polarized light, but the present invention is not restricted thereto, and it is possible to adopt a method which polarization-converts the white light from the light source 51 into S polarized light by the light converting prism array 55.

Thereafter, the white light as the P polarized light transmitted through the polarization converting prism array 55 is reflected by a first cold mirror 57 through a first field lens 56 so that its optical path is deflected, and the light then enters a first dichroic mirror 58. This first dichroic mirror 58 transmits component lights of two colors out of three primary color lights therethrough and reflects the remaining light. In this Embodiment 2, the first dichroic mirror 58 transmits the R light and the G light therethrough and reflects the B light, for example.

Then, the R light and the G light transmitted through the first dichroic mirror 58 are reflected by a second cold mirror 59 and enter a second dichroic mirror 60. This second dichroic mirror 60 transmits the R light therethrough and reflects the G light, for example.

Thereafter, the R light transmitted through the second dichroic mirror 60 enters a reflective liquid crystal panel assembly 80R for R light through a second field lens 61 and a polarizing plate 62.

On the other hand, the G light reflected by the second dichroic mirror 60 enters a reflective liquid crystal panel assembly 80G for G light through a third field lens 63 and a polarizing plate 64.

Further, the B light reflected by the first dichroic mirror 58 is reflected by a third cold mirror 65, further reflected by a fourth cold mirror 66 and enters a reflective liquid crystal panel assembly 80B for B light through a fourth field lens 67 and a polarizing plate 68.

The first and second dichroic mirrors 58 and 60 constitute each color separation optical system which subjects the white light from the light source 51 to color separation to obtain the R light, the G light and the B light, and the respective constituent members from the light source 51 to the color separation optical systems 58 and 60 are respective color light illuminating means for illuminating the reflective liquid crystal panels (reflective spatial light modulation elements) 83 for respective color lights with the R light, the G light and the B light.

In the thus configured color separation optical systems, respective optical path lengths from the light source 51 to the respective liquid crystal panels 80R, 80G and 80B for the R, G and B lights are substantially equal to each other.

It is to be noted that the second to fourth cold mirrors 59, 65 and 66 do not have to be cold mirrors, and they may be regular metal film reflecting mirrors or dichroic mirrors which reflect respective color light bands as long as they have characteristics of reflecting incident lights.

In this example, the reflective liquid crystal panel assembly 80R for the R light, the reflective liquid crystal panel assembly 80G for the G light and the reflective liquid crystal panel assembly 80B for the B light all have the same configuration, and the reflective liquid crystal panel assembly 8OR for the R light, the reflective liquid crystal panel assembly 80G for the G light and the reflective liquid crystal panel assembly 80B for the B light face respective incidence surfaces of the three-color combination prism 90 with respective gaps therebetween, the three-color combination prism 90 being formed by bonding first to third prisms 90*a* to 90*c* as a color-combination optical system having a different shape from that of Embodiment 1.

Furthermore, the reflective liquid crystal panel assembly 8OR for the R light, the reflective liquid crystal panel assembly 80G for the G light, the reflective liquid crystal panel assembly 80B for the B light and the three-color combination prism 90 are fixed on an upper surface 70*a* of a base board 70 (shown in FIG. 28 only) formed of an aluminum material or the like by an adhesive.

Moreover, as shown in FIGS. 27 and 28, like Embodiment 1, each of the reflective liquid crystal panel assembly 8OR for the R light, the reflective liquid crystal panel assembly 80G for the G light and the reflective liquid crystal panel assembly 80B for the B light has the following configuration. That is, a hollow triangular prismatic housing 81 (shown in FIG. 28 only) is first prepared for each color light and, in the triangular prismatic housing 81 for each color light, a tabular reflective polarizing plate (a sol-called "wire grid polarizer") 82 as polarization splitting means is attached on a first surface having an inclination angle of approximately 45° with respect to an optical axis of each color light from each color light illuminating means from the light source 51 to the color separation optical systems 58 and 60, and a reflective liquid crystal panel 83 is attached on a second surface orthogonal to the optical axis of each color light transmitted through the reflective polarizing plate 82 for each color light. Additionally, a transmission type polarizing plate 84 as unnecessary polarized light removing means is attached on a third surface orthogonal to the optical axis of each color light obtained by reflecting reflected light from the reflective liquid crystal panel 83 for each color light by the reflective polarizing plate 82 for each color light. Further, in a state where a space surrounded by the first to third surfaces of the triangular prismatic housing 81 is sealed from dust or the like by a lower surface and an upper surface, a side on which the transmission type polarizing plate 84 for each color light is arranged faces each of incidence surfaces of the first to third prisms 90*a* to 90*c* of the three-color combination prism 90 with a gap therebetween.

In this example, the reflective polarizing plate 82, the reflective liquid crystal panel 83 and the transmission type polarizing plate 84 respectively attached and arranged on the triangular prismatic housing 81 for each color light are vertically provided with respect to the upper surface 70*a* of the base board 70 (shown in FIG. 28 only). Furthermore, a wave plate 83*a* (shown in FIG. 28 only) which corrects the liquid crystal corresponding to a pre-tilt by reciprocation is attached on a front surface of the reflective liquid crystal panel 83 for each color light, and a heat sink 83 (shown in FIG. 28 only) which cools the reflective liquid crystal panel 83 for each color light is attached on a rear surface of the reflective liquid crystal panel 83.

Moreover, when the R light, the G light and the B light of the P polarized components respectively enter the reflective liquid crystal panel assembly 80R for the R light, the reflective liquid crystal panel assembly 80G for the G light and the reflective liquid crystal panel assembly 80B for the B light, the P polarized components only are transmitted through the reflective polarizing plate 82 for each color light attached on the triangular prismatic housing 81 for each color light to enter the reflective liquid crystal panel 83 for each color light.

Then, each light beam light-modulated and reflected in accordance with an image signal of each color of the R light, the G light or the B light in the reflective liquid crystal panel 83 for each color light returns to the reflective polarizing plate 82 for each color light. Here, the reflective polarizing plate 82 for each color light subjects each light beam light-modulated and reflected by the reflective liquid crystal panel 83 for each color light to polarization split, and the light beam whose a linear polarized component in the other direction (an S polarized component in this example) alone is reflected is transmitted through the transmission type polarizing plate 84 for each color light, and then enters the three-color combination prism 90 from three directions.

In this example, the three-color combination prism 90 is a so-called "Phillips type prism", and it is a prism which does not have a bonded portion at a part corresponding to a screen as described in, e.g., Japanese Patent No. 2505758. This prism is used as a color separation prism in a so-called "three-panel type video camera". This three-color combination prism 90 comprises at least first to third prisms 90a to 90c arranged to form at least two sets of opposed surfaces. A first dichroic film which reflects the R light and transmits the G light therethrough is formed on a first opposed surface obtained by bonding the first prism 90a and the second prism 90b, and a second dichroic film which transmits the R light and the G light therethrough and reflects the B light is formed on a second opposed surface obtained by bonding the first prism 90a and the third prism 90c.

Therefore, in this three-color combination prism 90, the R light which has entered from the first prism 90a is reflected by the first dichroic film, transmitted through the second dichroic film and enters the third prism 90c. Moreover, the G light which has entered from the second prism 90b is transmitted through the first and second dichroic films as it is and enters the third prism 90c. Additionally, the B light which has entered from the third prism 90c is reflected by the second dichroic film. The respective image lights of the R light, the G light and the B light are subjected to color combination in this third prism 90c, and color-combined image light obtained by the three-color combination prism 90 enters the projection lens 92 through a ¼ wave plate 91, and is magnified and projected onto a non-illustrated screen by this projection lens 92 to form an actual image, thereby displaying the color-combined image light.

As described above, since this projection type display apparatus 50 of Embodiment 2 also has a configuration in which the optical elements constituting the color separation optical system, the polarization spit, the spatial light modulation, the color combination optical system portion and the projection lens are arranged on the same plane, the entire apparatus can be constituted on the same plane, whereby a height of the apparatus can be reduced to obtain the compact apparatus. Further, since the optical path lengths from the light source 51 to the reflective liquid crystal panels 83 for the respective color lights are equal to each other, a relay lens is not necessary in the color separation optical system, and hence the configuration of the optical system can be simplified, thereby facilitating manufacture and reducing a cost.

Furthermore, in Embodiment 2, as shown in FIG. 28, when the G light enters the reflective liquid crystal panel assembly 80G for the G light in a state where the second prism 90b of the three-color combination prism 90 faces, e.g., the reflective liquid crystal panel assembly 80G for the G light with a gap therebetween on the upper surface 70a of the base board 70, temperatures of the reflective polarizing plate 82, the reflective liquid crystal panel 83 and the transmission type polarizing plate 84 attached and arranged on the triangular prismatic housing 81 for the G light whose inside is sealed and the second prism 90b in the three-color combination prism 90 are increased due to the light from the light source 51. Therefore, in order to avoid an increase in temperatures of these optical members, a fan 71 as air-cooling means is rotatably set on the lower surface 70b side of the base board 70.

Based on this configuration, a first fan hole 70c is formed through the base board 70 in accordance with a gap between the reflective liquid crystal panel assembly 80G for the G light and the second prism 90b in the three-color combination prism 90, and a second fan hole 70d is formed through the same to face the heat sink 83b attached on the rear surface of the reflective liquid crystal panel 83 for the G light.

Furthermore, an air stream W generated when rotating the fan 71 is supplied to the upper surface 70a side of the base board 70 from the lower surface 70b side of the base board 70 through the first and second fan holes 70c and 70d formed through this base board 70. In this example, the air stream W which has passed through the first fan hole 70c is supplied to the gap formed between the transmission type polarizing plate 84 attached on the triangular prismatic housing 81 for the G light and the incidence surface of the second prism 90b of the three-color combination prism 90 to cool the surface of the transmission type polarizing plate 84 for the G light and the incidence surface of the second prism 90b in the three-color combination prism 90. Moreover, the air stream W which has passed through the second fan hole 70d cools the heat sink 83b attached on the rear surface of the reflective liquid crystal panel 83 for the G light. Therefore, it is possible to suppress an increase in temperatures of the reflective liquid crystal panel 83 for the G light, the transmission type polarizing plate 84 for the G light and the three-color combination prism 90 to avoid deterioration due to heat generation. As a result, high luminance and high contrast can be achieved, which contributes to an improvement in reliability with respect to the projection type display apparatus 50 of Embodiment 2.

It is to be noted that, although not shown, the reflective liquid crystal panel assembly 80R for the R light and the reflective liquid crystal panel assembly 80B for the B light are also cooled by the fan 71 provided on the lower surface 70b side of the base board 70 like the reflective liquid crystal panel assembly 80G for the G light.

Additionally, it is apparent that each modification of Embodiment 2 can be configured by adopting substantially the same configuration as Modifications 1 to 9 of Embodiment 1 with respect to the projection type display apparatus 50 of Embodiment 2 according to the present invention. Further, in modifications of this Embodiment 2, an absorption type polarizing plate may be used for the R light as unnecessary polarized light removing means for each color light, and a reflective polarizing plate may be used for the G and B lights.

Embodiment 3

Figure 29:
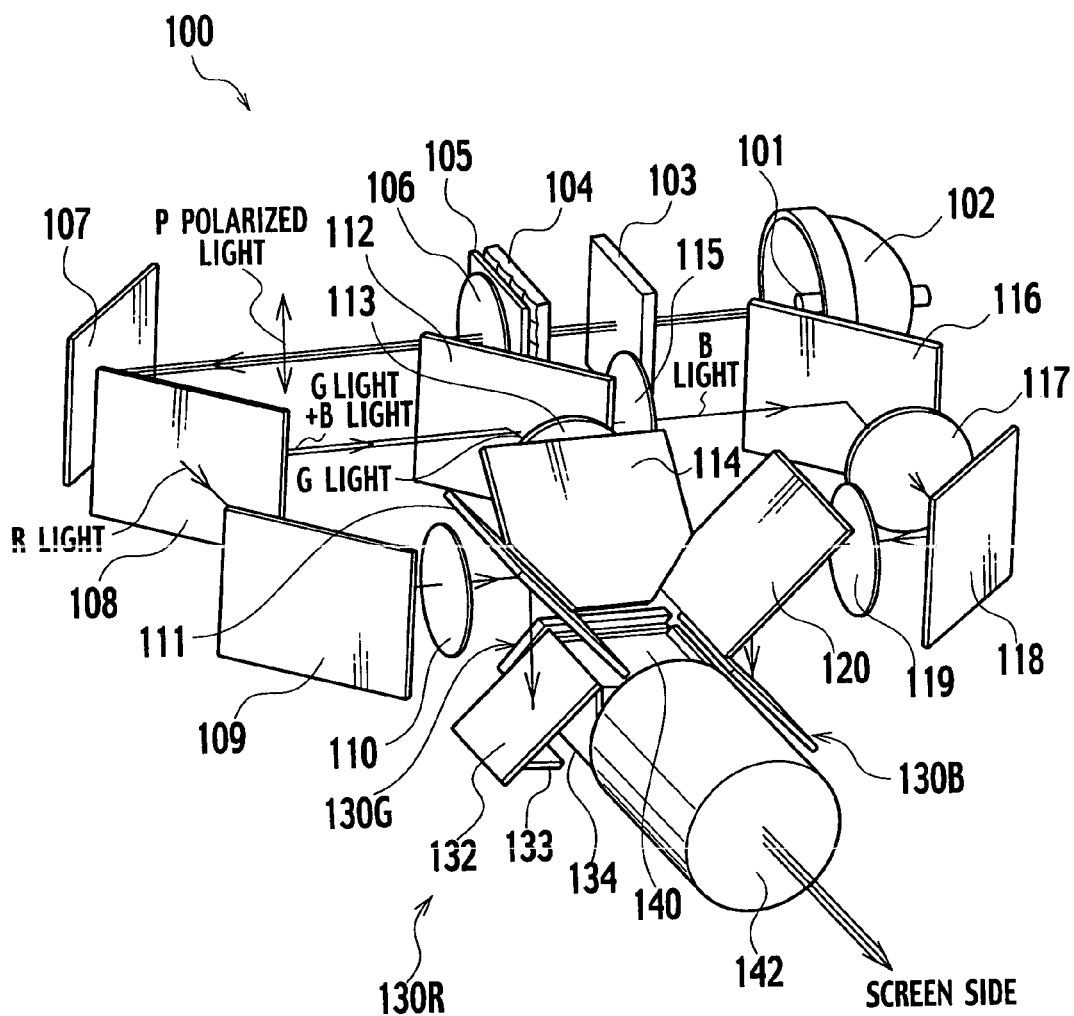
FIG. 29 is a perspective view showing a configuration of a projection type display apparatus of Embodiment 3 according to the present invention.
Figure 30:
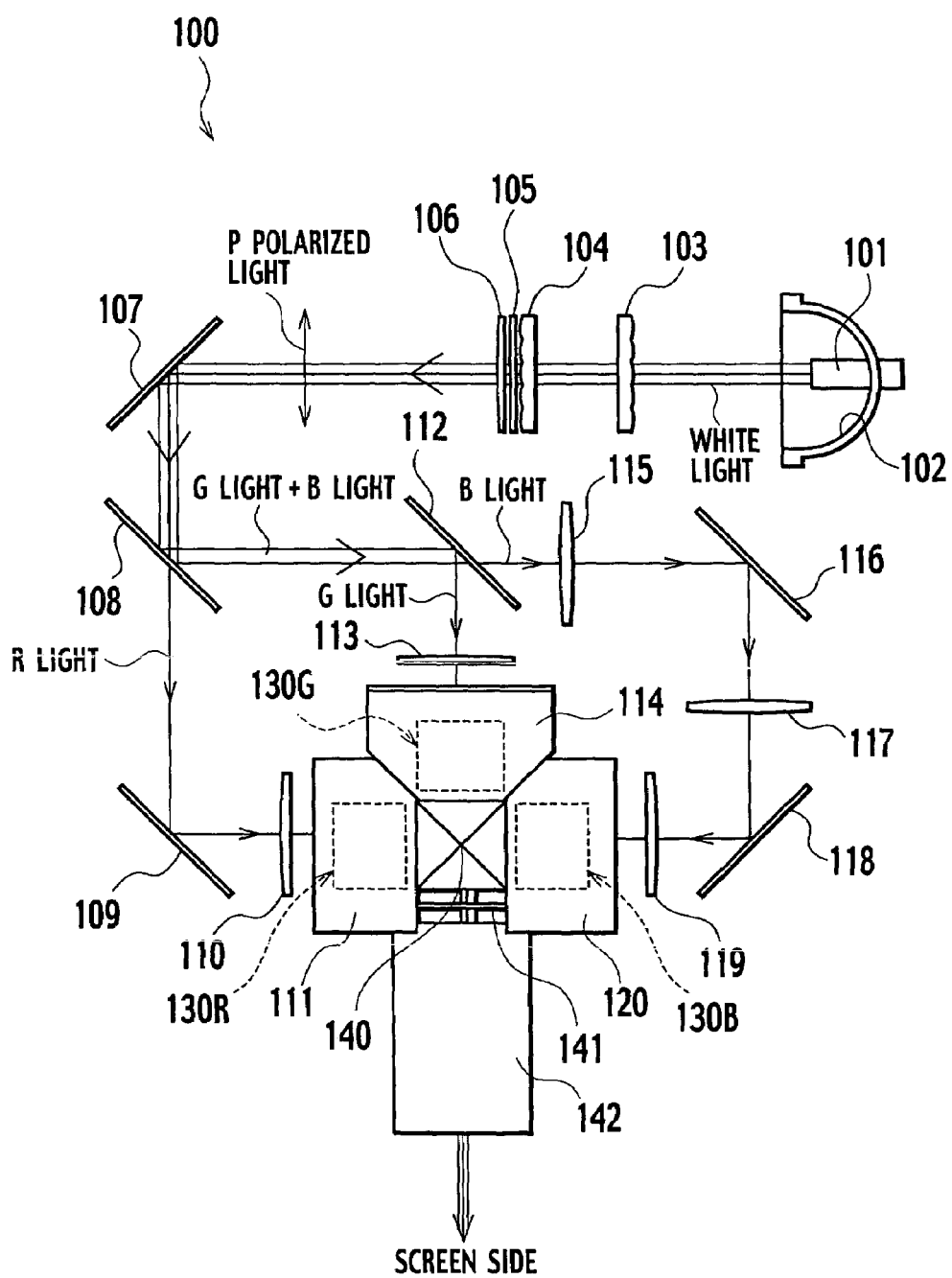
FIG. 30 is a plan view showing the configuration of the projection type display apparatus of Embodiment 3 according to the present invention.
Figure 31A:
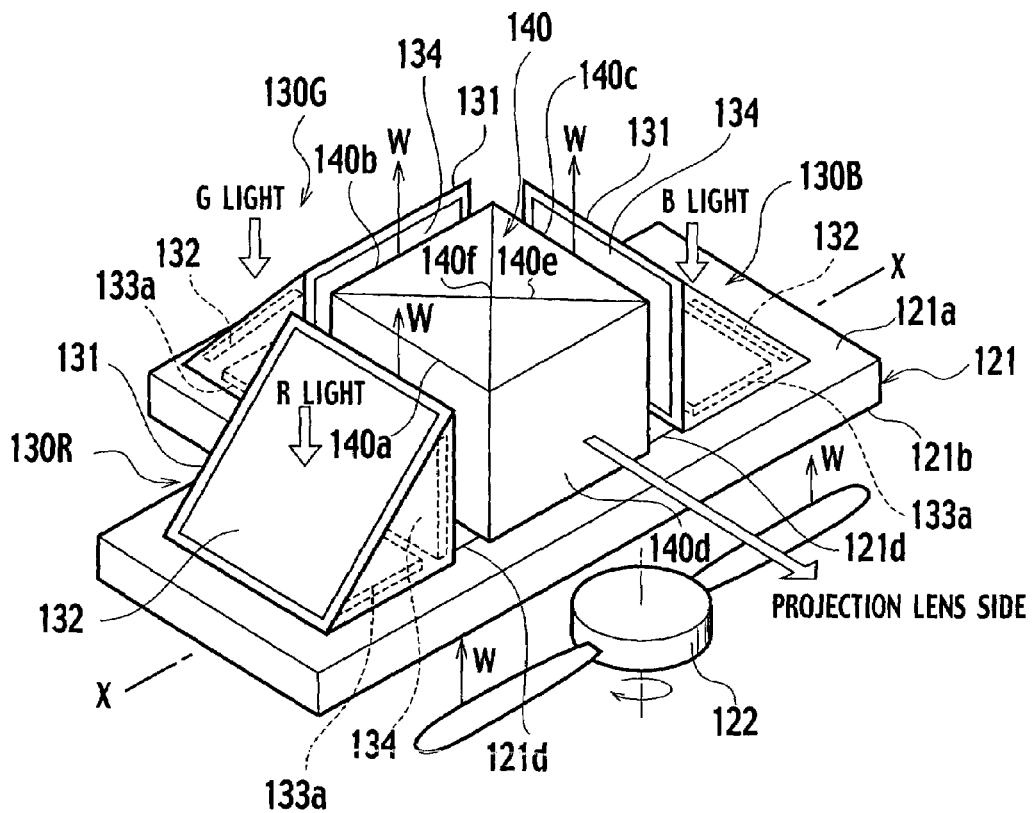
FIGS. 31A and 31B are a perspective view showing respective reflective liquid crystal panel assemblies for R, G and B lights and a three-color cross dichroic prism and an X-X cross-sectional view showing the reflective liquid crystal panel assembly for the R light, the three-color combination cross dichroic prism and the reflective liquid crystal panel assembly for the B light in the projection type display apparatus of Embodiment 3.
Figure 31B:
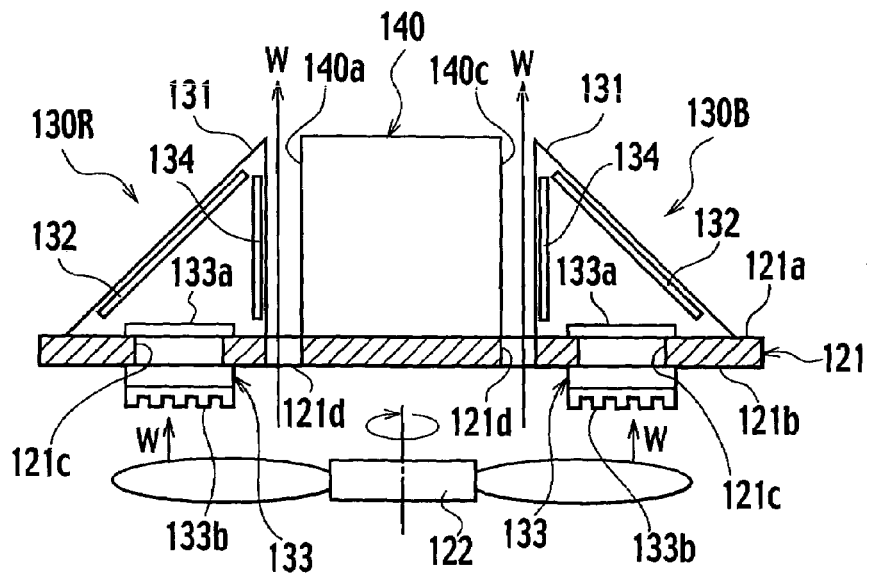

FIG. 29 is a perspective view showing a configuration of a projection type display apparatus of Embodiment 3 according to the present invention. FIG. 30 is a plan view showing a configuration of the projection type display apparatus of Embodiment 3 according to the present invention. FIGS. 31A and 31B are a perspective view showing respective reflective liquid crystal panel assemblies for R, G and B lights and a three-color combination cross dichroic prism and an X-X cross-sectional view showing the reflective liquid crystal panel assembly for the R light, the three-color combination cross dichroic prism and the reflective liquid crystal panel assembly for the B light in the projection display apparatus of Embodiment 3.

As shown in FIGS. 29 and 30, although a projection type display apparatus 100 of Embodiment 3 according to the present invention is constituted as a reflective type which reflects light as spatial light modulation elements corresponding to R light, G light and B light, it is different from Embodiment 1 and Embodiment 2 in a configuration of an optical system.

That is, as different from Embodiments 1 and 2, the projection type display apparatus 100 of Embodiment 3 has an optical system comprising two layers in a vertical direction. In this example, a light source 101 which emits white light as non-polarized light and color separation optical systems 108 and 112 which subjects the white light from the light source 101 to color separation to obtain the R light, the G light and the B light are arranged in an upper layer part of the optical system and, on the other hand, respective reflective spatial light modulations elements (which will be referred to as reflective liquid crystal panels hereinafter) 133 for the R, G and B lights, a three-color combination cross dichroic prism 140 which subjects image lights of the respective colors deflected and modulated in the respective liquid crystal panels 133 for the R, G and B lights to color combination and a projection lens 142 which projects color-combined image light obtained in this three-color combination cross dichroic prism 140 are arranged in a lower layer part of the optical system.

First, the light source 101 emits the white light including the R light, the G light and the B light by using a metal halide lamp, a xenon lamp, a halogen lamp or the like. When the white light emitted from this light source 101 is reflected by a concave spherical reflecting mirror 102, it is turned to substantially parallel light to sequentially enter a first fly-eye lens array 103 provided in front of the concave spherical reflecting mirror 102 and a second fly-eye lens array 104 provided in front of this first fly-eye lens array 103. These first and second fly-eye lens arrays 103 and 104 form a pair to constitute an integrator which homogenizes an illumination distribution in a light beam of the white light. It is to be noted that a non-illustrated visible external light removing filter which cuts ultraviolet light and infrared light may be arranged in front of the light source 101.

Thereafter, the white light as the non-polarized light whose illumination distribution has been homogenized by the first and second fly-eye lens arrays 103 and 104 enters a polarization converting prism array 105 as a polarization converting optical element. This polarization converting prism array 105 has the same configuration as that of the polarization converting prism array 15 (FIG. 4) of Embodiment 1, includes a polarization split prism array and a λ/2 wave plate, and is entirely formed into a tabular shape. Further, the light, transmitted through the polarization converting prism array 105 is turned to polarized light in a predetermined direction. In this Embodiment 3, the polarized light in a predetermined direction obtained by the polarization converting prism array 105 is, e.g., P polarized light like Embodiment 1, but the present invention is not restricted thereto, and it is possible to adopt a method which subjects the white light from the light source 101 to polarization conversion to obtain S polarized light in the light converting prism array 105.

Then, the white light as the P polarized light transmitted through the polarization converting prism array 105 is reflected by a first cold mirror 107 through a first field lens 106 so that its optical path is deflected, and enters a first dichroic mirror 108. This first dichroic mirror 108 transmits component lights of two colors out of three primary color lights therethrough and reflects the remaining light. In Embodiment 3, the first dichroic mirror 108 transmits the R light therethrough and reflects the G light and the B light, for example.

Furthermore, the R light transmitted through the first dichroic mirror 108 is reflected by a second cold mirror 109 and condensed through a second field lens 110. This R light is reflected by a second steering mirror 111 for optical path direction conversion so that its optical path is deflected 90° toward the lower layer part. The R light reflected by the first steering mirror 111 enters the reflective liquid crystal panel assembly 130R for the R light arranged in the lower layer part.

On the other hand, the G light and the B light reflected by the first dichroic mirror 108 enter a second dichroic mirror 112. This second dichroic mirror 112 transmits the B light therethrough and reflects the G light, for example.

Then, when the G light reflected by the second dichroic mirror 112 is reflected by a second steering mirror 114 for optical path direction conversion through a third field lens 113, its optical path is deflected 90° toward the lower layer part. The G light reflected by the second steering mirror 114 enters the reflective liquid crystal panel assembly 130G for the G light arranged in the lower layer part.

On the other hand, the B light transmitted through the second dichroic mirror 112 is reflected by a third cold mirror 116 through a first relay lens 115, and condensed through a second relay lens 117. This B light is further reflected by a fourth cold mirror 118 and further reflected by a third steering mirror 120 for optical path direction conversion through a fourth field lens 119, and its optical path is thereby deflected 90° toward the lower layer part. The B light reflected by the third steering mirror 120 enters the reflective liquid crystal panel assembly 130B for the B light arranged in the lower layer part.

The first and second dichroic mirrors 108 and 112 constitute color separation optical systems which subject the white light from the light source 101 to color separation to obtain the R light, the G light and the B light, and respective constituent members from the light source 101 to the color separation optical systems 108 and 112 are respective color light illuminating means for illuminating the reflective liquid crystal panels (reflective spatial light modulation elements) 133 for the respective color lights with the R light, the G light and the B light.

Here, the reflective liquid crystal panel assembly 130R for the R light, the reflective liquid crystal panel assembly 130G for the G light and the reflective liquid crystal panel assembly 130B for the B light all have the same configuration, and each of the reflective liquid crystal panel assembly 130R for the R light, the reflective liquid crystal panel assembly 130G for the G light and the reflective liquid crystal panel assembly 130B for the B light faces each of incidence surfaces 140a to 140c of the three-color combination cross dichroic prism 140 as a color combination optical system formed into a rectangular parallelepiped shape with a gap therebetween.

In this example, the reflective liquid crystal panel assembly 130R for the R light, the reflective liquid crystal panel assembly 130G for the G light, the reflective liquid crystal panel assembly 130B for the B light and the three-color combination cross dichroic prism 140 are fixed on an upper surface 121a of a base board 121 formed of an aluminum material or the like by an adhesive as shown in FIGS. 31A and 31B.

Additionally, as shown in FIGS. 29, 30, 31A and 31B each of the reflective liquid crystal panel assembly 130R for the R light, the reflective liquid crystal panel assembly 130G for the G light and the reflective liquid crystal panel assembly 130B for the B light has the following configuration. That is, a hollow triangular prismatic housing 131 is prepared for each color light and, in the triangular prismatic housing 131 for each color light, a tabular reflective polarizing plate (a so-called "wire grid polarizer") 132 as polarization splitting means is attached on a first surface having an inclination angle of approximately 45° with respect to an optical axis of each color light from each color light illuminating means from the light source 101 to the color separation optical systems 108 and 112, and a reflective liquid crystal panel 133 is attached on a second surface orthogonal to the optical axis of each color light transmitted through the reflective polarizing plate 132 for each color light. Further, a transmission type polarizing plate 134 as unnecessary polarized light removing means is attached on a third surface orthogonal to the optical axis of each color light obtained by reflecting reflected light from the reflective liquid crystal panel 133 for each color light by the reflective polarizing plate 132 for each color light. Furthermore, in a state where a space surrounded by the first to third surfaces of the triangular prismatic housing 131 is sealed from dust or the like by a lower surface and an upper surface, each side on which the transmission type polarizing plate 134 for each color light is arranged faces each of the incidence surfaces 140a to 140c of the three-color combination cross dichroic prism 140 with a gap therebetween.

In this example, in the triangular prismatic housing 131 for each color light, the reflective polarizing plate 132 is inclined approximately 45° with respect to the upper surface 121a of the base board 121, and the transmission type polarizing plate 134 is vertically provided with respect to the upper surface 121a of the base board 121.

Moreover, as different from Embodiments 1 and 2, on the reflective liquid crystal panel 133 for each color light is attached a wave plate 133a which is attached on the lower surface 121b side of the base board 121, faces an opening portion 121c formed through the base board 121 and covers this opening portion 121c from the upper side to correct the liquid crystal corresponding to a pre-tilt by reciprocation. Additionally, a heat sink 133b which cools the reflective liquid crystal panel 133 is attached on a rear surface of the reflective liquid crystal panel 133. It is to be noted that the description has been given as to the example where the reflective liquid crystal panel 133 is attached on the lower surface 122b side of the base board 121 in Embodiment 3, but it can be attached on the upper surface 121a side of the base board 121. In this case, it is good enough to form a fan hole, which cools the heat sink 133b attached on the rear surface of the reflective liquid crystal panel 133, through the base board 121.

Further, when the R light, the G light and the B light of the P polarized components respectively enter the reflective liquid crystal panel assembly 130R for the R light, the reflective liquid crystal panel assembly 130G for the G light and the reflective liquid crystal panel assembly 130B for the B light, the P polarized components alone are transmitted through the reflective polarizing plate 132 for each color light attached on the triangular prismatic housing 131 for each color light to enter the reflective liquid crystal panel 133 for each color light.

Then, each light beam light-modulated and reflected in the reflective liquid crystal panel 133 for each color light in accordance with an image signal of each color of the R light, the G light or the B light returns to the corresponding reflective polarizing plate 132 for each color light. Here, the light beam light-modulated and reflected by the reflective liquid crystal panel 133 for each color light is subject to polarization split by the reflective polarizing plate 132 for each color light, and each light beam whose linear polarized component (an S polarized component in this example) in the other direction alone is reflected is transmitted through the transmission type polarizing plate 134 for each color light, and then enters the three-color combination cross dichroic prism 140 from each of the incidence surfaces 140a to 140c thereof. It is to be noted that the three-color combination cross dichroic prism 140 is used as the color combination optical system in this Embodiment 3, but such a "Phillips type prism" as described in conjunction with Embodiment 2 can be also used.

Subsequently, the image lights having the respective colors of the R light, the G light and the B light which have entered from the respective incidence surfaces 140a to 140c of the three-color combination cross dichroic prism 140 are subjected to color combination by first and second dichroic films 140e and 140f formed in the three-color combination cross dichroic prism 140, color-combined image light obtained by this three-color combination cross dichroic prism 140 is emitted from an emission surface 140d to enter a projection lens 142 through the ¼ wave plate 141, and this light is magnified and projected onto a non-illustrated screen by this projection lens 142 to form an actual image, thereby displaying the color-combined image light.

In this projection type display apparatus 100, as described above, since the color separation optical system and the color combination optical system form the two layers in the vertical direction, an optical path is drawn on an outer peripheral side to perform color separation in the upper layer part, and a light beam is led to the polarization split, the spatial light modulation, the color combination optical system and the projection lens in the lower layer part. Therefore, even if the entire optical system is reduced in size, drawing the optical path does not involve a lot of trouble, and the arrangement of the optical elements have leeway.

Here, in Embodiment 3, when the R light, the G light and the B light respectively enter the reflective liquid crystal panel assembly 130R for the R light, the reflective liquid crystal panel assembly 130G for the G light and the reflective liquid crystal panel assembly 130B for the B light, temperatures of the reflective polarizing plate 132, the reflective liquid crystal panel 133 and the transmission type polarizing plate 134 attached and arranged on the triangular prismatic housing 131 for each color light whose inside is sealed and the respective incidence surfaces 140a to 140c of the three-color cross dichroic prism 140 are increased due to the light from the light source 101. Therefore, in order to avoid an increase in temperatures of these optical members, as shown in FIGS. 31A and 31B, a fan 122 as air-cooling means is rotatably set on the lower surface 121b side of the base board 121.

Based on this configuration, each fan hole 121d is formed through the base board 121 in accordance with each gap formed between the reflective liquid crystal panel assemblies 130R, 130G and 130B for the respective color lights and the respective incidence surfaces 140a to 140c of the three-color combination cross dichroic prism 140.

Further, an air stream W generated when rotating the fan 122 is transmitted to the upper surface 121a side of the base board 121 from the lower surface 121b side of the base board 121 through the fan hole 121d formed in this base board 121. Here, the air stream W which has passed through the fan hole 121d is supplied into each gap formed between the transmission type polarizing plate 134 attached on the triangular prismatic housing 131 for each color light and each of the incidence surfaces 140a to 140c of the three-color combination cross dichroic prism 140 to cool a surface of the transmission type polarizing plate 134 for each color light and each of the incidence surfaces 140a to 140c of the three-color combination cross dichroic prism 140. Furthermore, the air stream W from the fan 122 cools the heat sink 133b attached on the rear surface of the reflective liquid crystal panel 133 for each color light. Therefore, it is possible to suppress an increase in temperatures of the reflective liquid crystal panel 133 for each color light, the transmission type polarizing plate 134 for each color light and the three-color combination cross dichroic prism 140 to avoid deterioration due to heat generation, whereby high luminance and high contrast can be achieved, which contributes to an improvement in reliability with respect to the projection type display apparatus 100 of Embodiment 3.

Moreover, it is apparent that each modification of Embodiment 3 can be constituted by adopting substantially the same configuration as Modifications 1 to 9 of Embodiment 1 with respect to the projection type display apparatus 100 of Embodiment 3 according to the present invention. Additionally, in modifications of this Embodiment 3, an absorption type polarizing plate may be used for the R light and a reflective polarizing plate may be utilized for the G and B lights as unnecessary polarized light removing means for each color light.

It should be understood that many modifications and adaptations of the invention will become apparent to those skilled in the art and it is intended to encompass such obvious modifications and changes in the scope of the claims appended hereto.

What is claimed is:

1. A projection type display apparatus comprising:
   a reflective spatial light modulation element for each color light corresponding to each of R light, G light and B light;
   color light illuminating means for illuminating the reflective spatial light modulation element for each color light with each of the R light, the G light and the B light;
   a reflective polarizing plate for each color light which transmits a polarized component in one direction of each of the R light, the G light and the B light from each color light illuminating means therethrough, and reflects as image light of each color a polarized component in the other direction different from the polarized light in one direction obtained by subjecting each of the transmitted R light, G light and B light to light modulation in accordance with an image signal of each color light by the reflective spatial light modulation element for each color light;
   unnecessary polarized light removing means for each color light for removing an unnecessary polarized component with respect to the image light of each color from the reflective spatial light modulation element for each color light reflected by the reflective polarizing plate for each color light to emit the image light of each color without the unnecessary polarized component;
   a color combination optical system which subjects the image light of each color emitted from the unnecessary polarized light removing means for each color light to color combination to emit the thus combined light as color-combined image light;
   a projection lens which projects the color-combined image light;
   a triangular prismatic housing for each color light arranged in proximity to the color combination optical system and having: a first surface which has an inclination angle of approximately 45° with respect to an optical axis of each color light from each color light illuminating means and on which the reflective polarizing plate for each color light is attached; a second surface which is orthogonal to the optical axis of each color light transmitted through the reflective polarizing plate for each color light and on which the reflective spatial light modulation element for each color light is attached; a third surface which is orthogonal to the optical axis of each color light obtained by reflecting reflected light from the reflective spatial light modulation element for each color light by the reflective polarizing plate for each color and on which the unnecessary polarized light removing means for each color light is attached; and a lower surface and an upper surface which seal a space surrounded by the first surface to the third surface; and
   air-cooling means for air-cooling the unnecessary polarized light removing means for each color light by supplying an air stream to each gap between the color combination optical system and the third surface of the triangular prismatic housing for each color light;
   wherein the unnecessary polarized light removing means for each color light is a polarizing plate which absorbs unnecessary polarized light or a polarizing plate which reflects the unnecessary polarized light.

2. The projection type display apparatus according to claim 1, wherein the unnecessary polarized light removing means for each color light has a function of restricting a disused wavelength band.

3. A projection type display apparatus comprising:
   a reflective polarizing plate which has an inclination angle of approximately 45° with respect to an optical axis of an incident light from a light source and transmits a predetermined polarized light;
   a reflective modulation element which modulates the predetermined polarized light from the reflective polarizing plate and reflects the modulated polarized light;
   a closed triangular prismatic housing which has triangular upper and lower surfaces and first to third surfaces connecting the upper surface and the lower surface, the reflective polarizing plate and the reflective modulation element being attached on the first surface and the second surface, respectively,
   wherein a polarized light having a polarized light component orthogonal to the incident light included in a light reflected on the reflective modulation element is reflected on the reflective polarizing plate and then emitted from the third surface of the closed triangular prismatic housing;
   a prism which received the polarized light emitted from the third surface of the closed triangular prismatic housing; and
   air-cooling means for air-cooling a light receiving surface of the prism by supplying an air stream to a gap between the light receiving surface of the prism and the third surface of the closed triangular prismatic housing.

4. The projection type display apparatus according to claim 3, further comprising:
   unnecessary polarized light removing means attached on the third surface of the closed triangular prismatic housing, for removing an unnecessary polarized light.

5. The projection type display apparatus according to claim 4, wherein the unnecessary polarized light removing means is a polarizing plate which absorbs the unnecessary polarized light or a polarizing plate which reflects the unnecessary polarized light.

* * * * *

UNITED STATES PATENT AND TRADEMARK OFFICE
CERTIFICATE OF CORRECTION

PATENT NO. : 7,502,078 B2
APPLICATION NO. : 11/211465
DATED : March 10, 2009
INVENTOR(S) : Tetsuji Suzuki It is certified that error appears in the above-identified patent and that said Letters Patent is hereby corrected as shown below:

Title Page

Item (30)    Foreign Application Priority Data should read

| Aug. 27, 2004 | (JP) | P2004-248261 |
| Dec. 27, 2004 | (JP) | P2004-377958 |
| Jun. 17, 2005 | (JP) | P2005-178386 |

Signed and Sealed this

Twelfth Day of May, 2009

JOHN DOLL
*Acting Director of the United States Patent and Trademark Office*